US009799141B2

(12) United States Patent
Ueno et al.

(10) Patent No.: US 9,799,141 B2
(45) Date of Patent: Oct. 24, 2017

(54) DISPLAY DEVICE, CONTROL SYSTEM, AND CONTROL PROGRAM

(71) Applicant: KYOCERA Corporation, Kyoto-shi, Kyoto (JP)

(72) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,228

(22) PCT Filed: Sep. 26, 2013

(86) PCT No.: PCT/JP2013/076080
§ 371 (c)(1),
(2) Date: Mar. 25, 2015

(87) PCT Pub. No.: WO2014/050974
PCT Pub. Date: Apr. 3, 2014

(65) Prior Publication Data
US 2015/0243081 A1    Aug. 27, 2015

(30) Foreign Application Priority Data

Sep. 27, 2012  (JP) .................................. 2012-214955

(51) Int. Cl.
*G09G 5/00*  (2006.01)
*G06T 19/00*  (2011.01)
(Continued)

(52) U.S. Cl.
CPC .......... *G06T 19/006* (2013.01); *A63F 9/0612* (2013.01); *A63F 9/0826* (2013.01);
(Continued)

(58) Field of Classification Search
None
See application file for complete search history.

(56) References Cited

U.S. PATENT DOCUMENTS 3,726,027 A * 4/1973 Cohen .................... A63F 9/088
434/403
5,651,679 A * 7/1997 Altman .................. G09B 23/04
359/616
(Continued)

FOREIGN PATENT DOCUMENTS

JP    58-89287 A    5/1983
JP    10-99543 A    4/1998
(Continued)

OTHER PUBLICATIONS

Walairacht et al., Two-Handed Multiple-Finger Virtual Object Manipulation Environment with Haptic Cues, Electronics and Communications in Japan, Aug. 23, 2004, v.87, pp. 65-73.*
(Continued)

*Primary Examiner* — M Good Johnson
(74) *Attorney, Agent, or Firm* — Hauptman Ham, LLP

(57) ABSTRACT

According to one of aspects, a display device includes: a display unit configured to stereoscopically display an aggregation configured from a plurality of regular hexahedrons arrayed along mutually perpendicular three directions, in a display space, by displaying images respectively corresponding to both eyes of a user by being worn; a detection unit configured to detect movement of a body in the display space; and a control unit configured to change positions of the regular hexahedrons of the aggregation according to a detection result of the detection unit. Each of six faces of the aggregation includes external faces of the regular hexahedrons as elements, and notations with which whether all of the elements on the same face of the aggregation belong to (Continued)

a same group is discriminative are provided to the respective elements.

19 Claims, 27 Drawing Sheets

(51) Int. Cl.

| | |
|---|---|
| A63F 9/08 | (2006.01) |
| A63F 9/06 | (2006.01) |
| A63F 13/213 | (2014.01) |
| A63F 13/212 | (2014.01) |
| G02B 27/01 | (2006.01) |
| G06F 3/01 | (2006.01) |
| H04N 13/04 | (2006.01) |
| A63F 13/65 | (2014.01) |
| A63F 13/5255 | (2014.01) |
| G09G 3/00 | (2006.01) |
| A63F 13/428 | (2014.01) |

(52) U.S. Cl.
CPC .......... *A63F 13/212* (2014.09); *A63F 13/213* (2014.09); *A63F 13/428* (2014.09); *A63F 13/5255* (2014.09); *A63F 13/65* (2014.09); *G02B 27/0172* (2013.01); *G06F 3/017* (2013.01); *G09G 3/003* (2013.01); *H04N 13/0468* (2013.01); *G09G 2354/00* (2013.01)

(56) References Cited

U.S. PATENT DOCUMENTS

| | | | | | |
|---|---|---|---|---|---|
| 6,062,978 | A * | 5/2000 | Martino | ..................... | A63F 9/24 273/153 R |
| 6,921,314 | B2 * | 7/2005 | Miller | .................. | A63H 33/084 446/487 |
| 7,094,147 | B2 * | 8/2006 | Nakata | ....................... | A63F 9/10 463/31 |
| 7,600,756 | B2 * | 10/2009 | Verdes | ................... | A63F 9/0842 273/153 S |
| 7,909,696 | B2 * | 3/2011 | Beaulieu | ................ | G06F 17/00 463/16 |
| 8,477,139 | B2 * | 7/2013 | Robinet | ............... | G06F 3/04815 345/419 |
| 8,704,879 | B1 * | 4/2014 | Cheng | ................ | H04N 13/0278 348/51 |
| 8,727,351 | B2 * | 5/2014 | Agamawi | ............. | A63F 9/0869 273/155 |
| 9,071,808 | B2 * | 6/2015 | Oyagi | ..................... | A63F 13/10 |
| 9,072,971 | B2 * | 7/2015 | Hayashida | .............. | A63F 13/10 |
| 9,259,645 | B2 * | 2/2016 | Takeuchi | ................ | G06T 15/20 |
| 9,282,319 | B2 * | 3/2016 | Konno | ............... | H04N 13/0239 |
| 2002/0058456 | A1 * | 5/2002 | Miller | .................. | A63H 33/084 446/85 |
| 2004/0046736 | A1 * | 3/2004 | Pryor | ..................... | A63F 13/02 345/156 |
| 2007/0152958 | A1 | 7/2007 | Ahn et al. | | |
| 2008/0030428 | A1 * | 2/2008 | Tomisawa | .......... | G02B 27/2214 345/6 |
| 2010/0084814 | A1 * | 4/2010 | Yang | ..................... | A63F 9/1204 273/153 S |
| 2011/0050562 | A1 | 3/2011 | Schoen et al. | | |
| 2012/0013613 | A1 * | 1/2012 | Vesely | .................... | G06F 3/011 345/419 |
| 2013/0005420 | A1 | 1/2013 | Ueno et al. | | |
| 2013/0083011 | A1 * | 4/2013 | Geisner | .................... | G09G 5/00 345/419 |
| 2013/0104087 | A1 * | 4/2013 | Mlyniec | ................ | G06F 3/0346 715/849 |
| 2013/0147795 | A1 * | 6/2013 | Kim | ........................ | G06F 21/36 345/419 |
| 2013/0194253 | A1 * | 8/2013 | Ohmi | ...................... | G06T 19/00 345/419 |
| 2013/0222376 | A1 * | 8/2013 | Shimazaki | ......... | G02B 27/2228 345/419 |
| 2013/0231184 | A1 | 9/2013 | Hatanaka | | |
| 2014/0077454 | A1 * | 3/2014 | Lapstun | ................ | A61F 13/005 273/153 S |
| 2015/0220749 | A1 * | 8/2015 | Cronholm | .......... | G06K 9/00355 726/30 |

FOREIGN PATENT DOCUMENTS

| | | |
|---|---|---|
| JP | 10-207620 A | 8/1998 |
| JP | 2000-89871 A | 3/2000 |
| JP | 2003-24631 A | 1/2003 |
| JP | 2011-95547 A | 5/2011 |
| JP | 2011-101677 A | 5/2011 |
| JP | 2012-93934 A | 5/2012 |
| JP | 2013-9748 A | 1/2013 |
| WO | 2005/059733 A1 | 6/2005 |

OTHER PUBLICATIONS

Widestrom et al., The collaborative cube puzzle: a comparison of virtual and real environments, ACM, 2000, pp. 166-171.*
Heldal et al., Immersiveness and Symmetry in Copresent Scenarios, Mar. 12-16, 2006, pp. 171-178, Proceedings of the IEEE Virtual Reality 2005.*
International Search Report dated Jan. 14, 2014, in corresponding International Application No. PCT/JP2013/076080.
Extended European Search Report in EP Application No. 13842947.7 dated Apr. 20, 2016.
Cutler L.D. et al.,"Two-Handed Direct Manipulation on the Responsive Workbench", Proceedings of 1997 Symposium on Interactive 3D Graphics ACM New York, Apr. 27, 1997, pp. 107-114, NY, USA.
Office Action in JP Application No. 2012-214955, dated May 31, 2016, for which an explanation of relevance is attached.

* cited by examiner

FIG.8
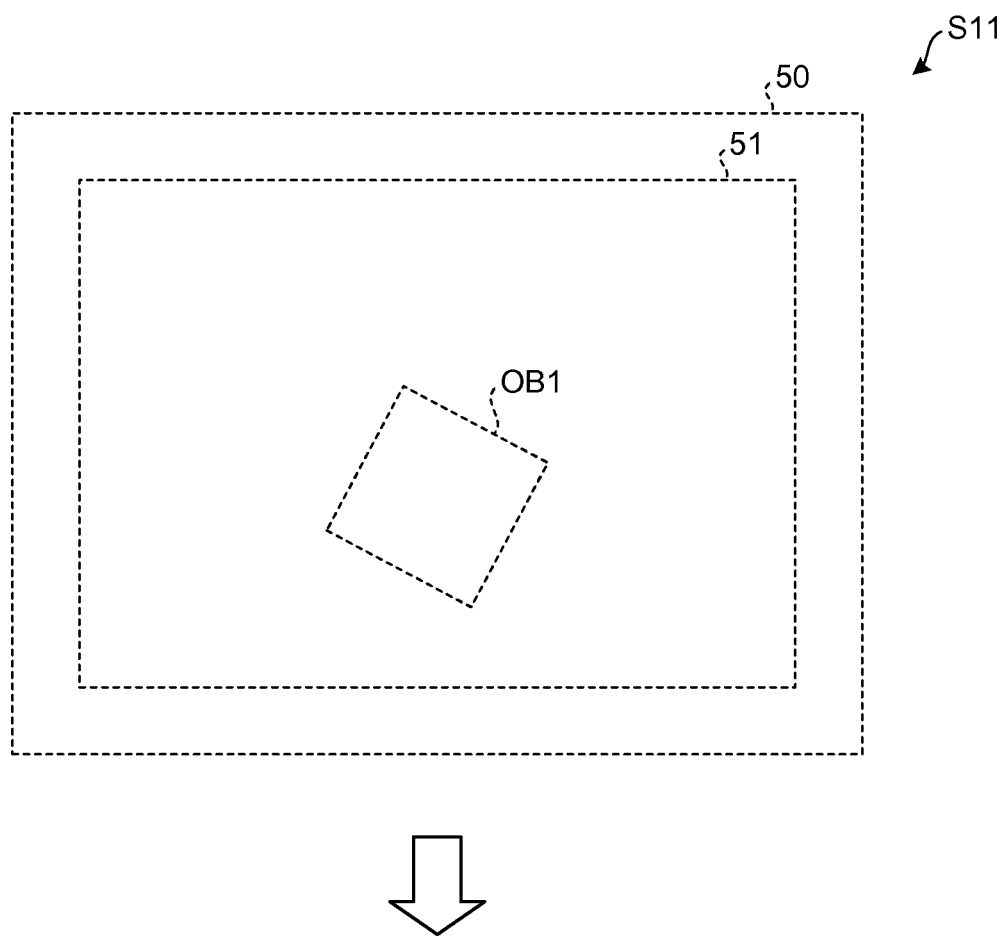
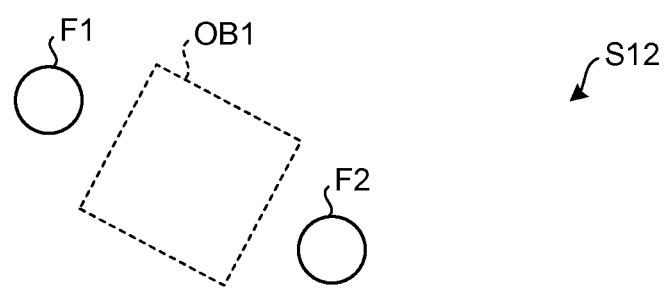

OB1
(BLOCK A)

OB2
(BLOCK B)

OB1
(BLOCK A)

OB2
(BLOCK B)

DISPLAY DEVICE, CONTROL SYSTEM, AND CONTROL PROGRAM

CROSS-REFERENCE TO RELATED APPLICATION

This application is a National Stage of PCT international application Ser. No. PCT/JP2013/076080 filed on Sep. 26, 2013 which designates the United States, incorporated herein by reference, and which is based upon and claims the benefit of priority from Japanese Patent Application No. 2012-214955 filed on Sep. 27, 2012, the entire contents of which are incorporated herein by reference.

FIELD

The present disclosure relates to a display device, a control system, and a control program.

BACKGROUND

Among display devices that include a display unit, such as mobile phones, there are ones that can stereoscopically display images and the like (for example, see Patent Literature 1). The stereoscopic display is realized using binocular parallax.

Further, there is a game device that can execute an application of a 3D game (for example, see Patent Literature 2). For example, the game device described in Patent Literature 2 executes a 3D game using a cubic puzzle displayed in three-dimensional computer graphics.

CITATION LIST

Patent Literature

Patent Literature 1: JP 2011-95547 A
Patent Literature 2: JP 2011-101677 A

Technical Problem

Although the stereoscopic display is a display format that is friendly to users, the stereoscopic display is used only for the purpose of viewing and is not used for improving convenience of operations in the conventional display devices. Further, although there are applications of 3D games such as the cubic puzzle, only one specific object can be selected with an operation button or the like at a time, and it takes time to get used to the operation in the conventional game devices.

For the foregoing reasons, there is a need for a display device, a control system, and a control program, which can provide the users with a highly convenient operation method in 3D applications.

SUMMARY

A according to an aspect, a display device includes: a display unit configured to stereoscopically display an aggregation configured from a plurality of regular hexahedrons arrayed along mutually perpendicular three directions, in a display space, by displaying images respectively corresponding to both eyes of a user by being worn; a detection unit configured to detect movement of a body in the display space; and a control unit configured to change positions of the regular hexahedrons of the aggregation according to a detection result of the detection unit. Each of six faces of the aggregation includes external faces of the regular hexahedrons as elements, and notations with which whether all of the elements on the same face of the aggregation belong to a same group is discriminative are provided to the respective elements. The control unit controls the regular hexahedrons to be pivoted such that, of the six faces, in faces perpendicular to a first direction of the mutually perpendicular three directions, positional relationship among the elements that configure each of the faces is not changed, and of the six faces, in a plurality of other faces perpendicular to a second or third direction of the mutually perpendicular three directions, part of the elements that configure each of the plurality of other faces are interchanged among the plurality of other faces, based on the detection result of the detection unit, using the first direction as a rotation axis.

According to another aspect, a display device includes: a display unit configured to stereoscopically display a cubic puzzle in a display space, by displaying images respectively corresponding to both eyes of a user by being worn; a detection unit configured to detect movement of a body in the display space; and a control unit configured to change a position of a piece of the cubic puzzle according to a detection result of the detection unit.

According to another aspect, a control system includes a display device and a control device. The display device includes: a display unit configured to stereoscopically display an aggregation configured from a plurality of regular hexahedrons arrayed along mutually perpendicular three directions, in a display space, by displaying images respectively corresponding to both eyes of a user by being worn; and a detection unit configured to detect movement of a body in the display space. The control device includes a control unit configured to change positions of the regular hexahedrons of the aggregation according to a detection result of the detection unit. Each of six faces of the aggregation includes external faces of the regular hexahedrons as elements, and notations with which whether all of the elements on the same face of the aggregation belong to a same group is discriminative are provided to the respective elements. The control unit controls the regular hexahedrons to be pivoted such that, of the six faces, in faces perpendicular to a first direction of the mutually perpendicular three directions, positional relationship among the elements that configure the each of faces is not changed, and of the six faces, in a plurality of other faces perpendicular to a second or third direction of the mutually perpendicular three directions, part of the elements that configure each of the plurality of other faces are interchanged among the plurality of other faces, based on the detection result of the detection unit, using the first direction as a rotation axis.

According to another aspect, a control system includes a display device and a control device. The display device includes: a display unit configured to stereoscopically display an aggregation configured from a plurality of regular hexahedrons arrayed along mutually perpendicular three directions, in a display space, by displaying images respectively corresponding to both eyes of a user by being worn; and a detection unit configured to detect movement of a body in the display space. The control device includes a control unit configured to change positions of the regular hexahedrons of the aggregation according to a detection result of the detection unit. Each of six faces of the aggregation includes external faces of the regular hexahedrons as elements, and notations with which whether all of the elements on the same face of the aggregation belong to a same group is discriminative are provided to the respective elements. The control unit controls the regular hexahedrons to be pivoted such that, of the six faces, in faces perpendicular to a first direction of the mutually perpendicular three directions, positional relationship among the elements that configure the each of faces is not changed, and of the six faces, in a plurality of other faces perpendicular to a second or third direction of the mutually perpendicular three directions, part of the elements that configure each of the plurality of other faces are interchanged among the plurality of other faces, based on the detection result of the detection unit, using the first direction as a rotation axis.

According to another aspect, a display device includes: a display unit configured to stereoscopically display an aggregation configured from a plurality of regular polyhedrons arrayed along faces configured by connecting vertexes of a regular polyhedron with N faces (N=4, 6, 8, 12, or 20), in a display space, by displaying images respectively corresponding to both eyes of a user by being worn; a detection unit configured to detect movement of a body in the display space; and a control unit configured to change positions of the regular polyhedrons of the aggregation according to a detection result of the detection unit. Each of faces of the aggregation includes external faces of the regular polyhedrons as elements, and notations with which whether all of the elements on the same face of the aggregation belong to a same group is discriminative are provided to the respective elements. The control unit controls the regular polyhedrons to be pivoted such that on a first face of the faces, and further on a second face parallel to the first face when there is the second face, positional relationship among the elements is not changed and, on a plurality of other faces intersecting with the first face, or either on a plurality of other faces intersecting with the second face or on a plurality of other faces intersecting with the first face when there is the second face, part of the elements that configure the plurality of other faces are interchanged among the plurality of other faces, based on the detection result of the detection unit, using a direction perpendicular to the first face as a rotation axis.

Advantageous Effects of Invention

One of embodiments of the present invention exhibits an effect to provide the users with a highly convenient operation method in 3D applications.

BRIEF DESCRIPTION OF DRAWINGS

FIG. 8 is a diagram for describing detection of operation with respect to a three-dimensional object in the first embodiment.

DESCRIPTION OF EMBODIMENTS

Hereinafter, embodiments will be described in details with reference to the drawings. The present invention is not limited by the description below. Configuration elements in the description below include things which can be easily conceived by a person skilled in the art, which are substantially the same, and which are so-called equivalents. Hereinafter, as one of examples of a three-dimensional object, a regular hexahedron-type cubic puzzle (so-called Rubik's Cube (registered trademark), or the like) will be described. However, an application of the present invention is not limited to the regular hexahedron cubic puzzle, and the present invention can be applied to cubic puzzles known by a person skilled in the art.

Embodiment 1

Figure 1:
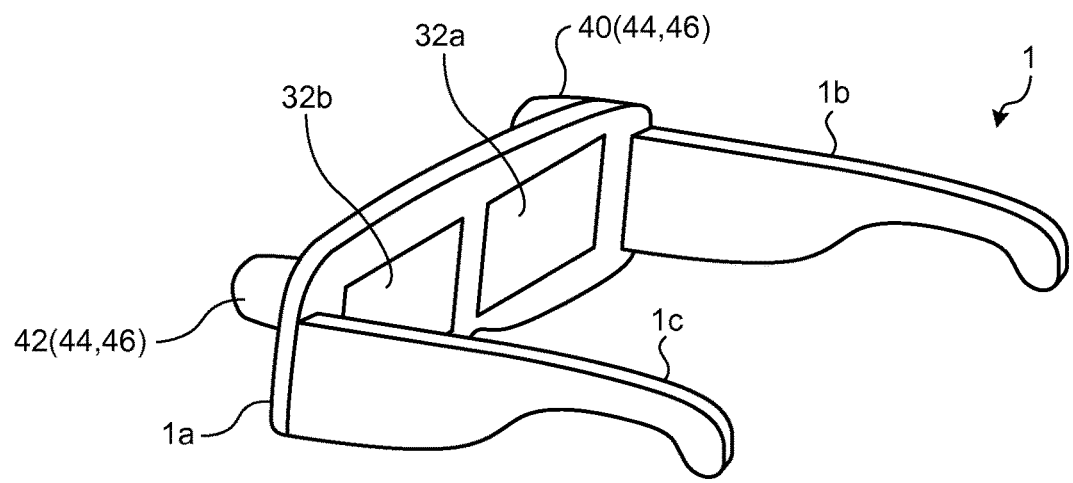
FIG. 1 is a perspective view of a display device according to a first embodiment.
Figure 2:
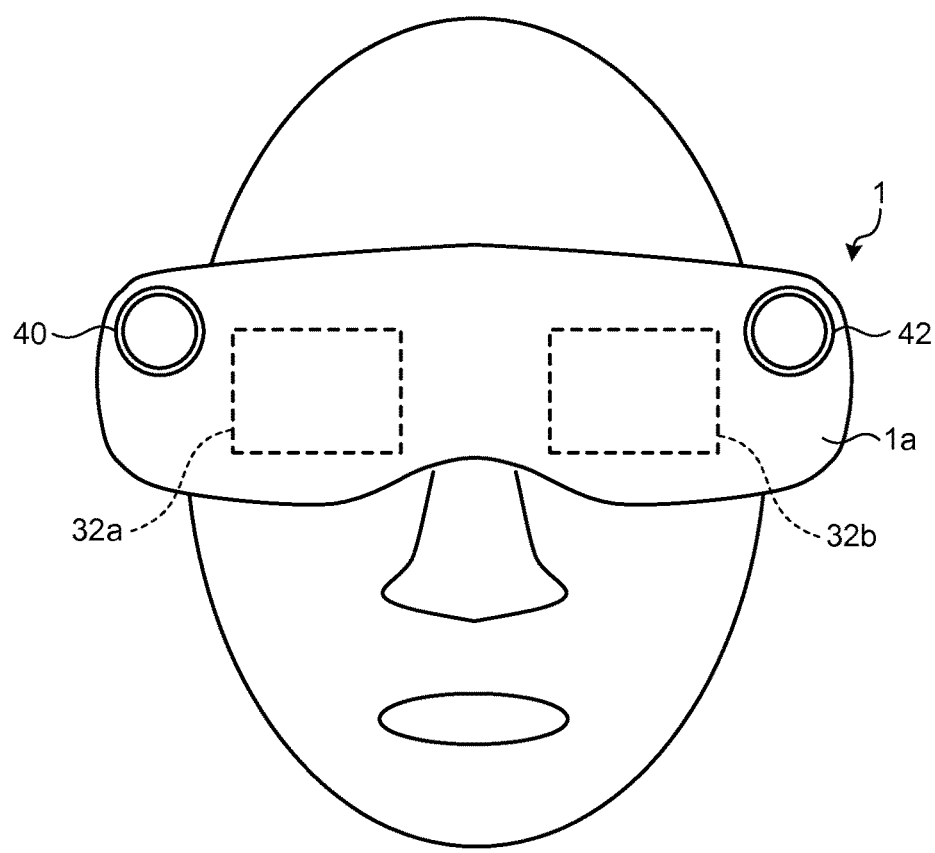
FIG. 2 is a diagram of the display device worn by a user as viewed from the front.

First of all, an overall configuration of a display device 1 according to a first embodiment will be described with reference to FIGS. 1 and 2. FIG. 1 is a perspective view of the display device 1. FIG. 2 is a diagram of the display device 1 worn by a user as viewed from the front. As illustrated in FIGS. 1 and 2, the display device 1 is a head mount type device that is worn on the head of the user.

The display device 1 includes a front portion 1a, a side portion 1b, and a side portion 1c. The front portion 1a is arranged in front of the user to cover both eyes of the user when being worn by the user. The side portion 1b is connected to one end portion of the front portion 1a, and the side portion 1c is connected to the other end portion of the front portion 1a. The side portion 1b and the side portion 1c are supported by ears of the user like temples of eyeglasses when being worn, and stabilize the display device 1. The side portion 1b and the side portion 1c may be configured to be connected at the rear of the head of the user when being worn.

The front portion 1a includes a display unit 32a and a display unit 32b on a side facing the eyes of the user when being worn. The display unit 32a is arranged at a position facing a right eye of the user when being worn, and the display unit 32b is arranged at a position facing a left eye of the user when being worn. The display unit 32a displays an image for the right eye, and the display unit 32b displays an image for the left eye. As described above, the display device 1 can realize three-dimensional display using binocular parallax by including the display units 32a and 32b that display the images corresponding to the respective eyes of the user when being worn.

The display units 32a and 32b may be configured from one display device as long as the device can independently provide different images for the right eye and the left eye of the user. For example, the one display device may be configured to independently provide the different images for the right eye and the left eye by quickly switching a shutter that shields one eye so that only the other eye can see a displayed image. The front portion 1a may be configured to cover the eyes of the user so that light from outside does not enter the eyes of the user when being worn.

The front portion 1a includes an imaging unit 40 and an imaging unit 42 on a face opposite to the face where the display unit 32a and the display unit 32b are provided. The imaging unit 40 is arranged near one end portion (a right eye side when being worn) of the front portion 1a, and the imaging unit 42 is arranged near the other end portion (a left eye side when being worn) of the front portion 1a. The imaging unit 40 acquires an image in a range corresponding to a field of view of the right eye of the user. The imaging unit 42 acquires an image in a range corresponding to a field of view of the left eye of the user. The field of view referred to here is, for example, a field of view of when the user sees the front.

The display device 1 displays an image captured by the imaging unit 40 in the display unit 32a as an image for the right eye, and displays an image captured by the imaging unit 42 in the display unit 32b as an image for the left eye. Therefore, the display device 1 can provide the user who wears the display device 1 with a scene similar to a scene that is viewed by the user who does not wear the display device 1, even if the field of view is shielded by the front portion 1a.

The display device 1 has a function to three-dimensionally display virtual information, and to enable the user to operate the virtual information, in addition to the function to provide the user with a real scene as described above. According to the display device 1, the virtual information is superimposed on the real scene and displayed as if actually existed. The user can operate the virtual information as if the user actually touched the virtual information using a hand, for example, and apply change such as movement, rotation, deformation, or the like to the virtual information. As described above, the display device 1 provides an intuitive and highly convenient operation method in regard to the virtual information. In the description below, the virtual information that is three-dimensionally displayed by the display device 1 may be called "three-dimensional object".

The display device 1 provides the user with a wide field of view similar to a case where the user does not wear the display device 1. Further, the display device 1 can arrange a three-dimensional object with an arbitrary size in an arbitrary position in the wide field of view. As described above, the display device 1 can display three-dimensional objects having various sizes in various positions in a wide space without limitation due to size of the display device.

Figure 3:
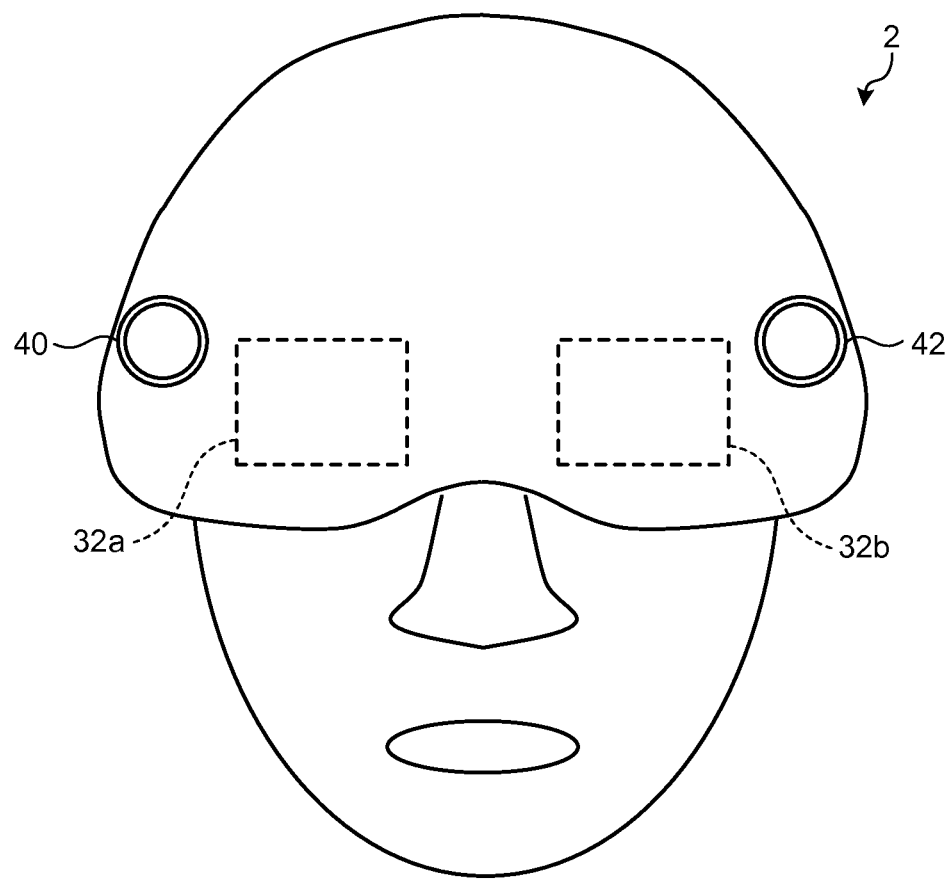
FIG. 3 is a diagram illustrating a modification of a display device.
Figure 4:
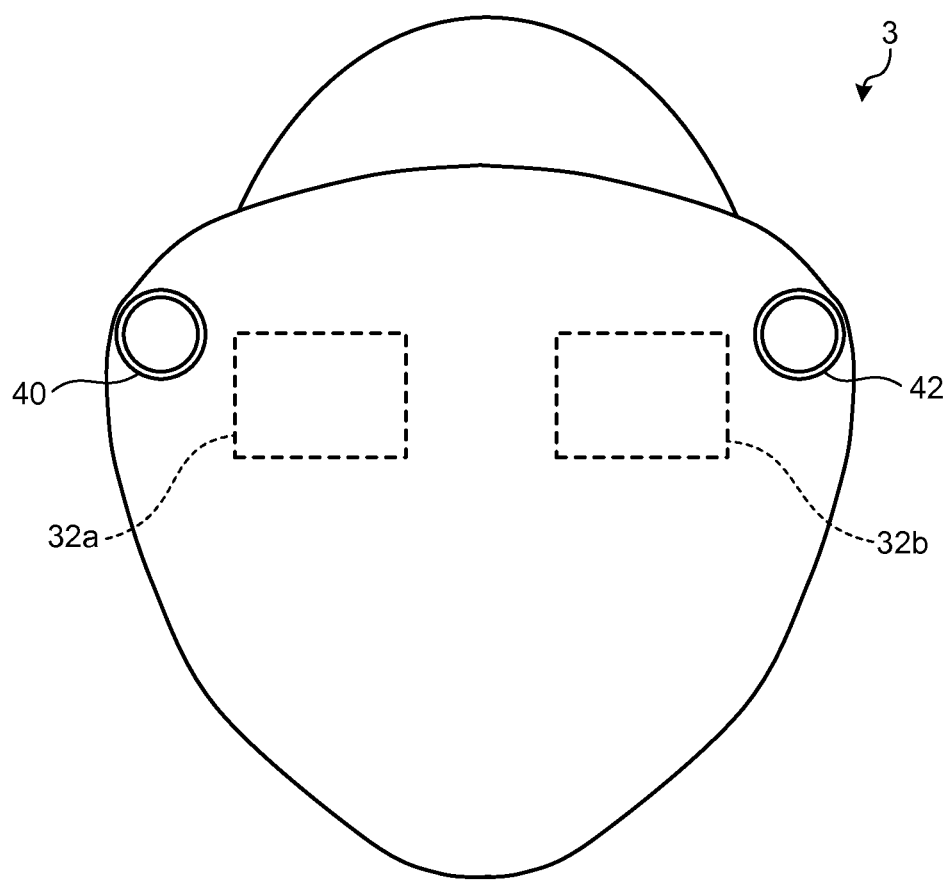
FIG. 4 is a diagram illustrating another modification of a display device.
Figure 5:
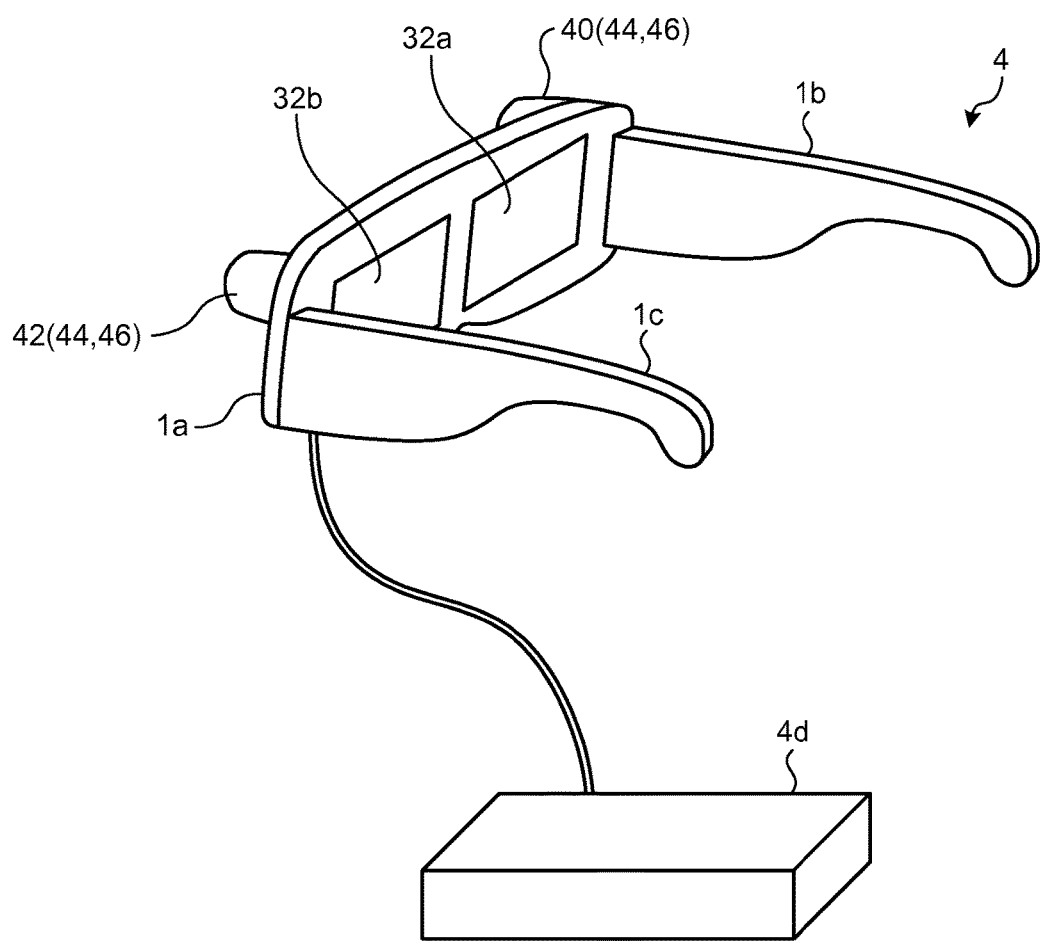
FIG. 5 is a diagram illustrating still another modification of a display device.

While, in FIGS. 1 and 2, one of examples in which the display device 1 has a shape of eyeglasses (goggles) has been described, the shape of the display device 1 is not limited thereto. FIG. 3 is a diagram illustrating a modification of the display device. FIGS. 4 and 5 are diagrams illustrating other modifications of the display device. For example, the display device 1 may have a helmet-type shape that substantially covers an upper half of the head of the user, like a display device 2 illustrated in FIG. 3. Alternatively, the display device 1 may have a mask-type shape that substantially covers the entire face of the user, like a display device 3 illustrated in FIG. 4. The display device 1 may be configured to be connected with an external device 4d such as an information processing device or a battery device in a wireless or wired manner, like a display device 4 illustrated in FIG. 5.

Figure 6:
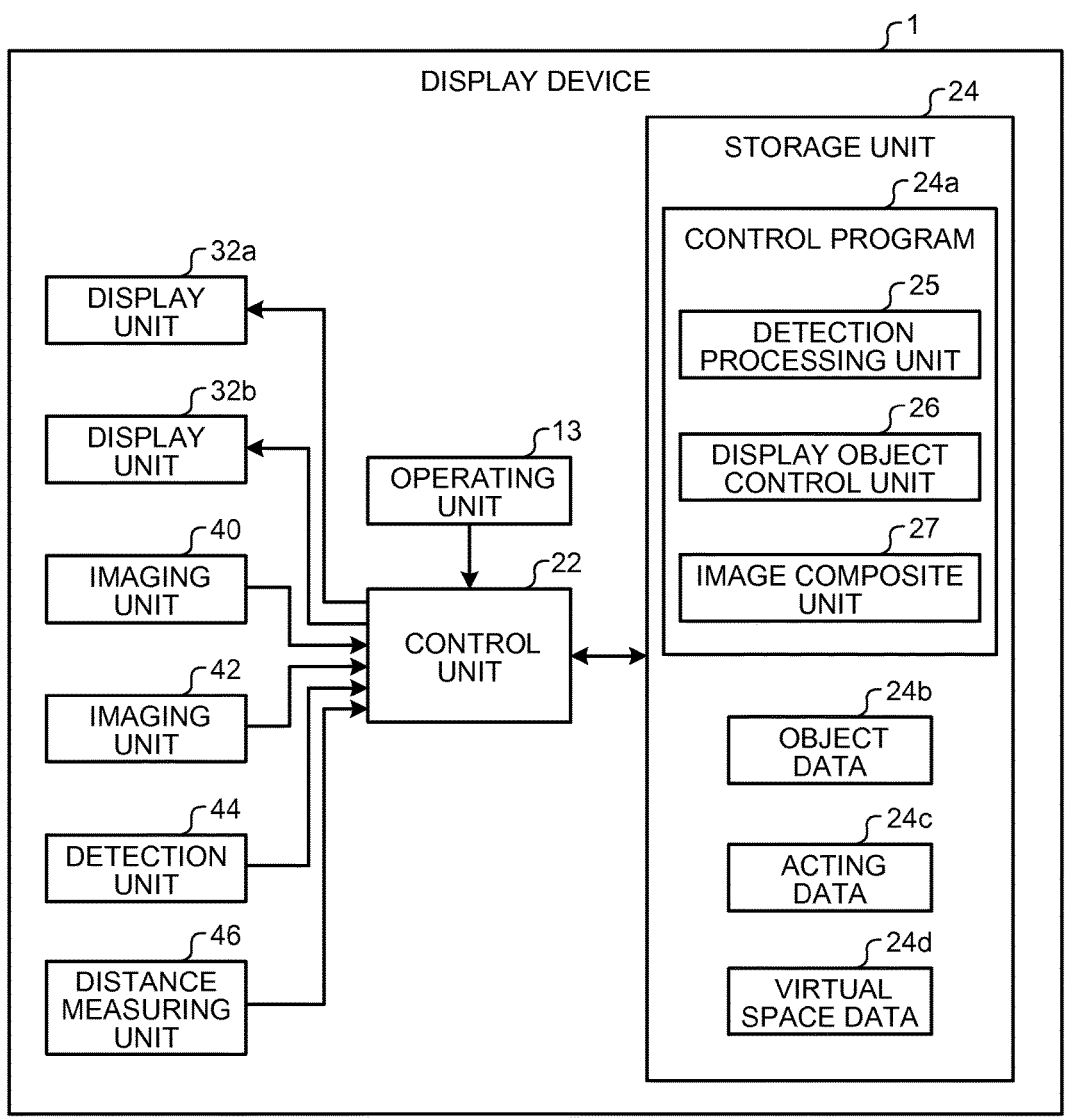
FIG. 6 is a block diagram of the display device according to the first embodiment.

Then, a functional configuration of the display device 1 will be described with reference to FIG. 6. FIG. 6 is a block diagram of the display device 1. As illustrated in FIG. 6, the display device 1 includes an operating unit 13, a control unit 22, a storage unit 24, the display units 32a and 32b, the imaging units 40 and 42, a detection unit 44, and a distance measuring unit 46. The operating unit 13 receives basic operations such as activation, stop, and change of an operation mode of the display device 1.

The display units 32a and 32b include a display device such as a liquid crystal display or an organic electro-luminescence panel, and displays various types of information according to a control signal input from the control unit 22. The display units 32a and 32b may be projection devices that project images on retinas of the user using a light source such as a laser beam or the like.

The imaging units 40 and 42 electronically capture images using an image sensor such as a charge coupled device image sensor (CCD) or a complementary metal oxide semiconductor (CMOS). The imaging units 40 and 42 convert the captured images into signals, and output the signals to the control unit 22.

The detection unit 44 detects a real body existing in image ranges of the imaging units 40 and 42. For example, the detection unit 44 detects a body that is matched with a shape registered in advance (for example, a shape of a hand of a human), among real bodies existing in the image ranges. Even about a body, the shape of which is not registered in advance, the detection unit 44 may detect a range (the shape and the size) of the real body in the image based on brightness and/or chroma of pixels, edges of hue, and the like.

The distance measuring unit 46 measures distances to the real body existing in the image ranges of the imaging units 40 and 42. The distances to the real body are measured, for respective eyes, with respect to the positions of the respective eyes of the user who wears the display device 1. Therefore, when reference positions with which the distance measuring unit 46 measures the distances are deviated from the positions of the respective eyes, measured values of the distance measuring unit 46 are corrected to express the distances to the positions of the eyes according to the deviation.

In the present embodiment, the imaging units 40 and 42 function as both of the detection unit 44 and the distance measuring unit 46. That is, in the present embodiment, the imaging units 40 and 42 detect the body in the image ranges by analyzing the images captured by the imaging units 40 and 42. Further, the imaging units 40 and 42 measure (calculate) the distance to the body by comparing the body included in the image captured by the imaging unit 40 and the body included in the image captured by the imaging unit 42.

The display device 1 may include the detection unit 44 separately from the imaging units 40 and 42. The detection unit 44 may be a sensor that detects the real body existing in the image ranges using at least one of visible light, infrared light, ultraviolet rays, a radio wave, a sound wave, magnetism, and capacitance, for example. The display device 1 may include the distance measuring unit 46 separately from the imaging units 40 and 42. The distance measuring unit 46 may be a sensor that detects the distance to the real body existing in the image ranges using at least one of the visible light, infrared light, ultraviolet rays, a radio wave, a sound wave, magnetism, and capacitance, for example. The display device 1 may include a sensor that can function as both of the detection unit 44 and the distance measuring unit 46, like a sensor using a time-of-flight (TOF) method.

The control unit 22 includes a central processing unit (CPU) as calculation means, and a memory as storage means, and realizes various functions by executing a program using these hardware resources. To be specific, the control unit 22 reads out a program and data stored in the storage unit 24 and loads the program and data to the memory, and causes the CPU to execute commands included in the program loaded to the memory. The control unit 22 then reads/writes data from/to the memory and the storage unit 24, and controls operations of the display unit 32a and the like, according to execution results of the commands by the CPU. When the CPU executes the commands, the data loaded to the memory, and the operation detected through the detection unit 44 are used as a part of parameters or determination conditions.

The storage unit 24 is constituted of a non-volatile storage device such as a flash memory, and stores therein various programs and data. The programs stored in the storage unit 24 include a control program 24a. The data stored in the storage unit 24 include object data 24b, acting data 24c, and virtual space data 24d. The storage unit 24 may be configured by a combination of a portable storage medium such as a memory card, and a read/write device that perform reading/writing from/to the storage medium. In this case, the control program 24a, the object data 24b, the acting data 24c, and the virtual space data 24d may be stored in the storage medium. Further, the control program 24a, the object data 24b, the acting data 24c, and the virtual space data 24d may be acquired from another device such as a server by wireless or wired communication.

The control program 24a provides functions related to various types of control for operating the display device 1. The functions provided by the control program 24a include a function to superimpose a three-dimensional object on the images acquired by the imaging units 40 and 42 and display the superimposed images in the display units 32a and 32b, a function to detect operation to the three-dimensional object, a function to change the three-dimensional object according to the detected operation, and the like. The control program 24a enables the user to enjoy stereoscopic play described below by controlling the display of the three-dimensional object and detecting the operation to the three-dimensional object.

The control program 24a includes a detection processing unit 25, a display object control unit 26, and an image composite unit 27. The detection processing unit 25 provides a function for detecting the real body existing in the image ranges of the imaging units 40 and 42. The function provided by the detection processing unit 25 includes a function to measure the distances to the detected respective bodies.

The display object control unit 26 provides a function for managing what types of three-dimensional objects are arranged in a virtual space, and in what state each of the three-dimensional objects is. The function provided by the display object control unit 26 includes a function to detect the operation to the three-dimensional object based on movement of the real body detected by the function of the detection processing unit 25, and change the three-dimensional object based on the detected operation.

The image composite unit 27 provides a function for generating an image to be displayed in the display unit 32a and an image to be displayed in the display unit 32b by compositing an image in a real space and an image in the virtual space. The function provided by the image composite unit 27 includes a function to determine front and rear relationship between the real body and the three-dimensional object, and adjust overlapping, based on the distance to the real body measured by the function of the detection processing unit 25, and the distance from a view point in the virtual space to the three-dimensional object.

The object data 24b includes information related to the shape and the properties of the three-dimensional object. The object data 24b is used for displaying the three-dimensional object. The acting data 24c includes information related to how the operation to the displayed three-dimensional object acts on the three-dimensional object. The acting data 24c is used for determining how to change the three-dimensional object when the operation to the displayed three-dimensional object is detected. The change referred to here includes movement, rotation, deformation, disappearance, and the like. The virtual space data 24d holds information related to a state of the three-dimensional object arranged in the virtual space. The state of the three-dimensional object includes, for example, a position, an attitude, a status of deformation, and the like.

Then, one of examples of control based on the functions provided by the control program 24a will be described with reference to FIG. 7. An image P1a is an image obtained by the imaging unit 40, that is, an image corresponding to a scene of the real space viewed by the right eye. In the image P1a, a table T1 and a hand H1 of the user appear. The display device 1 also acquires an image of the same scene imaged by the imaging unit 42, that is, an image corresponding to a scene of the real space viewed by the left eye.

An image P2a is an image for the right eye generated based on the virtual space data 24d and the object data 24b. In this example, the virtual space data 24d holds information related to a state of a block-like three-dimensional object BL1 existing in the virtual space, and the object data 24b holds information related to the shape and the properties of the three-dimensional object BL1. The display device 1 reproduces a virtual space based on these pieces of information, and generates the image P2a that is the reproduced virtual space viewed from a view point of the right eye. The position of the right eye (view point) in the virtual space is determined based on a predetermined rule. Similarly, the display device 1 also generates an image that is the reproduced virtual space viewed from a view point of the left eye. That is, the display device 1 also generates an image that causes the three-dimensional object BL1 to be three-dimensionally displayed in combination with the image P2a.

Figure 7:
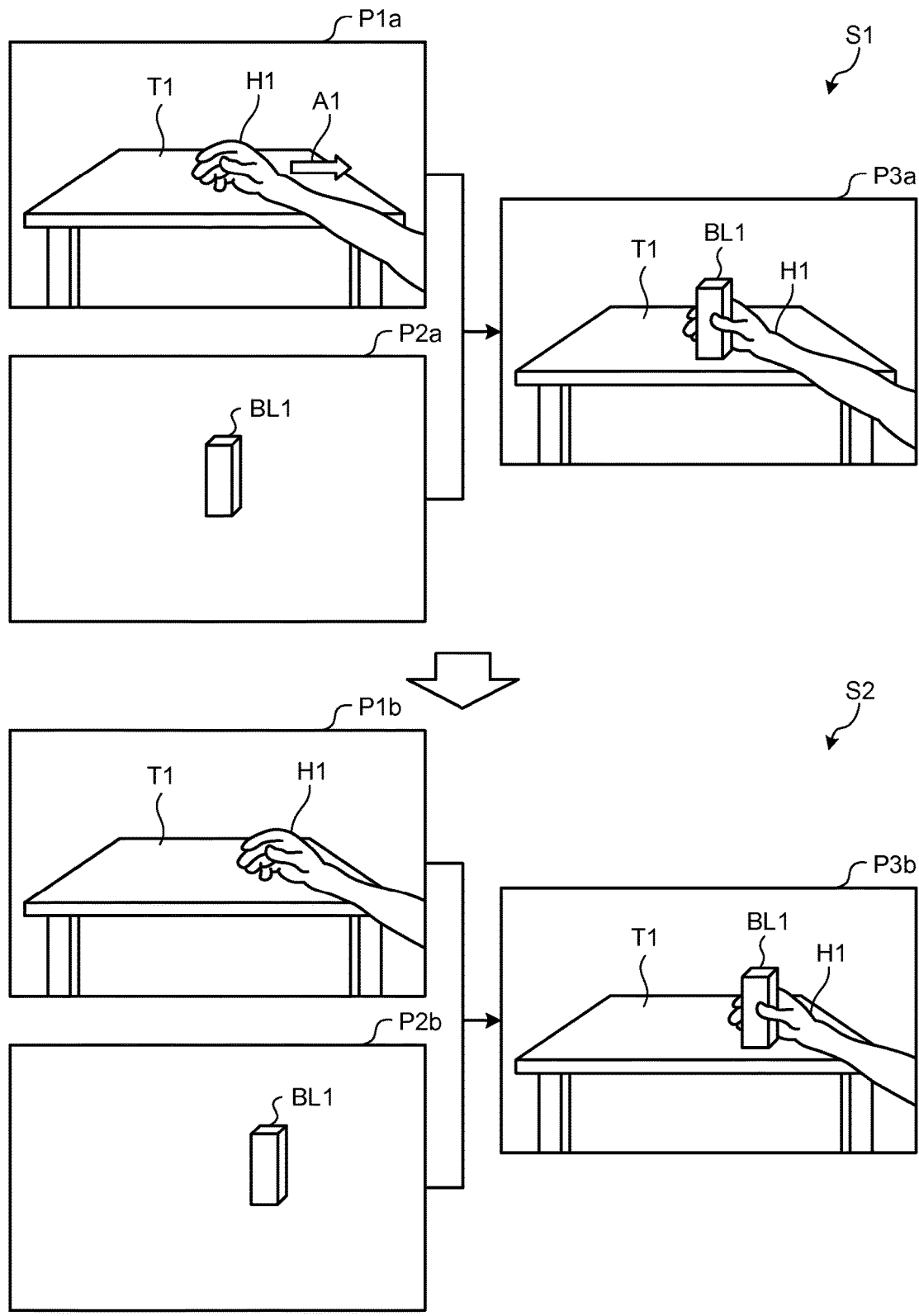
FIG. 7 is a diagram illustrating one of examples of control based on a function provided by a control program.

At Step S1 illustrated in FIG. 7, the display device 1 composites the image P1a and the image P2a to generate an image P3a. The image P3a is an image to be displayed in the display unit 32a as an image for the right eye. At this time, the display device 1 determines the front and rear relationship between the real body existing in the image range of the imaging unit 40 and the three-dimensional object existing in the virtual space using the position of the right eye of the user as a reference point. Then, when the real body and the three-dimensional object overlap with each other, the display device 1 adjusts the overlapping such that one that is closer to the right eye of the user can be seen in front.

Such adjustment of overlapping is performed for each range (for example, for each pixel) of a predetermined size within a region on the image where the real body and the three-dimensional object overlap with each other. Therefore, the distance from a view point to the real body in the real space is measured for each range of a predetermined size on the image. Further, the distance from the view point to the three-dimensional object in the virtual space is calculated for each range of a predetermined size on the image in consideration of the position, the shape, the attitude, and the like of the three-dimensional object.

In the scene of Step S1 illustrated in FIG. 7, in the virtual space, the three-dimensional object BL1 is arranged at a position corresponding to right above a position where the table T1 exists in the real space. Further, in the scene of Step S1 illustrated in FIG. 7, the hand H1 of the user and the three-dimensional object BL1 exist in substantially the same distance in substantially the same direction, using the position of the right eye of the user as a reference point. Therefore, the overlapping is adjusted for each range of a predetermined size, so that the hand H1 appears in front in a portion corresponding to the thumb of the hand H1, and the three-dimensional object BL1 appears in front in other portions, of a region where the hand H1 and the three-dimensional object BL1 overlap with each other, in the composited image P3a. Further, the three-dimensional object BL1 appears in front in a region where the table T1 and the three-dimensional object BL1 overlap with each other.

With such adjustment of overlapping, at Step S1 illustrated in FIG. 7, the image P3a that can be seen as if the three-dimensional object BL1 were placed on the table T1 and the user held the three-dimensional object BL1 by hand H1 is obtained. By similar processing, the display device 1 composites the image captured by the imaging unit 42, and the image of the virtual space viewed from the view point of the left eye to generate an image to be displayed in the display unit 32b as an image for the left eye. When the image for the left eye is generated, the overlapping of the real body and the three-dimensional object is adjusted using the position of the left eye of the user as a reference point.

The display device 1 displays the composite images generated as described above in the display units 32a and 32b. As a result, the user can see the scene that is as if the three-dimensional object BL1 were placed on the table T1, and the user held the three-dimensional object BL1 with own hand H1.

In the scene of Step S2 illustrated in FIG. 7, the user moves the hand H1 in the direction of an arrow A1. In this case, an image obtained by the imaging unit 40 is changed to an image P1b in which the position of the hand H1 is moved to the right. Further, the display device 1 determines that the movement of the hand H1 is operation to move the three-dimensional object to the right while holding the three-dimensional object, and moves the position of the three-dimensional object to the right in the virtual space according to the operation. The movement of the three-dimensional object in the virtual space is reflected in the virtual space data 24d. As a result, the image for the right eye generated based on the virtual space data 24d and the object data 24b is changed to an image P2b in which the position of the three-dimensional object BL1 is moved in the right. Details of detection of the operation by the display device 1 will be described below.

The display device 1 composites the image P1b and the image P2b to generate an image P3b for the right eye. The image P3b is an image that can be seen as if the user held the three-dimensional object BL1 with the hand H1 at a more right side on the table T1 than the image P3a. Similarly, the display device 1 generates a composite image for the left eye. The display device 1 then displays the composite images generated as described above in the display units 32a and 32b. As a result, the user can see the scene that is as if the own hand H1 had held the three-dimensional object BL1 and moved it to the right.

Such update of the composite images for display is executed at a frequency (for example, 30 times per second) equivalent to a typical frame rate of a moving image. As a result, the change of the three-dimensional object according to the operation of the user is reflected to the image to be displayed in the display device 1 substantially in real time, and the user can operate the three-dimensional object as if the object actually existed, without a feeling of strangeness. Further, in the configuration according to the present embodiment, the hand of the user, which operates the three-dimensional object, is not positioned between the eyes of the user and the display units 32a and 32b, and thus the user can perform operation without caring about the display of the three-dimensional object being shielded by the hand.

Then, detection of operation with respect to the three-dimensional object in a play will be described with reference to FIG. 8. In the descriptions below, a space viewed by the user who wears the display device 1 may be called display space. FIG. 8 is a diagram for describing detection of operation with respect to the three-dimensional object. At Step S11 illustrated in FIG. 8, a three-dimensional object OB1 is stereoscopically displayed in a display space 50 by the display units 32a and 32b. The three-dimensional object OB1 is an object that is modeled on a cube, for example. In the present embodiment, the cube is an aggregation (so-called Rubik's Cube (registered trademark) or the like) that is configured such that a plurality of regular hexahedrons is arrayed along mutually perpendicular three directions. Each of six faces of the aggregation includes external faces of the regular hexahedrons as elements. In the respective elements, notations with which whether all of the elements on the same face of the aggregation belong to the same group is discriminative are provided. The discriminative notation includes a color, a mark, a character, a number, a pattern, and the like.

The display device 1 may limit the space where the operation to the three-dimensional object is detected to an operable range 51. The operable range 51 is, for example, a range that the hand of the user who wears the display device 1 can reach. The space where the operation to the three-dimensional object is detected is limited in this way, whereby a load of calculation processing executed by the display device 1 in order to detect the operation can be reduced.

Assume that the user wishes to perform some sort of operation to the three-dimensional object OB1. To perform some sort of operation to the three-dimensional object OB1, first of all, it is necessary to select the three-dimensional object OB1 as an object to be operated. To select the three-dimensional object OB1, as illustrated at Step S12, the user moves a finger F1 and a finger F2 such that the three-dimensional object OB1 is positioned between the finger F1 and the finger F2, and maintains the state for a predetermined time or more.

When two bodies have been detected in the display space, and the state where the three-dimensional object OB1 is positioned between the two bodies has been maintained for a predetermined time or more, the display device 1 determines that the three-dimensional object OB1 has been selected, and causes the three-dimensional object OB1 to be in a selected state. The display device 1 then notifies the user of the fact that the three-dimensional object OB1 becomes in the selected state, by changing a display style of the three-dimensional object OB1, or the like.

The notification of the fact that the three-dimensional object OB1 becomes in the selected state is realized by, for example, changing the entire color of the three-dimensional object OB1, or changing a color of a vicinity of a position that intersects with a straight line, which connects the two bodies, of a surface of the three-dimensional object OB1. Notification by a sound and/or vibration may be performed in place of such visual notification, or in addition to such visual notification.

As described above, the display device 1 determines that the three-dimensional object OB1 has been selected, when the state where the three-dimensional object OB1 is positioned between the real bodies such as the fingers has been continuously detected for a predetermined time or more. The operation to arrange the fingers to sandwich the three-dimensional object OB1 between the fingers is similar to operation by a human to hold the object in order to select the real object. Therefore, such operation can be intuitively understood as the operation to select the three-dimensional object OB1. Further, by adding the continuous detection of the state for the predetermined time or more as a condition, selection of an unintended three-dimensional object OB1 can be prevented, during the process of moving the fingers for selecting another three-dimensional object OB1.

The bodies used for operating the three-dimensional object OB1 are not limited to the fingers, and hands, feet, sticks, pins, or the like may be used.

To stereoscopically determine whether the three-dimensional object OB1 has been selected, it is desirable to prepare a plurality of imaging units and image the finger F1 and the finger F2, and the like from different directions so that an obstacle does not create a blind spot.

After determining that the three-dimensional object OB1 becomes in the selected state, the display device 1 applies change, such as movement, rotation, deformation, or the like to the three-dimensional object OB1 according to the movement of the finger F1 and the finger F2.

Then, a processing procedure executed by the display device 1 in regard to the operation of the three-dimensional object OB1 will be described with reference to FIGS. 9 to 12.

Figure 9:
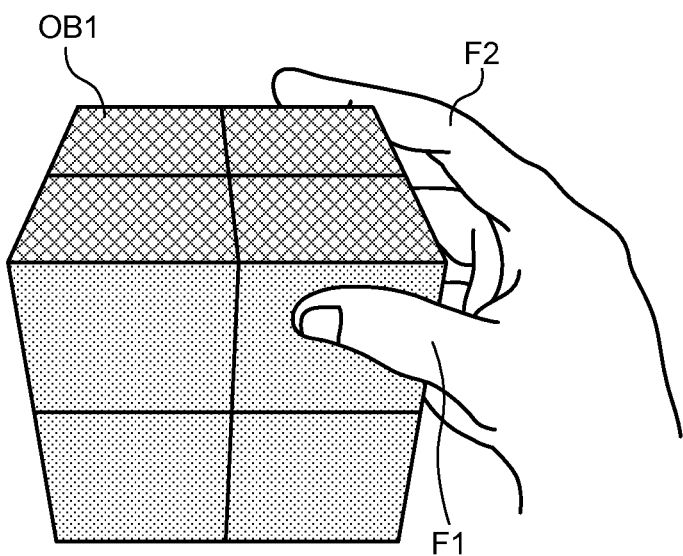
FIG. 9 is a diagram illustrating one of examples of selection and operation with respect to a three-dimensional object.
Figure 10:
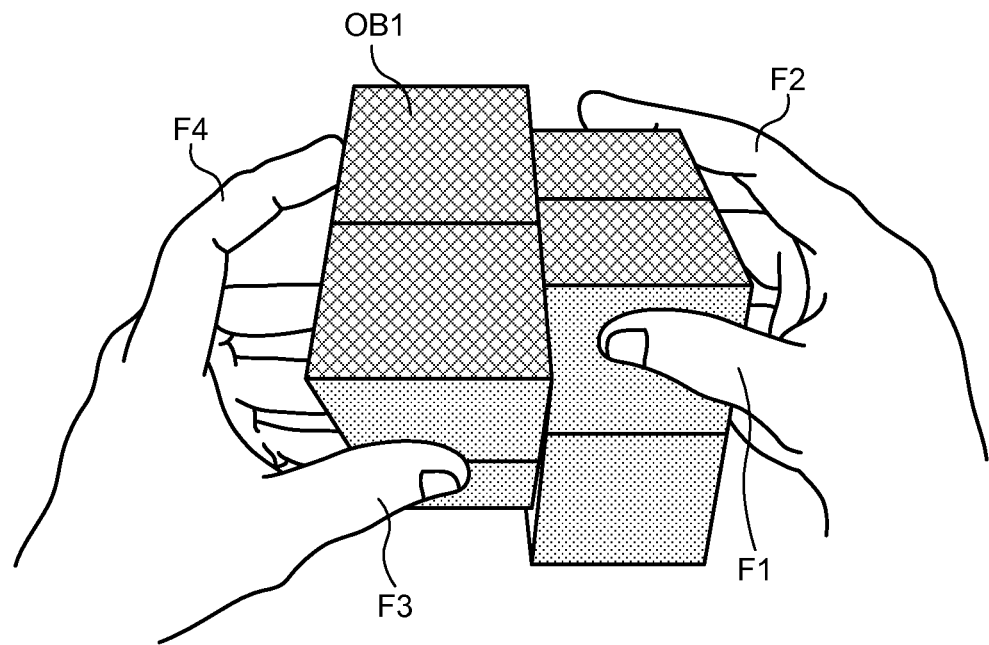
FIG. 10 is a diagram illustrating another example of selection and operation with respect to a three-dimensional object.

FIG. 9 is a diagram illustrating one of examples of selection and operation with respect to the three-dimensional object OB1. FIG. 10 is a diagram illustrating another example of the selection and operation with respect to the three-dimensional object OB1. In the present embodiment, a cubic puzzle, which is an aggregation configured such that a plurality of regular hexahedrons is arrayed along mutually perpendicular three directions, is used as the three-dimensional object OB1. Hereinafter, in the examples illustrated in FIGS. 9 to 12, as the three-dimensional object OB1 of the cubic puzzle, a 2×2×2-type Pocket Cube of a regular hexahedron-type cubic puzzle from among regular polyhedron-type cubic puzzles will be described as illustrated in FIGS. 9 and 10. The entire three-dimensional object OB1 can be rotated as it is, as illustrated in FIG. 9, or faces configured from a plurality of regular hexahedrons can be relatively rotated around an arbitrary axis, as illustrated in FIG. 10. Relationship between input operation and processing executed with respect to the three-dimensional object OB1 will be described below. The three-dimensional object OB1 is not limited to the 2×2×2-type Pocket Cube, and various cubic puzzles may be employed. For example, a 3×3×3-type Rubik's Cube (registered trademark), a 4×4×4-type Rubik's Revenge, a 5×5×5-type Professor's Cube, and the like may be employed.

Figure 11:
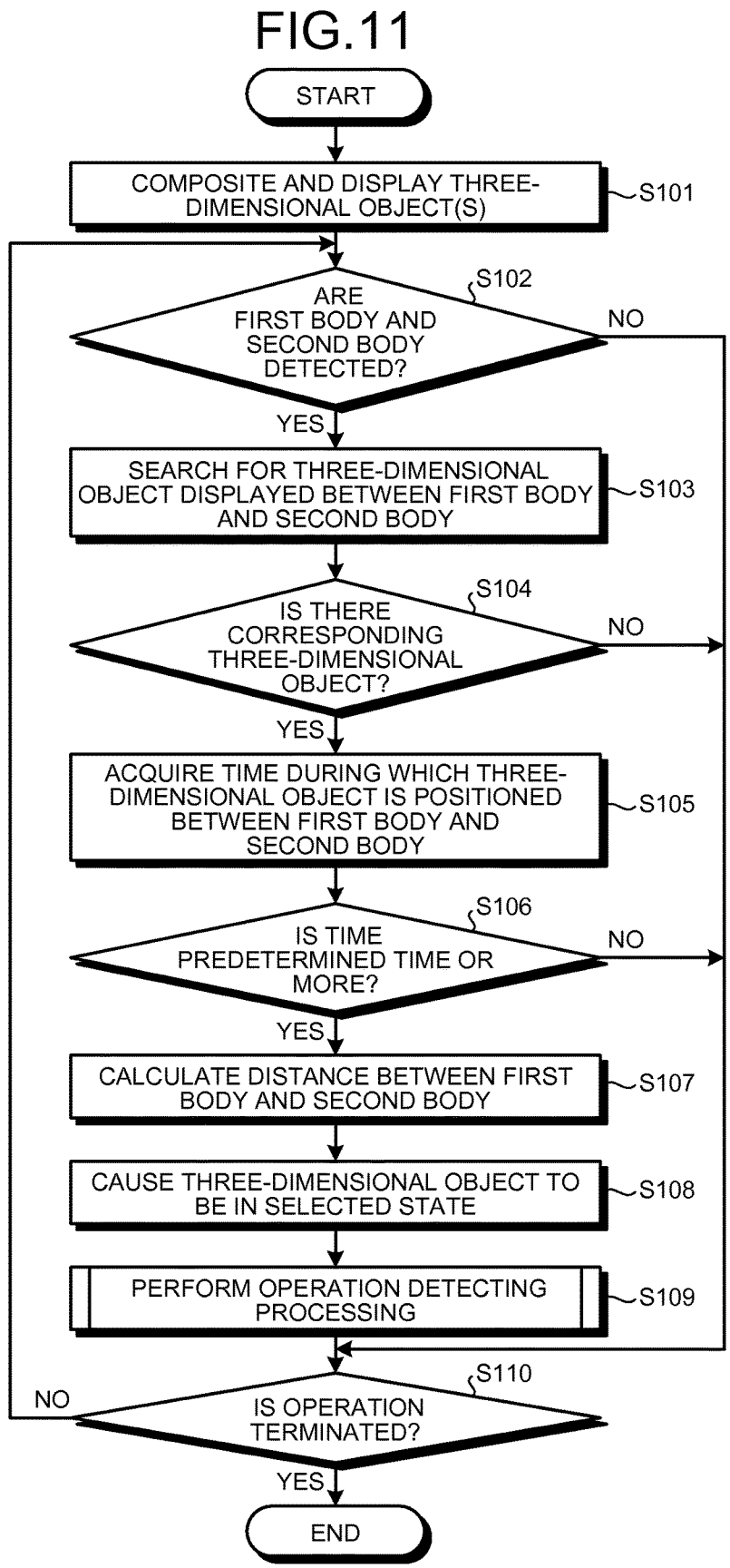
FIG. 11 is a flowchart illustrating a processing procedure of selection detecting processing.

FIG. 11 is a flowchart illustrating a processing procedure of selection detecting processing of the three-dimensional object OB1. The processing procedure illustrated in FIG. 11 is realized by the control unit 22 that executes the control program 24a.

As illustrated in FIG. 11, first of all, at Step S101, the control unit 22 composites the image in the virtual space including the three-dimensional object(s) and the image in the real space and displays a composite image. To be specific, the control unit 22 stereoscopically displays the aggregation (three-dimensional object), which is configured such that a plurality of regular hexahedrons is arrayed along mutually perpendicular three directions, in the display space by the display unit 32a, as illustrated in FIGS. 9 and 10. That is, the control unit 22 controls the display unit 32a to stereoscopically display the cubic puzzle (three-dimensional object) in the display space. Data for displaying the three-dimensional object OB1 may be stored in the storage unit 24 in advance, or may be acquired from another device, such as a server, by communication.

Subsequently, at Step S102, the control unit 22 determines whether a first body and a second body have been detected by the detection unit 44, that is, by the imaging units 40 and 42. The first body and the second body are the fingers of the user, for example.

That is, the control unit 22 controls the detection unit 44 to detect movement of bodies (including the first body and the second body) in the display space. To be specific, in the present embodiment, the control unit 22 controls the detection unit 44 to detect that there are bodies (the first body and the second body) at a position where the bodies hold the three-dimensional object OB1 (a state where the three-dimensional object OB1 is held with one hand), as illustrated in FIG. 9. Further, the control unit 22 controls the detection unit 44 to detect two pairs of bodies that hold the three-dimensional object OB1 at two places (a state where the three-dimensional object OB1 is held with both hands), as illustrated in FIG. 10. Although not illustrated, the control unit 22 may control the detection unit 44 to detect the two pairs of bodies that hold the three-dimensional object OB1 at two places (the state of holding the three-dimensional object OB1 with both hands), and to further detect another body (for example, a free finger, a hand of another user, or the like) different from the two pairs of bodies.

When the first body and the second body are not detected (No at Step S102), then at Step S110, the control unit 22 determines whether operation termination has been detected.

The operation termination may be detected when predetermined operation to the operating unit 13 is performed, for example. The operation termination may be detected when a predetermined gesture with a hand of the user is imaged in at least one of the imaging units 40 and 42. When the operation termination has been detected (Yes at Step S110), the control unit 22 terminates the selection detecting processing. When the operation termination is not detected (No at Step S110), the control unit 22 re-executes Step S102 and the subsequent steps.

When the first body and the second body have been detected (Yes at Step S102), then at Step S103, the control unit 22 searches the displayed three-dimensional object(s) OB1 for a three-dimensional object OB1 displayed between the first body and the second body. When there is no corresponding three-dimensional object OB1 (No at Step S104), then at Step S110, the control unit 22 determines whether the operation termination has been detected. When the operation termination has been detected (Yes at Step S110), the control unit 22 terminates the selection detecting processing. When the operation termination is not detected (No at Step S110), the control unit 22 re-executes Step S102 and the subsequent steps.

When the three-dimensional object OB1 displayed between the first body and the second body has been found (Yes at Step S104), then at Step S105, the control unit 22 acquires a time during which the three-dimensional object OB1 is positioned between the first body and the second body. When the acquired time is less than a predetermined time (No at Step S106), then at Step S110, the control unit 22 determines whether the operation termination has been detected. When the operation termination has been detected (Yes at Step S110), the control unit 22 terminates the selection detecting processing. When the operation termination is not detected (No at Step S110), the control unit 22 re-executes Step S102 and the subsequent steps.

When the acquired time is the predetermined time or more (Yes at Step S106), then at Step S107, the control unit 22 calculates the distance between the first body and the second body. Then, at Step S108, the control unit 22 causes the three-dimensional object OB1 displayed between the first body and the second body to be in the selected state. Then, at Step S109, the control unit 22 executes operation detecting processing described below, and changes the three-dimensional object OB1 in the selected state according to detected operation in the processing. After the operation detecting processing is terminated, then at Step S110, the control unit 22 determines whether the operation termination has been detected. When the operation termination has been detected (Yes at Step S110), the control unit 22 terminates the selection detecting processing. When the operation termination is not detected (No at Step S110), the control unit 22 re-executes Step S102 and the subsequent steps.

Figure 12:
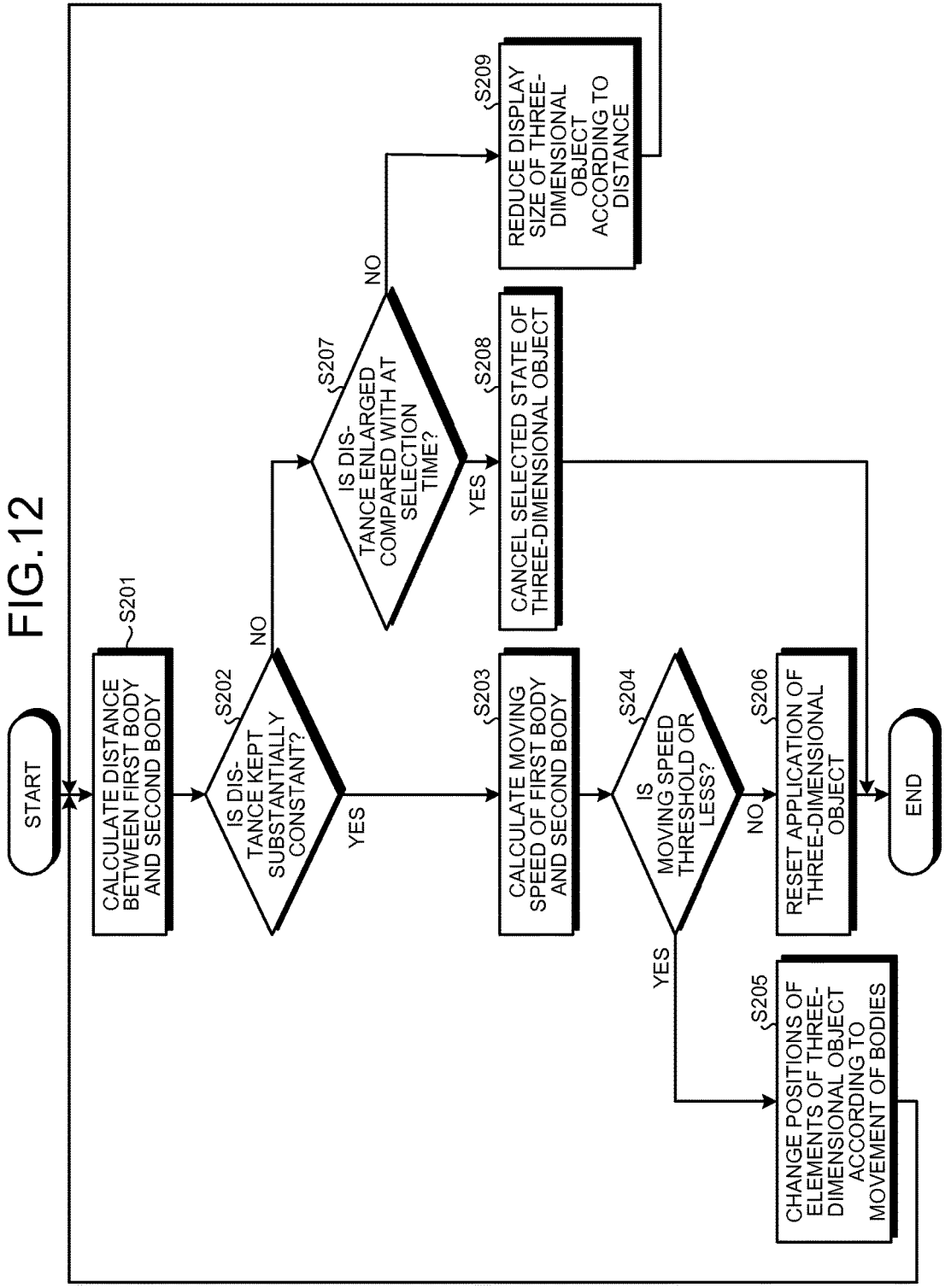
FIG. 12 is a flowchart illustrating a processing procedure of operation detecting processing.

FIG. 12 is a flowchart illustrating a processing procedure of the operation detecting processing. The processing procedure illustrated in FIG. 12 is realized by the control unit 22 that executes the control program 24a.

As illustrated in FIG. 12, first of all, at Step S201, the control unit 22 calculates the distance between the first body and the second body. Then, at Step S202, the control unit 22 determines whether the distance between the first body and the second body at and after start timing of the operation detecting processing is kept substantially constant. The distance being substantially constant means that an amount of change of the distance between the first body and the second body at the current timing falls within a predetermined range (±10% of a maximum amount of change of the distance when the first body and the second body are moved at a normal speed), compared with the distance at the start timing of the operation detecting processing, for example. Alternatively, when the distance between the first body and the second body is continuously reduced at and after the start timing of the operation detecting processing (when the first body and the second body are moved into a direction of squashing the three-dimensional object OB1), the control unit 22 may determine that the distance is kept substantially constant. Further alternatively, when the distance between the first body and the second body is changed only within a range of hand shake, or the like, the control unit 22 may determine that the distance is kept substantially constant.

When the distance between the first body and the second body is kept substantially constant (Yes at Step S202), then at Step S203, the control unit 22 calculates a moving speed of the first body and the second body. Then, at Step S204, the control unit 22 determines whether the calculated moving speed is a threshold or less. The threshold used here is a moving speed of a fingertip of a human when he/she throws an object. The moving speed to be compared with the threshold may be an average speed of the moving speeds of the first body and the second body, or may be a faster one or a slower one of the moving speeds of the first body and the second body.

When the moving speed is the threshold or less (Yes at Step S204), then at Step S205, the control unit 22 moves and/or rotates the three-dimensional object OB1 according to the detected movement of the first body and the second body. To be specific, in the present embodiment, at Step S205, the control unit 22 changes the positions of the elements of the aggregation (three-dimensional object) as illustrated in FIGS. 9 and 10 according to a detection result of the detection unit 44 (that is, the movement of the bodies). That is, the control unit 22 changes the positions of pieces of the cubic puzzle (three-dimensional object) as illustrated in FIGS. 9 and 10 according to the detection result of the detection unit 44. For example, when movement of the first body and the second body in the right direction is detected, the control unit 22 moves the three-dimensional object OB1 in the right direction in accordance with the movement of the first body and the second body. Alternatively, when left-handed rotation of the first body and the second body is detected, the control unit 22 rotates the three-dimensional object OB1 in a left-handed direction in accordance with the rotation of the first body and the second body. Further alternatively, when the movement and the rotation have been detected at the same time, the movement and the rotation are executed at the same time. When there is an obstacle against the movement and/or the rotation of the three-dimensional object OB1, the movement and/or the rotation of the three-dimensional object OB1 may be stopped at timing when the three-dimensional object OB1 comes in contact with the obstacle. Then, the control unit 22 re-executes Step S201 and the subsequent steps.

When the moving speed is larger than the threshold (No at Step S204), then at Step S206, the control unit 22 resets an application (game) of the three-dimensional object OB1. That is, in the present embodiment, the three-dimensional object OB1 is the cubic puzzle, and thus the control unit 22 deletes the three-dimensional object OB1 during the progress of the game of the cubic puzzle, thereby to reset the game to a start time. To be specific, in deleting the three-dimensional object OB1, the control unit 22 may display animation such that the three-dimensional object OB1 flies on to the moving direction of the first body and the second body. Then, the control unit 22 terminates the operation detecting processing. As described above, the three-dimensional object OB1 is deleted when the first body and the second body are moved at a high speed to throw the three-dimensional object OB1, whereby the deletion of the three-dimensional object OB1 (that is, resetting of the application of the three-dimensional object OB1) can be realized with intuitive operation.

When the distance between the first body and the second body is not kept substantially constant (No at Step S202), then at Step S207, the control unit 22 determines whether the distance is enlarged, compared with at the time of selecting the three-dimensional object OB1, that is, the start timing of the operation detecting processing. When the distance is enlarged (Yes at Step S207), then at Step S208, the control unit 22 cancels the selected state of the three-dimensional object OB1. Then, the control unit 22 terminates the operation detecting processing. As described above, the operation to enlarge the distance between the first body and the second body is similar to operation to release a held real object. Therefore, such an operation can be intuitively understood as the operation for canceling the selection of the three-dimensional object OB1.

In the present embodiment, a basic rule is to control a state where the three-dimensional object OB1 is floating without considering the gravity. However, the gravity may be taken into account, and the three-dimensional object OB1 may be controlled to fall down when the user does not hold the three-dimensional object OB1. To be specific, after the processing of Step S208, the control unit 22 may move the three-dimensional object OB1, the selected state of which has been canceled, according to the gravity or the like after the elapse of a certain time, and may return the three-dimensional object OB1 to an initially arranged place. In this case, the control unit 22 may move the three-dimensional object OB1 slower than a case where actual gravity acts. Then, the control unit 22 terminates the operation detecting processing. The movement here is displayed such that the three-dimensional object OB1 falls down according to the gravity, and is stopped on a floor or a table, for example. Before stopping the movement of the three-dimensional object OB1, the three-dimensional object OB1 may be caused to bound according to elasticity of the three-dimensional object OB1 and hardness of the floor or the table. Magnitude of impact of when the three-dimensional object OB1 collides with the floor or the table is calculated, and when the impact is larger than a predetermined value, the control unit 22 may display the three-dimensional object OB1 as if it had been broken. In this case, similarly to the processing of Step S206, the game is reset to the start time.

When the distance between the first body and the second body is enlarged, compared with at the time of selecting the three-dimensional object OB1, the display size of the three-dimensional object OB1 may be enlarged without canceling the selected state of the three-dimensional object OB1. In this case, to distinguish this processing from the processing of canceling the selected state of the three-dimensional object OB1, the control unit 22 enlarges the display size of the three-dimensional object OB1 without canceling the selected state of the three-dimensional object OB1, only when the two pairs of bodies select the three-dimensional object OB1 in the above selection detecting processing, and movement that the bodies enlarge the three-dimensional object OB1 is detected in this operation detecting processing (that is, movement that the three-dimensional object OB1 is held and enlarged with both hands is detected).

Meanwhile, when the distance between the first body and the second body is reduced, compared with at the time of selecting the three-dimensional object OB1 (No at Step S207), then at Step S209, the control unit 22 reduces the display size of the three-dimensional object OB1 according to the distance. Accordingly, the user can reduce the size of the three-dimensional object OB1 stereoscopically displayed in the display space into a size that meets preference to the user. Then, the control unit 22 re-executes Step S201 and the subsequent steps. The degree of reduction of the display size of the three-dimensional object OB1 may be changed according to elasticity set to the three-dimensional object OB1 as an attribute. For example, the control unit 22 may increase the degree of reduction as the distance between the first body and the second body is reduced, regarding an object to which low hardness is set as the attribute, like the three-dimensional object OB1 that is modeled on a cube made of rubber, or the like. Alternatively, the control unit 22 may keep the degree of reduction small even if the distance between the first body and the second body is reduced, regarding an object to which high hardness is set as the attribute, like the three-dimensional object OB1 that is modeled on a cube made of plastic.

When the distance between the first body and the second body is remarkably reduced, compared with at the time of selecting the three-dimensional object OB1, that is, when the distance between the first body and the second body is a predetermined value or less, the control unit 22 may display the three-dimensional object OB1 as if it had been broken. For example, in the present embodiment, the control unit 22 may reset the game to the start time by deleting the three-dimensional object OB1 during the progress of the game of the cubic puzzle that is the three-dimensional object OB1, like operation to squash the three-dimensional object OB1 at Step S206.

Figure 13:
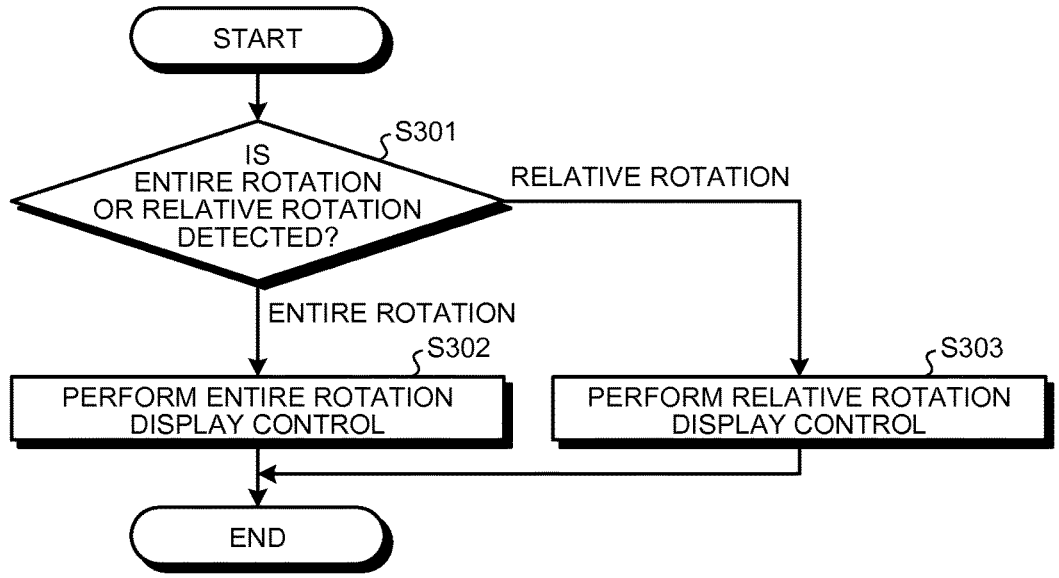
FIG. 13 is a flowchart illustrating details of the processing procedure of the operation detecting processing with respect to a single three-dimensional object.

Then, details of the operation detecting processing of the three-dimensional object OB1 in the present embodiment will be described along the flowchart illustrated in FIG. 13 while referring to FIGS. 9 and 10 as required. FIG. 13 illustrates the above-described processing of Step S205 in FIG. 12 in more detail, and is a flowchart illustrating details of the processing procedure of the operation detecting processing with respect to a single three-dimensional object OB1.

First of all, at Step S301, the control unit 22 determines whether movement of rotating the entire three-dimensional object OB1 has been detected (that is, whether entire rotation has been detected), or whether movement of relatively rotating a part of the three-dimensional object OB1 has been detected (that is, whether relative rotation has been detected), based on the detection result of the detection unit 44 (that is, the movement of the bodies).

To be specific, at Step S301, the control unit 22 controls the detection unit 44, and when it is detected that there are bodies (including the finger F1 and the finger F2 in FIG. 9) at the position where the bodies hold the three-dimensional object OB1 (the state of holding the three-dimensional object OB1 with one hand in FIG. 9), as illustrated in FIG. 9, and that the bodies have moved to rotate the entire three-dimensional object OB1 (Step S301: entire rotation), the control unit 22 determines that the three-dimensional object OB1 is in the entire rotation, and proceeds to Step S302. Also, at Step S301, the control unit 22 controls the detection unit 44, and when it is detected that there are two pairs of bodies that hold the three-dimensional object OB1 at two places (the state of holding the three-dimensional object OB1 with both hands in FIG. 10), as illustrated in FIG. 10, and that the two pairs of bodies have been relatively rotated around a direction into which the two pairs of bodies face each other (Step S301: relative rotation), the control unit 22 determines that the three-dimensional object OB1 is in the relative rotation, and proceeds to Step S303.

When it is determined that the entire rotation has been detected at Step S301 (that is, when the detection unit 44 has detected that there are the bodies (including the finger F1 and the finger F2 in FIG. 9) at the position where the bodies hold the three-dimensional object OB1, and that the bodies have moved) (Step S301: entire rotation), then at Step S302, the control unit 22 performs control of moving the three-dimensional object OB1 (entire rotation display control) according to the movement of the bodies. That is, the control unit 22 controls display such that the entire three-dimensional object OB1 is rotated while being viewed according to the detection result of the detection unit 44. Following that, the control unit 22 terminates the processing, and re-executes Step S201 and the subsequent steps in FIG. 12.

Meanwhile, when it is determined that the relative rotation has been detected at Step S301 (that is, when the detection unit 44 has detected the two pairs of bodies that hold the three-dimensional object OB1 at two places (the state of holding the three-dimensional object OB1 with both hands in FIG. 10), and the movement that the two pairs of bodies are relatively rotated around the direction into which the two pairs of bodies face each other) (Step S301: relative rotation), then at Step S303, the control unit 22 pivots blocks around a certain axis as a base point so as to match the notations (a color, a mark, a character, a number, a pattern, or the like) on the same face in the three-dimensional object OB1 (for example, in the aggregation of regular hexahedrons, to which discriminative notations are provided) according to the detection result of the detection unit 44. This operation is a most basic rule in the application in which an aggregation made of an arbitrary number of 3D-displayed regular hexahedrons is operated.

To be specific, at Step S303, as illustrated in FIG. 10, the control unit 22 controls the regular hexahedrons to be pivoted such that, of six faces, in faces perpendicular to a first direction of the mutually perpendicular three directions, the positional relationship among the elements that configure the faces is not changed, and in a plurality of other faces perpendicular to a second or third direction of the mutually perpendicular three directions, part of the elements that configure the plurality of other faces are interchanged among the plurality of other faces, using the first direction as a rotation axis (relative rotation display control), based on the detection result of the detection unit 44. To be specific, as illustrated in FIG. 10, when the detection unit 44 has detected the two pairs of bodies that hold the three-dimensional object OB1 at two places (a pair of bodies including the finger F1 and the finger F2, and a pair of bodies including a finger F3 and a finger F4, in FIG. 10), and the movement that the two pairs of bodies are relatively rotated around the direction into which the two pairs of bodies face each other, the control unit 22 determines the direction into which the two pairs of bodies face each other as the first direction, and controls the regular hexahedrons to be pivoted according to the amount of rotation of the relatively rotating movement. As described above, the control unit 22 changes the positions of the regular hexahedrons of the aggregation (three-dimensional object) as illustrated in FIGS. 9 and 10. That is, the control unit 22 changes the positions of pieces of the cubic puzzle (three-dimensional object) as illustrated in FIGS. 9 and 10 according to the detection result of the detection unit 44. Following that, the control unit 22 terminates the processing, and re-executes Step S201 and the subsequent steps in FIG. 12.

In the present embodiment, processing executed with respect to the operation of holding the three-dimensional object has been described. This is because the corresponding relationship between the operation input to the cubic puzzle displayed with the three-dimensional object, and the processing to be executed can be processed based on reality. However, operation other than the holding operation may be detected, and processing according to the input operation may be executed. For example, the position of one body is detected, and the three-dimensional object may be rotated according to movement of the position. Alternatively, the positions of two bodies are detected, and an axis around which the regular hexahedrons that configure the three-dimensional object are pivoted is identified, based on the positions of the two bodies and change of a relative position. Then, the regular hexahedron and the regular hexahedron that configure the three-dimensional object are relatively pivoted based on the identified axis.

It is more favorable to detect both of the holding operation and the operation other than the holding operation and execute the processing according to the input operation. For example, in the case of 3×3×3-type cubic puzzle, when operation to push central blocks with a finger is input in a state where end blocks are fixed with both hands, other than the operation in which the three-dimensional object OB1 is fixed with one hand and is rotated with the other one hand as illustrated in FIG. 10, the central blocks may be moved in the direction into which the finger pushes (the moving direction of the finger). Thus, in the case of a 3×3×3-type cubic puzzle, when it is desired to pivot the blocks around a central axis as a base point, other than both end axes, for example, the three-dimensional object OB1 is selected with both hands, and the central blocks are pushed with third input means, so that desired operation can be input. As described above, the processing is executed corresponding to the operation other than the holding operation, so that the blocks can be pivoted using a free finger or a hand of another user, similarly to actual operation to physical blocks. In this case, when the detection unit 44 has detected two pairs of bodies that hold the three-dimensional object OB1 at two places, and another body different from the two pairs of bodies (for example, a free finger or a hand of another user), the control unit 22 may determine a direction into which one pair of bodies of the two pairs of bodies (for example, the thumb and the index finger of the left hand), and the another body different from the two pairs of bodies (for example, the free middle finger of the right hand) face each other as the first direction, and may control the regular hexahedrons to be pivoted according to the amount of rotation of relatively rotating movement.

In the present embodiment, when controlling the regular hexahedrons to be pivoted according to the amount of rotation of the relatively rotating movement as described above, the control unit 22 further performs pivoting angle control. To be specific, the control unit 22 determines whether the blocks are put back in place, or the blocks are pivoted by 90 degrees, depending on whether the rotation is performed by 45 degrees or more. In this pivoting angle control, as a basic operation rule, determination about whether the rotation operation has been performed is determined based on the 45 degrees, when virtual blocks are caused to be pivoted, because the minimum pivoting angle is 90 degrees even in the case where physical blocks actually exist. That is, when the blocks are released by less than 45 degrees, the blocks are put back in place.

Further, in the present embodiment, it is desirable that the control unit 22 performs operation assist to the blocks after a certain time elapses from the start of the application (game). Since the display device 1 side knows how to complete the blocks by providing what type of input next, the control unit 22 can 3D-display, in another position, how much the user needs to pivot the blocks around which axis next, as a tip. In this case, the notification is not limited to the display information, and notification with a sound, a text, light, and the like can be performed. It should be noted that the user is allowed to select whether or not the operation assist is provided, and when the operation assist is provided, the operation assist is displayed after detecting there is no input to the blocks for a certain time so that a game element is not lost.

Further, in the present embodiment, it is desirable that the control unit 22 displays a time limit. Accordingly, with the time limit from the start, a time to complete the game can be recorded. Further, in the present embodiment, it is desirable that the control unit 22 displays the number of pivoting by which the regular hexahedrons are pivoted. Accordingly, the number of rotations of the blocks is counted, and how many times the blocks are pivoted until completion can be counted. In this case, a course record is set, and can be shared on the network.

Figure 14:
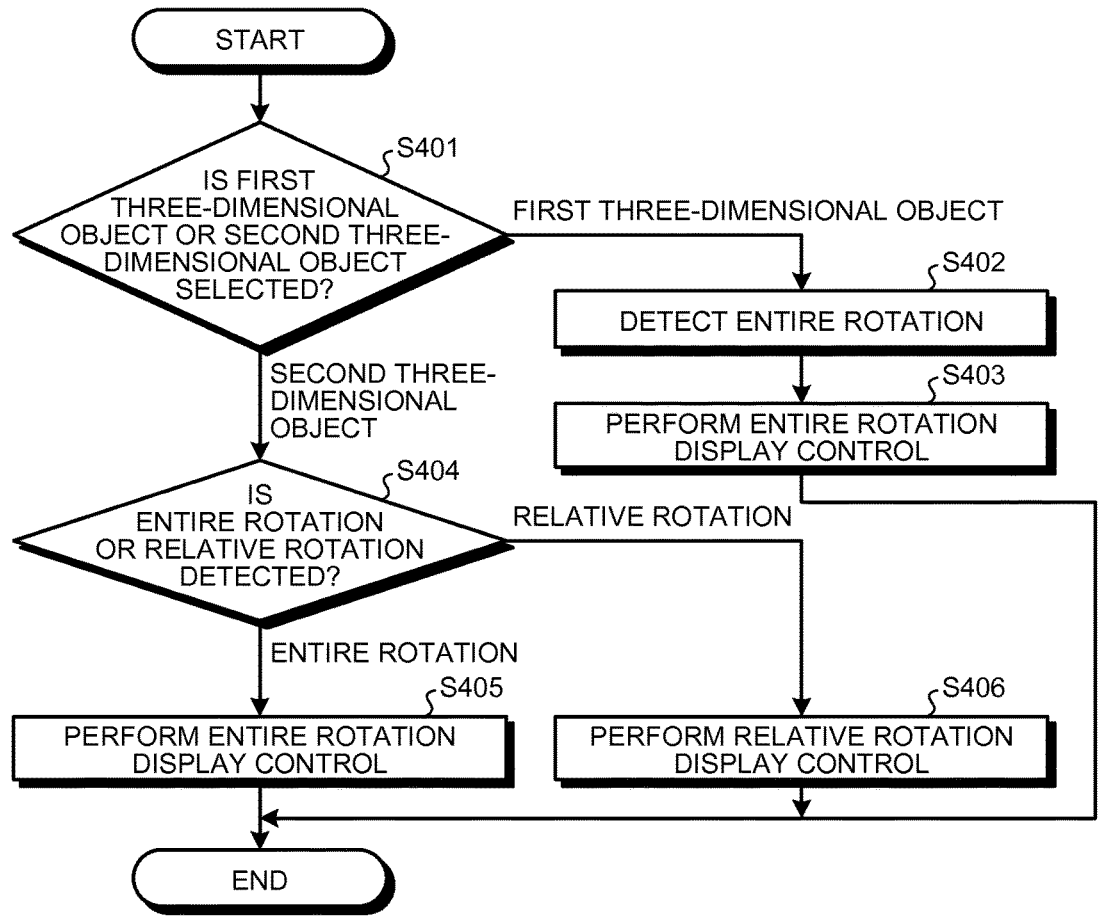
FIG. 14 is a flowchart illustrating details of the processing procedure of the operation detecting processing with respect to a plurality of three-dimensional objects.
Figure 15:
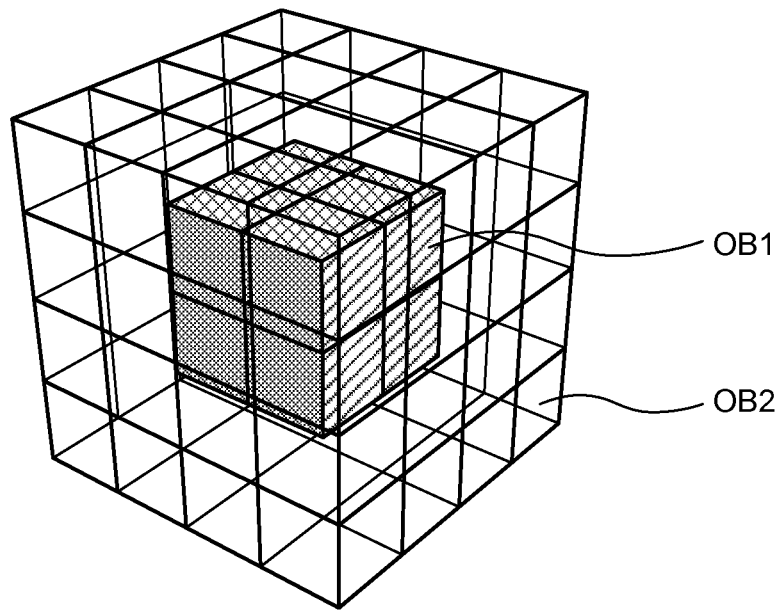
FIG. 15 is a flowchart illustrating one of examples of display of a plurality of three-dimensional objects.
Figure 16:
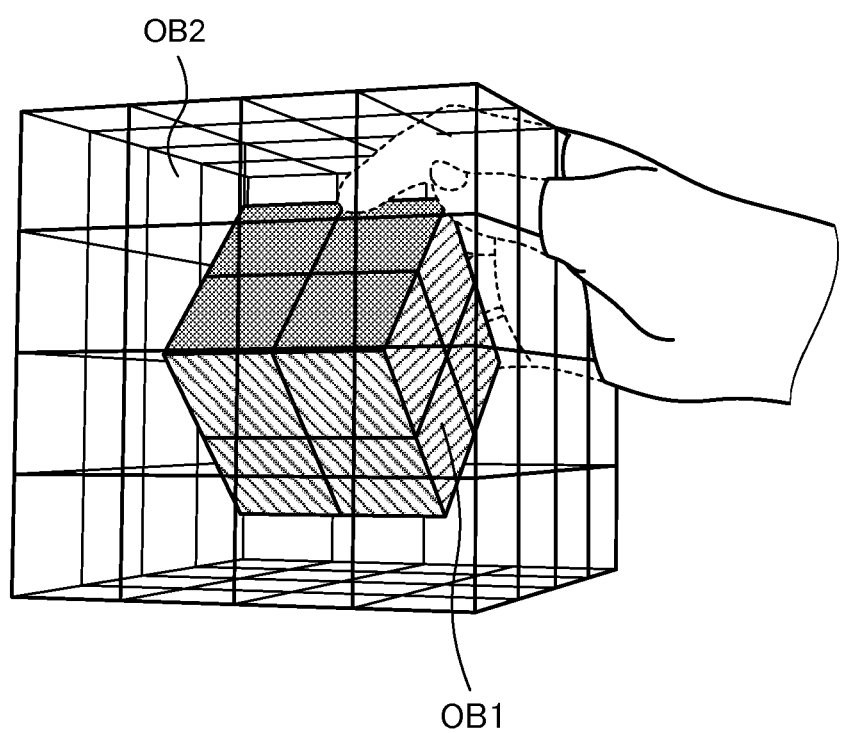
FIG. 16 is a diagram illustrating one of examples of selection and operation with respect to the plurality of three-dimensional objects illustrated in FIG. 15.
Figure 17:
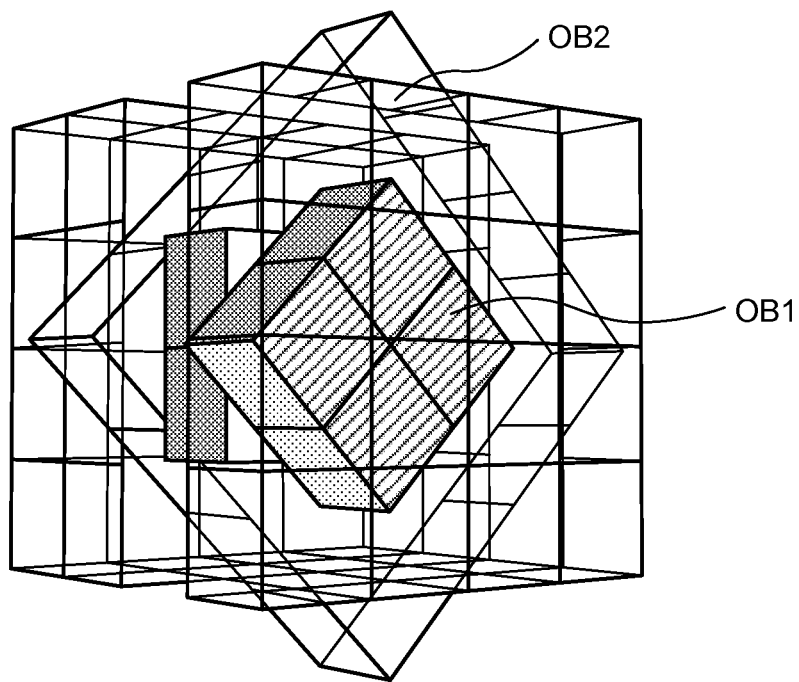
FIG. 17 is a diagram illustrating another example of selection and operation with respect to the plurality of three-dimensional objects illustrated in FIG. 15.

Then, a case where the three-dimensional object is a cubic puzzle of another configuration will be described with reference to FIGS. 14 and 17. FIG. 14 is a flowchart illustrating details of a processing procedure of operation detecting processing with respect to a plurality of three-dimensional objects. FIG. 15 is a diagram illustrating one of examples of display of the plurality of three-dimensional objects. FIG. 16 is a diagram illustrating one of examples of selection and operation with respect to the plurality of three-dimensional objects illustrated in FIG. 15. FIG. 17 is a diagram illustrating another example of the selection and operation with respect to the plurality of three-dimensional objects illustrated in FIG. 15. FIG. 14 illustrates the processing of Step S205 of FIG. 12 in more detail, and is a flowchart illustrating details of a processing procedure of operation detecting processing with respect to a plurality of three-dimensional objects.

An object to be controlled and an object to be displayed illustrated in FIGS. 15 to 17 is a plurality of three-dimensional objects that is stereoscopically displayed in a state of being nested. That is, as illustrated in FIGS. 15 to 17, the present embodiment is one of examples of controlling a plurality of blocks in 3D display, which cannot be realized by a real cubic puzzle (a so-called Rubik's Cube (registered trademark) or the like) or conventional 2D display. As illustrated in FIG. 15, in the plurality of three-dimensional objects in the present embodiment, an inner three-dimensional object OB1 is a 2×2×2 regular hexahedron-type cubic puzzle (a so-called Pocket Cube), and an outer three-dimensional object OB2 is a 4×4×4 regular hexahedron-type cubic puzzle (a so-called Rubik's Revenge).

Also in the present embodiment, at Step S101 in FIG. 11, the control unit 22 controls the display unit 32a to composite and display three-dimensional objects. To be specific, as illustrated in FIG. 15, the display unit 32a stereoscopically displays a plurality of three-dimensional objects (the inner three-dimensional object OB1 and the outer three-dimensional object OB2) in the display space. That is, as illustrated in FIG. 15, the display unit 32a stereoscopically displays the three-dimensional objects in a state where one three-dimensional object OB1 is nested into another three-dimensional object OB2. In this case, an application is assumed, in which inner and outer different blocks are selected, and when colors are matched in both of the outer and inner blocks on the same face, the application is cleared.

Then, processing executed in the control unit 22 with respect to operation detected in the detection unit 44 will be described. As illustrated in FIG. 14, at Step S401, the control unit 22 determines whether a first three-dimensional object OB1 (the inner three-dimensional object OB1 in FIG. 15) has been selected, or a second three-dimensional object OB2 (the outer three-dimensional object OB2 in FIG. 15) has been selected. To be specific, at Step S401, the control unit 22 compares coordinates of bodies detected by the detection unit 44, and coordinates of the three-dimensional objects (including the first three-dimensional object OB1 and the second three-dimensional object OB2) to determine whether the first three-dimensional object OB1 has been selected, or the second three-dimensional object OB2 has been selected.

At Step S401, when it is determined that the first three-dimensional object OB1 has been selected (Step S401: first three-dimensional object), then at Step S402, as illustrated in FIG. 16, the control unit 22 controls the detection unit 44 to detect that there is bodies at a position where the bodies hold the first three-dimensional object OB1 (the state of holding the first three-dimensional object OB1 with one hand in FIG. 16), and the bodies have moved to rotate the entire first three-dimensional object OB1 (that is, the entire rotation is detected).

Then, at Step S403, as illustrated in FIG. 14, the control unit 22 controls the first three-dimensional object OB1 to be moved according to the movement of the bodies (the entire rotation display control). That is, the control unit 22 controls display such that the entire first three-dimensional object OB1 is rotated while being viewed according to the detection result of the detection unit 44. Following that, the control unit 22 terminates the processing, and re-executes Step S201 and the subsequent steps in FIG. 12.

As described above, when a plurality of three-dimensional objects are nested, the display unit 32*a* stereoscopically displays the three-dimensional objects in a state where the first three-dimensional object OB1 is nested into the other second three-dimensional object OB2, as illustrated in FIG. 16. When the detection unit 44 has detected that the bodies are at the position where the bodies hold the first three-dimensional object OB1, and the bodies have moved, the control unit 22 performs control of moving only the first three-dimensional object OB1 according to the movement of the bodies, without moving the second three-dimensional object OB2. That is, even if the entire inner first three-dimensional object OB1 is rotated, the entire outer second three-dimensional object OB2 is not rotated.

Meanwhile, at Step S401, when it is determined that the second three-dimensional object OB2 has been selected (Step S401: second three-dimensional object), then at Step S404, the control unit 22 determines whether movement of rotating the entire second three-dimensional object OB2 has been detected (that is, the entire rotation has been detected), or movement of relatively moving a part of the second three-dimensional object OB2 has been detected (that is, the relative movement has been detected), based on the detection result of the detection unit 44 (that is, the movement of the bodies).

To be specific, at Step S404, the control unit 22 controls the detection unit 44, and when it is detected that there are bodies at a position where the bodies hold the second three-dimensional object OB2 (the state of holding the three-dimensional object OB2 with one hand), and the bodies have moved to rotate the entire second three-dimensional object OB2 (Step S404: entire rotation), the control unit 22 determines that the three-dimensional object OB2 is in the entire rotation, and proceeds to Step S405. Alternatively, at Step S404, as illustrated in FIG. 17, the control unit 22 controls the detection unit 44, and when it is detected that there are two pairs of bodies that hold the second three-dimensional object OB2 at two places (the state of holding the three-dimensional object OB2 with both hands), and the two pairs of bodies are relatively rotated around a direction into which the two pairs of bodies face each other (Step S404: relative rotation), the control unit 22 determines that the three-dimensional object OB2 is in the relative rotation, and proceeds to Step S406.

When it is determined that the entire rotation is detected at Step S404, (that is, the detection unit 44 has detected that there are bodies at a position where the bodies hold the second three-dimensional object OB2, and the bodies have moved) (Step S404: entire rotation), then at Step S405, the control unit 22 controls the second three-dimensional object OB2 to be moved according to the movement of the bodies (the entire rotation display control). That is, the control unit 22 controls display such that the entire second three-dimensional object OB2 is rotated while being viewed according to the detection result of the detection unit 44. Following that, the control unit 22 terminates the processing, and re-executes Step S201 and the subsequent steps in FIG. 12.

Meanwhile, when it is determined that the relative rotation has been detected at Step S404 (that is, as illustrated in FIG. 17, the detection unit 44 has detected the two pairs of bodies that hold the second three-dimensional object OB2 at two places (the state of holding the second three-dimensional object OB2 with both hands), and the movement that the two pairs of bodies are relatively rotated around the direction into which the two pairs of bodies face each other) (Step S404: relative rotation), then at Step S406, as illustrated in FIG. 17, the control unit 22 pivots blocks around a certain axis as a base point so as to match the notations (a color, a mark, a character, a number, a pattern, or the like) on the same face in the second three-dimensional object OB2 (for example, the aggregation of the regular hexahedrons to which the discriminative notations are provided) according to the detection result of the detection unit 44.

To be specific, at Step S406, as illustrated in FIG. 17, the control unit 22 controls the regular hexahedrons to be pivoted such that, of six faces, in faces perpendicular to a first direction of the mutually perpendicular three directions, the positional relationship among the elements that configure the faces is not changed, and in a plurality of other faces perpendicular to a second or third direction of the mutually perpendicular three directions, part of the elements that configure the plurality of other faces are interchanged among the plurality of other faces, using the first direction as a rotation axis (relative rotation display control), based on the detection result of the detection unit 44. At this time, as illustrated in FIG. 17, when the detection unit 44 has detected the two pairs of bodies that hold the second three-dimensional object OB2 at two places, and the movement that the two pairs of the bodies are relatively rotated around the direction into which the two pairs of bodies face each other, the control unit 22 determines the direction into which the two pairs of bodies face each other as the first direction, and controls the regular hexahedrons to be pivoted according to the amount of rotation of the relatively rotating movement.

To be specific, when a plurality of three-dimensional objects is nested, as illustrated in FIG. 17, the display unit 32*a* stereoscopically displays the three-dimensional objects in a state where the first three-dimensional object OB1 is nested into the second three-dimensional object OB2. When the detection unit 44 has detected, regarding the second three-dimensional object OB1 that is one of the plurality of three-dimensional objects OB1 and OB2, two pairs of bodies that hold the second three-dimensional object OB2 at two places, and the movement that the two pairs of bodies are relatively rotated around the direction into which the two pairs of bodies face each other, the control unit 22 determines the direction into which the two pairs of bodies face each other as the first direction, and controls the regular hexahedrons that configure the second three-dimensional object OB2 and the regular hexahedrons that configure the first three-dimensional object OB1 to be pivoted in conjunction with each other, according to the amount of rotation of the relatively rotating movement with respect to the second three-dimensional object OB2. That is, when a layer of the outer second three-dimensional object OB2 is rotated, a corresponding layer of the inner first three-dimensional object OB1 is rotated. Following that, the control unit 22 terminates the processing, and re-executes Step S201 and the subsequent steps in FIG. 12.

Figure 18:
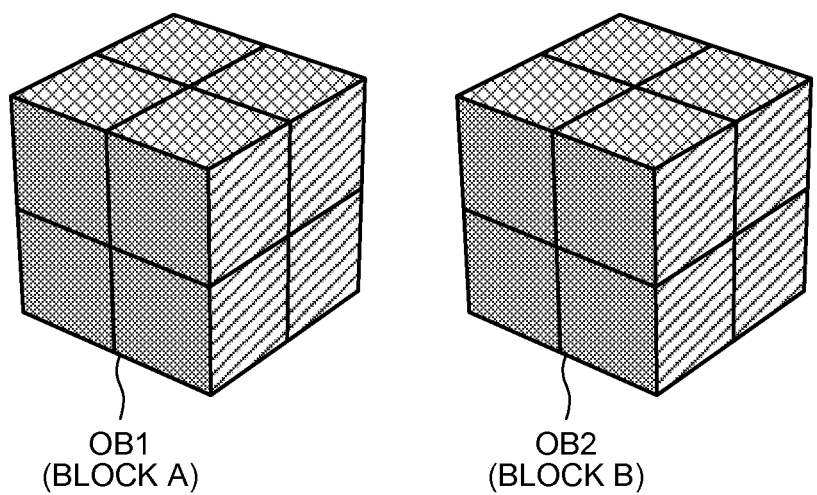
FIG. 18 is a diagram illustrating another example of display of a plurality of three-dimensional objects.
Figure 19:
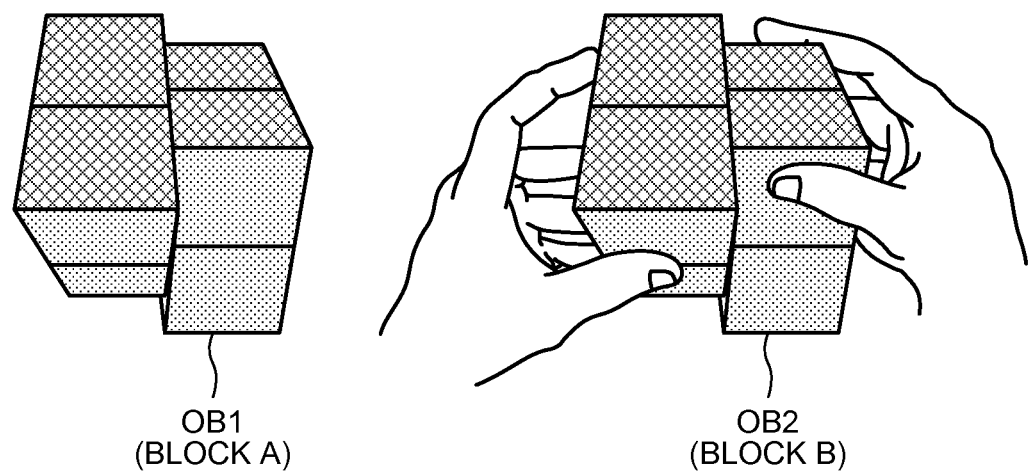
FIG. 19 is a diagram illustrating one of examples of selection and operation with respect to the plurality of three-dimensional objects illustrated in FIG. 18.

Then, a case where the three-dimensional object is a cubic puzzle of another configuration will be described with reference to FIGS. 18 and 19. FIG. 18 is a diagram illustrating another example of display of a plurality of three-dimensional objects. FIG. 19 is a diagram illustrating one of examples of selection and operation with respect to the plurality of three-dimensional objects illustrated in FIG. 18. FIGS. 18 and 19 illustrate a case in which the plurality of three-dimensional objects is separated. The example illustrated in FIGS. 18 and 19 is one of examples of controlling a plurality of blocks in 3D display, which cannot be realized in a real cubic puzzle (a so-called Rubik's Cube (registered trademark)) or conventional 2D display. To be specific, two three-dimensional objects (cubic puzzles) are rotated in conjunction with each other based on a set rule.

Also in the present embodiment, at Step S101 of FIG. 11, the control unit 22 controls the display unit 32a to composite and display three-dimensional objects. To be specific, as illustrated in FIG. 18, the display unit 32a stereoscopically displays a plurality of three-dimensional objects (a three-dimensional object OB1 and a three-dimensional object OB2) side by side in the same display space. The three-dimensional object OB1 (block A) and the three-dimensional object OB2 (block B) illustrated in FIG. 18 are 2×2×2 regular hexahedron-type cubic puzzles (so-called Pocket Cubes). In this case, an application is assumed, in which the block A or B is selected, and when colors on the same face in both of the blocks A and B are matched, the application is cleared.

Then, processing executed in the control unit 22 with respect to operation detected in the detection unit 44 will be described. Operation detecting processing of the present embodiment is basically similar to the above-described case where the stereoscopically display is performed in the state where a plurality of three-dimensional objects is nested. Therefore, description of steps except Steps S403 and S406 in FIG. 14 is omitted.

At Step S402, after the detection unit 44 detects there are bodies at a position where the bodies hold the first three-dimensional object OB1 (the block A in FIG. 18), and the bodies have moved, then at Step S403, the control unit 22 controls the first three-dimensional object OB1 and the second three-dimensional object OB2 (the block B in FIG. 18) to be moved in conjunction with each other according to the movement of the bodies with respect to the first three-dimensional object OB1 (the entire rotation display control). In this case, in the first three-dimensional object OB1 (block A) illustrated in FIG. 18, rotation of a specific axis is not allowed, and rotation of the entire block is only allowed.

At Step S404, as illustrated in FIG. 19, with respect to the second three-dimensional object OB2 (the block B in FIG. 19) of the plurality of three-dimensional objects OB1 and OB2, when the detection unit 44 has detected two pairs of bodies that hold the second three-dimensional object OB2 at two places, and movement of relative rotation of the two pairs of bodies around a direction into which the two pairs of bodies face each other (Step S404: relative rotation), then at Step S406, the control unit 22 determines the direction into which the two pairs of bodies face each other as the first direction, and controls the regular hexahedrons that configure the second three-dimensional object OB2, and the regular hexahedrons that configure the first three-dimensional object OB1 to be pivoted in conjunction with each other, according to the amount of rotation of the relatively rotating movement with respect to the second three-dimensional object OB2 (the relative rotation display control). That is, when a layer of the second three-dimensional object OB2 (block B) is rotated, as illustrated in FIG. 19, a corresponding layer of the first three-dimensional object OB1 (block A) is also rotated.

As described above, the block A and the block B are in mutually affecting relationship, and, by changing the direction of the block A or B, the positional relationship between the past block A and the block B is associated as new relationship again. As described above, according to the present embodiment, the plurality of three-dimensional objects can be selected at the same time through the 3D application, and further, different inputs can be made to the plurality of three-dimensional objects.

As described above, in the first embodiment, when the state in which the three-dimensional object is positioned between the bodies such as the fingers is continued for a predetermined time or more, the three-dimensional object is treated to be selected. Therefore, the selection of the three-dimensional object can be realized with intuitive and easily understandable operation.

Figure 20:
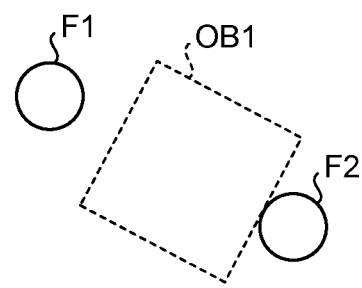
FIG. 20 is a diagram for describing another example of detection of operation with respect to a three-dimensional object.

As illustrated in FIG. 20, a state in which at least one of the first body and the second body is in contact with the three-dimensional object being continued for a predetermined time or more may be employed as a condition to select the three-dimensional object. By employing the contact to the three-dimensional object as the condition of the selection, the user can easily select a desired three-dimensional object when a plurality of three-dimensional objects is closely displayed.

Figure 21:
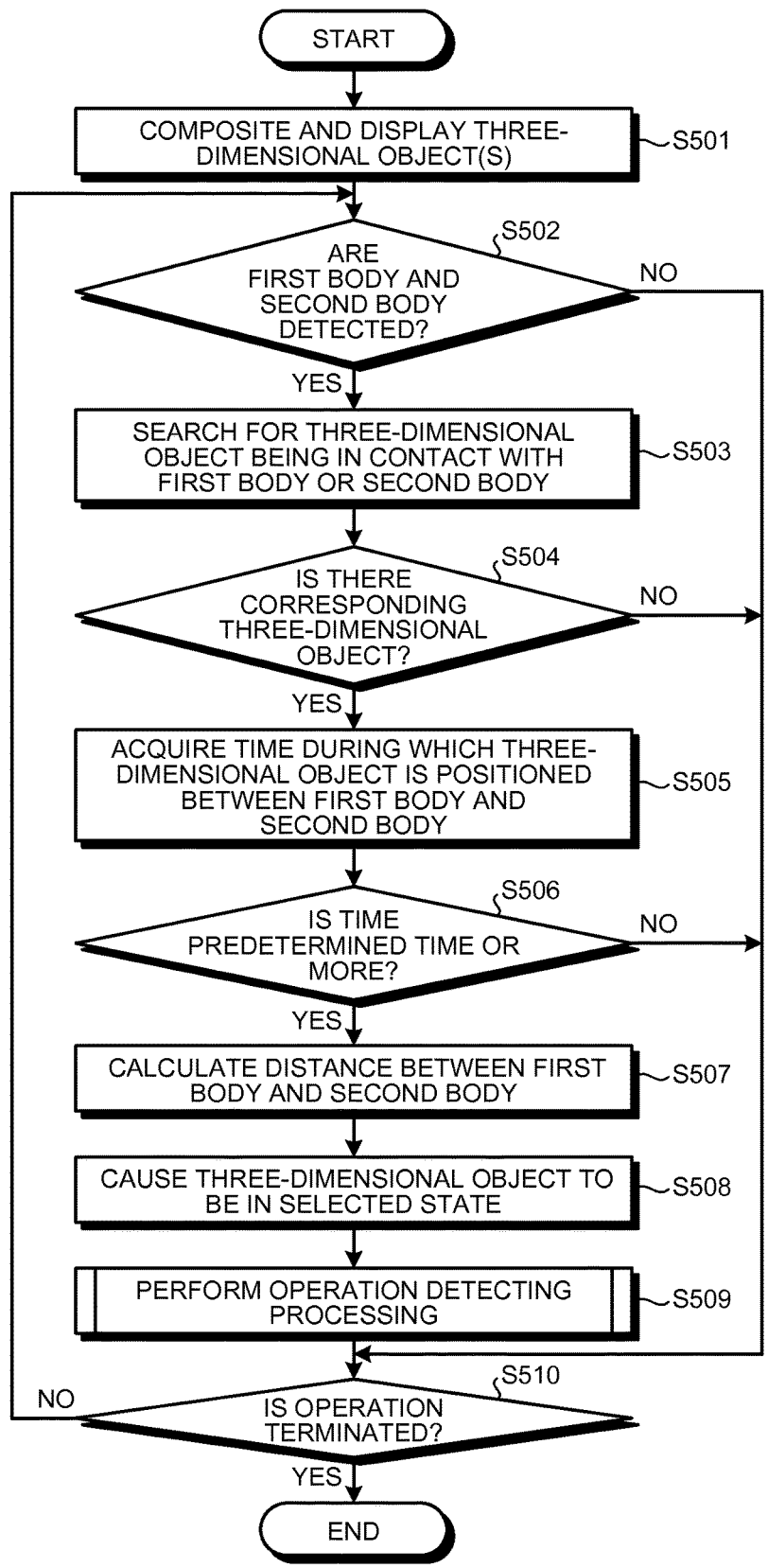
FIG. 21 is a flowchart illustrating a processing procedure of selection detecting processing of when contact to a three-dimensional object is a condition of selection.

FIG. 21 is a flowchart illustrating a processing procedure of the selection detecting processing of when the contact to the three-dimensional object is the condition of the selection. As illustrated in FIG. 21, first of all, at Step S501, the control unit 22 composites an image in the virtual space including the three-dimensional object(s) and an image in the real space, and displays a composite image. To be specific, in the present embodiment, the control unit 22 stereoscopically displays an aggregation (three-dimensional object) configured such that a plurality of regular hexahedrons is arranged in mutually perpendicular three directions, in the display space, by the display unit 32a, as illustrated in FIGS. 9 and 10, and the like. That is, the control unit 22 controls the display unit 32a to stereoscopically display a cubic puzzle (three-dimensional object) in the display space.

Following that, at Step S502, the control unit 22 determines whether a first body and a second body have been detected by the detection unit 44, that is, by the imaging units 40 and 42. That is, the control unit 22 controls the detection unit 44 to detect movement of bodies (including the first body and the second body) in the display space. To be specific, in the present embodiment, the control unit 22 controls the detection unit 44 to detect that there are bodies (including the first body and the second body) at a position where the bodies hold the aggregation (the state of holding the aggregation with one hand in FIG. 9), as illustrated in FIG. 9. Further, the control unit 22 controls the detection unit 44 to detect two pairs of bodies that hold the aggregation at two places (the state of holding the aggregation with both hands in FIG. 10), as illustrated in FIG. 10. Although not illustrated, the control unit 22 may control the detection unit 44 to detect the two pairs of bodies that hold the aggregation at two places (the state of holding the aggregation with both hands), and to further detect another body (for example, a free finger, a hand of another user, or the like) different from the two pairs of bodies.

When the first body and the second body are not detected (No at Step S502), then at Step S510, the control unit 22 determines whether operation termination has been detected. When the operation termination has been detected (Yes at Step S510), the control unit 22 terminates the selection detecting processing. When the operation termination is not detected (No at Step S510), the control unit 22 re-executes Step S502 and the subsequent steps.

When the first body and the second body have been detected (Yes at Step S502), then at Step S503, the control unit 22 searches the displayed three-dimensional object(s) for a three-dimensional object that is in contact with at least one of the first body and the second body. When there is no corresponding three-dimensional object (No at Step S504), then at Step S510, the control unit 22 determines whether the operation termination has been detected. When the operation termination has been detected (Yes at Step S510), the control unit 22 terminates the selection detecting processing. When the operation termination is not detected (No at Step S510), the control unit 22 re-executes Step S502 and the subsequent steps.

When the three-dimensional object that is in contact with at least one of the first body and the second body has been found (Yes at Step S504), then at Step S505, the control unit 22 acquires a time during which the three-dimensional object is positioned between the first body and the second body. When the acquired time is less than a predetermined time (No at Step S506), then at Step S510, the control unit 22 determines whether the operation termination has been detected. When the operation termination has been detected (Yes at Step S510), the control unit 22 terminates the selection detecting processing. When the operation termination is not detected (No at Step S510), the control unit 22 re-executes Step S502 and the subsequent steps.

When the acquired time is the predetermined time or more (Yes at Step S506), then at Step S507, the control unit 22 calculates the distance between the first body and the second body. Further, at Step S508, the control unit 22 causes the three-dimensional object displayed between the first body and the second body to be in the selected state. Then, at Step S509, the control unit 22 executes the above-described operation detecting processing, and changes the three-dimensional object in the selected state according to detected operation in the processing. After the operation detecting processing is terminated, then at Step S510, the control unit 22 determines whether the operation termination has been detected. When the operation termination has been detected (Yes at Step S510), the control unit 22 terminates the selection detecting processing. When the operation termination is not detected (No at Step S510), the control unit 22 re-executes Step S502 and the subsequent steps.

Embodiment 2

Hereinafter, a second embodiment will be described. While a display device 1 according to the second embodiment is different from the first embodiment in a processing procedure of selection detecting processing executed based on a function provided by a control program 24a, the display device 1 according to the second embodiment has the same configuration as the display device 1 according to the first embodiment in terms of hardware. Therefore, in the second embodiment, description overlapping with the first embodiment is omitted, and the selection detecting processing will be mainly described.

Figure 22:
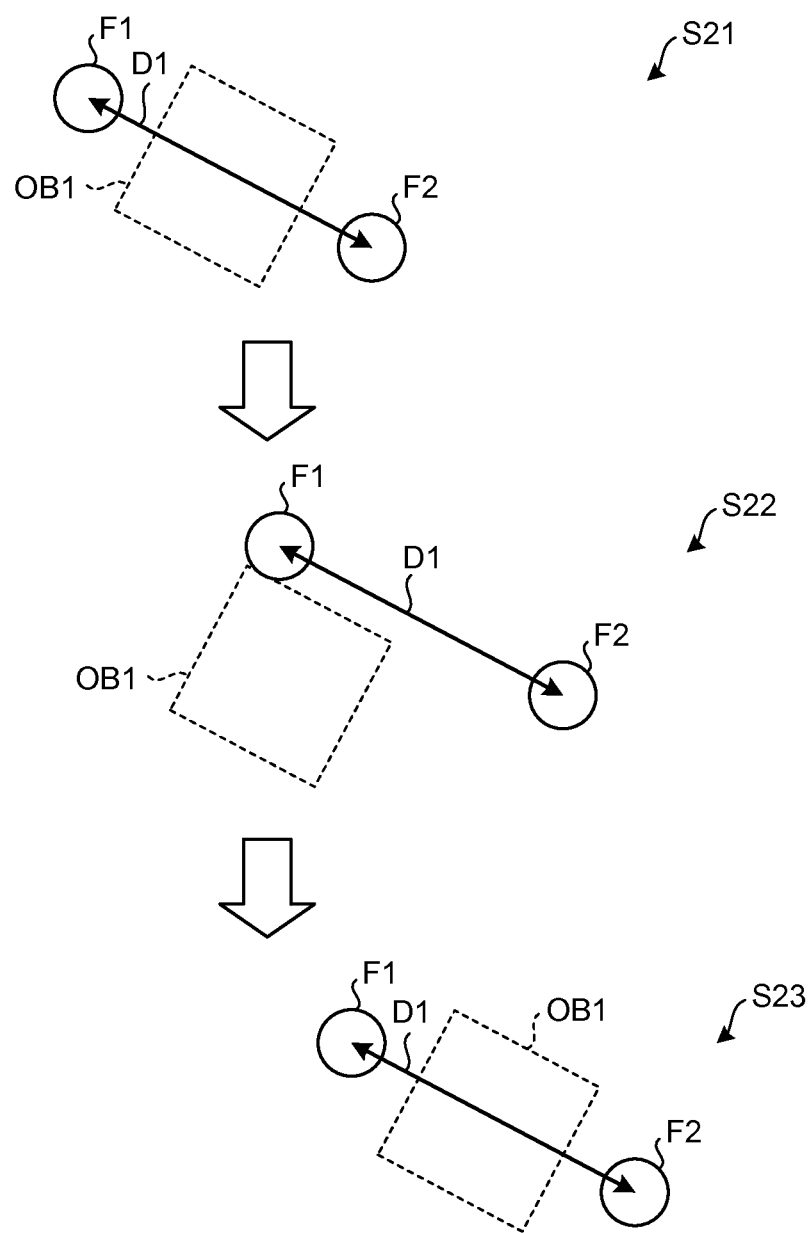
FIG. 22 is a diagram for describing detection of operation with respect to a three-dimensional object in a second embodiment.

First of all, detection of operation with respect to a three-dimensional object will be described with reference to FIG. 22. FIG. 22 is a diagram for describing detection of operation with respect to a three-dimensional object. At Step S21 illustrated in FIG. 22, a three-dimensional object OB1 is stereoscopically displayed in a display space by display units 32a an 32b. Further, to select the three-dimensional object OB1, a user is moving a finger F1 and a finger F2 so that the three-dimensional object OB1 is positioned between the finger F1 and the finger F2.

When two bodies are detected in the display space, and the three-dimensional object OB1 is positioned between the two bodies, the display device 1 monitors change of the distance between the two bodies. Then, when the distance is kept substantially constant for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 becomes in the selected state, by chanting a display style of the three-dimensional object OB1, or the like.

The two bodies do not necessarily stay at the position where the three-dimensional object OB1 is sandwiched while the display device 1 is monitoring the change of the distance between the two bodies. That is, as illustrated at Step S21, after the user moves the finger F1 and finger F2 so that the three-dimensional object OB1 is positioned between the finger F1 and the finger F2, the user can move the finger F1 and the finger F2 to another position without keeping the state of the first finger F1 and the second finger F2.

As illustrated at Step S22, assume that the user has moved the finger F1 and the finger F2 from the state of Step S21 while keeping a distance D1 between the finger F1 and the finger F2 substantially constant. In this case, as illustrated at Step S23, the display device 1 causes the three-dimensional object OB1 to be in the selected state at a stage where a state in which the distance D1 between the finger F1 and the finger F2 is kept substantially constant is continued for a predetermined time or more. Then, the display device 1 moves the three-dimensional object OB1 to between the finger F1 and the finger F2 as if the three-dimensional object OB1 had already been selected at the stage of Step S21. The movement of the finger F1 and the finger F2 from Steps S21 to S23 may be stored, and the three-dimensional object OB1 may be rotated, or the like, in accordance with the stored movement. Following that, the display device 1 applies change, such as movement, rotation, deformation, or disappearance, to the three-dimensional object OB1 according to the movement of the finger F1 and the finger F2.

As described above, after the two bodies are once moved to the position where these bodies sandwich the three-dimensional object, the three-dimensional object becomes selectable even if these bodies do not stay at the position, whereby the user can promptly start operation after the selection of the three-dimensional object.

Figure 23:
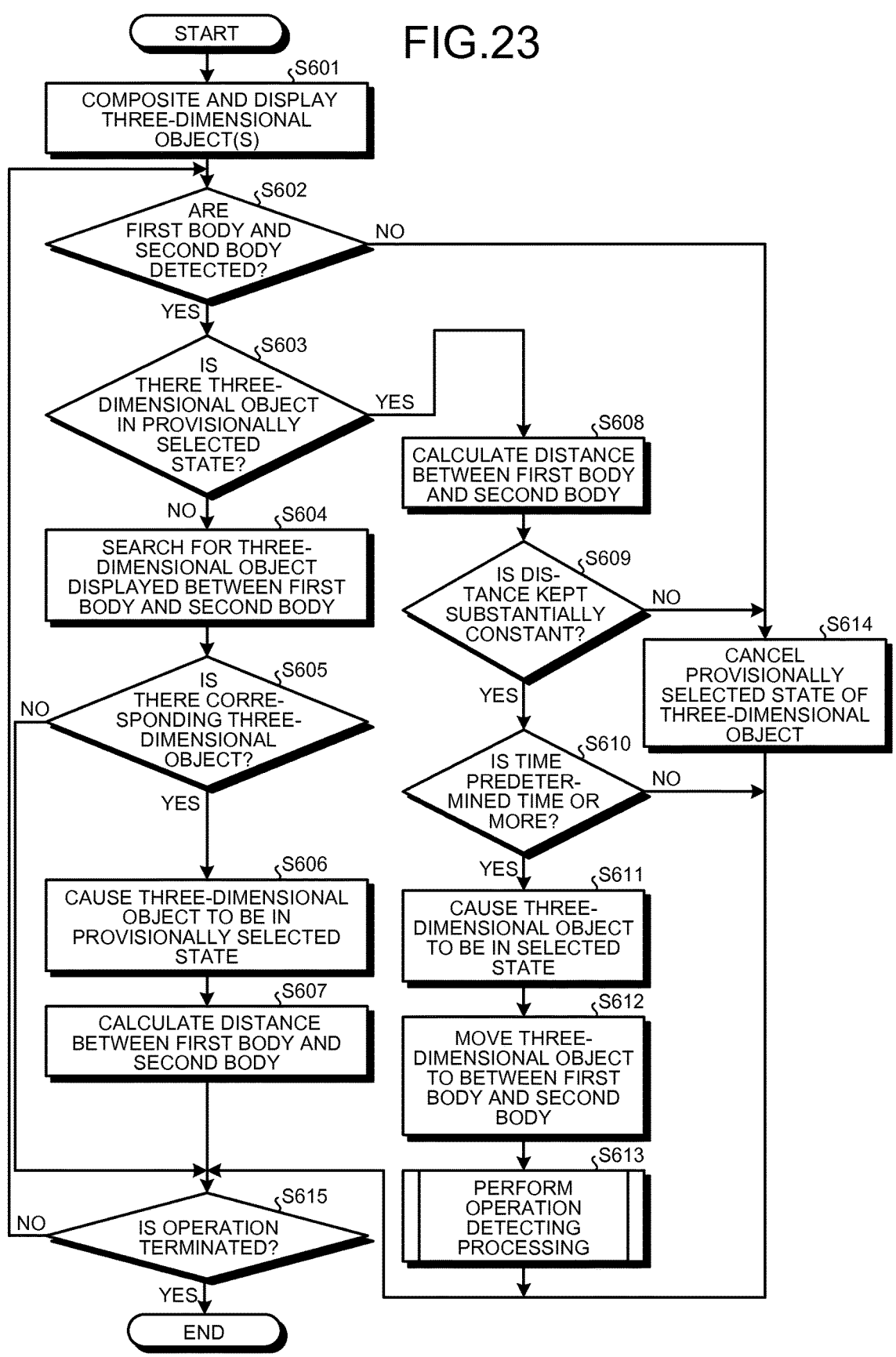
FIG. 23 is a flowchart illustrating a processing procedure of selection detecting processing.

Then, a processing procedure executed by the display device 1 in regard to operation of a three-dimensional object will be described with reference to FIG. 23. FIG. 23 is a flowchart illustrating a processing procedure of selection detecting processing of a three-dimensional object. The processing procedure illustrated in FIG. 23 is realized by a control unit 22 that executes the control program 24a.

As illustrated in FIG. 23, first of all, at Step S601, the control unit 22 composites an image in a virtual space including a three-dimensional object(s) and an image in a real space, and displays a composite image. To be specific, in the present embodiment, the control unit 22 stereoscopically displays an aggregation (three-dimensional object) configured such that a plurality of regular hexahedrons is arranged in mutually perpendicular three directions, in the display space by the display unit 32a, as illustrated in FIGS. 9 and 10, and the like. That is, the control unit 22 controls the display unit 32a to stereoscopically display a cubic puzzle (three-dimensional object) in the display space.

Following that, then at Step S602, the control unit 22 determines whether a first body and a second body have been detected by a detection unit 44, that is, by imaging units 40 and 42. That is, the control unit 22 controls the detection unit 44 to detect movement of bodies (including the first body and the second body) in the display space. To be specific, in the present embodiment, the control unit 22 controls the detection unit 44 to detect that there are bodies (including the first body and the second body) at a position where the bodies hold the aggregation (a state of holding the aggregation with one hand in FIG. 9), as illustrated in FIG. 9. Further, the control unit 22 controls the detection unit 44 to detect two pairs of bodies that hold the aggregation at two places (a state of holding the aggregation with both hands in FIG. 10), as illustrated in FIG. 10. Although not illustrated, the control unit 22 may control the detection unit 44 to detect the two pairs of bodies that hold the aggregation at two places (the state of holding the aggregation with both hands), and to further detect another body (for example, a free finger, a hand of another user, or the like) different from the two pairs of bodies.

When the first body and the second body are not detected (No at Step S602), then at Step S614, if there is a three-dimensional object in a provisionally selected state, the control unit 22 cancels the provisionally selected state of the three-dimensional object. The provisionally selected state is a state in which whether the distance between the two bodies is kept substantially constant is monitored, after the state in which the three-dimensional object is displayed between the two bodies is detected.

Then, at Step S615, the control unit 22 determines whether operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

When the first body and the second body have been detected (Yes at Step S602), then at Step S603, the control unit 22 determines whether there is the three-dimensional object in the provisionally selected state. When there is no three-dimensional object in the provisionally selected state (No at Step S603), then at Step S604, the control unit 22 searches the displayed three-dimensional object(s) for a three-dimensional object displayed between the first body and the second body.

When there is no corresponding three-dimensional object (No at Step S605), then at Step S615, the control unit 22 determines whether the operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

When the three-dimensional object displayed between the first body and the second body has been found (Yes at Step S605), then at Step S606, the control unit 22 causes the three-dimensional object displayed between the first body and the second body to be in the provisionally selected state. Further, at Step S607, the control unit 22 calculates the distance between the first body and the second body.

Then, at Step S615, the control unit 22 determines whether the operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

When the first body and the second body have been detected, and there is the three-dimensional object in the provisionally selected state (Yes at Step S603), then, at Step S608, the control unit 22 calculates the distance between the first body and the second body. Then, at Step S609, the control unit 22 determines whether the distance is kept substantially constant. When the distance is not kept substantially constant (No at Step S609), then at Step S614, the control unit 22 cancels the provisionally selected state of the three-dimensional object in the provisionally selected state.

Then, at Step S615, the control unit 22 determines whether the operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

When the distance between the first body and the second body is kept substantially constant (Yes at Step S609), then at Step S610, the control unit 22 determines whether a period in which the distance is kept substantially constant is a predetermined time or more. When the period in which the distance is kept substantially constant is less than the predetermined time (No at Step S610), then at Step S615, the control unit 22 determines whether the operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

When the period in which the distance is kept substantially constant is the predetermined time or more (Yes at Step S610), then at Step S611, the control unit 22 causes the three-dimensional object displayed between the first body and the second body to be in the selected state. Further, at Step S612, the control unit 22 moves the three-dimensional object to between the first body and the second body. Then, at Step S613, the control unit 22 executes operation detecting processing illustrated in FIGS. 12 to 14, and changes the three-dimensional object in the selected state according to detected operation in the processing.

After the operation detecting processing is terminated, at Step S615, the control unit 22 determines whether the operation termination has been detected. When the operation termination has been detected (Yes at Step S615), the control unit 22 terminates the selection detecting processing. When the operation termination is not detected (No at Step S615), the control unit 22 re-executes Step S602 and the subsequent steps.

As described above, in the second embodiment, when the three-dimensional object is positioned between the bodies such as the fingers, and thereafter the distance between the bodies is kept substantially constant for a predetermined time or more, the three-dimensional object is treated to be selected. Therefore, the user can promptly start operation after the selection of the three-dimensional object.

Figure 24:
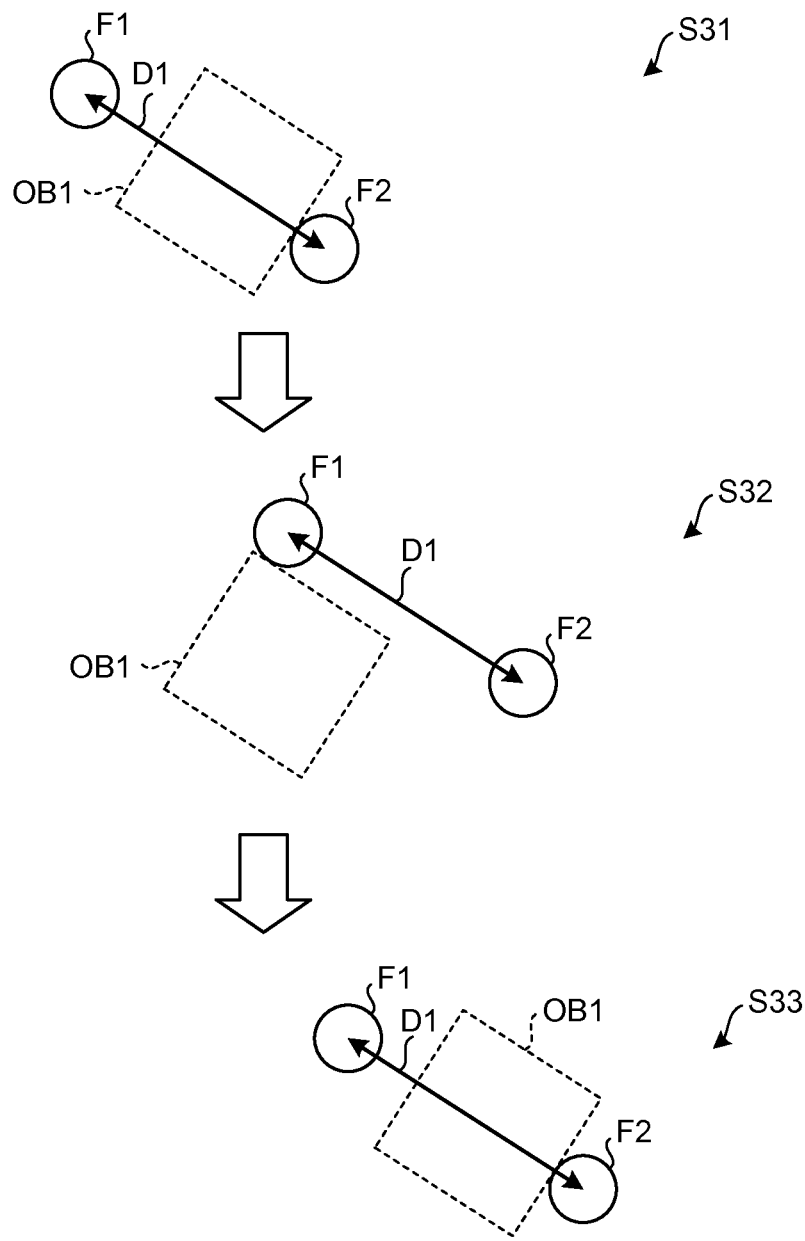
FIG. 24 is a diagram for describing another example of detection of operation with respect to a three-dimensional object.

As illustrated in Steps S31 to S33 of FIG. 24, the distance between the first body and the second body being kept substantially constant for a predetermined time or more after at least one of the first body and the second body comes in contact with the three-dimensional object may be employed as a condition of the selection of the three-dimensional object. FIG. 24 is a diagram for describing another example of the detection of the operation with respect to the three-dimensional object. By employing the contact to the three-dimensional object as the condition of the selection, the user can easily select a desired three-dimensional object when a plurality of three-dimensional objects is closely displayed.

Figure 25:
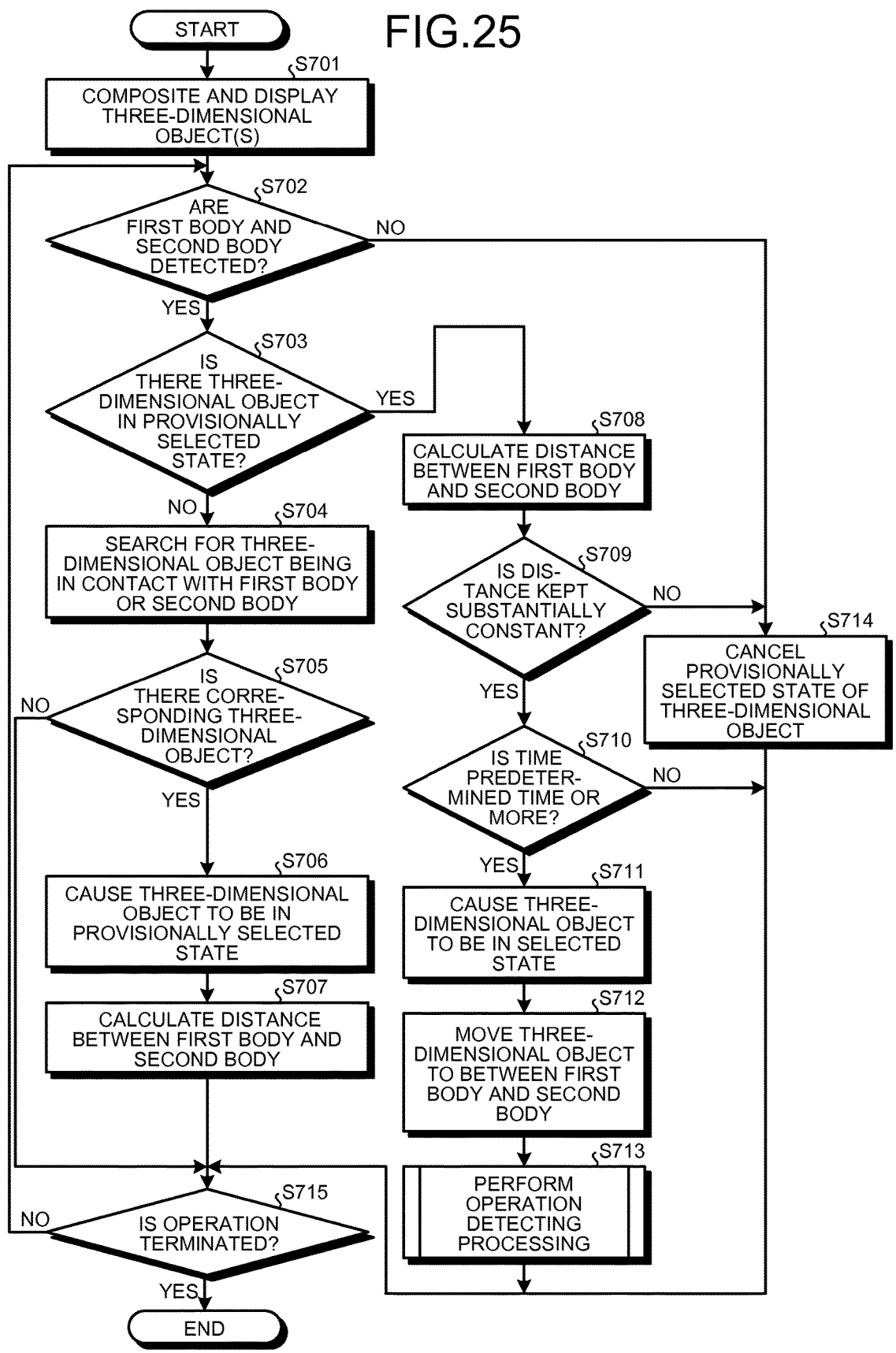
FIG. 25 is a flowchart illustrating a processing procedure of selection detecting processing of when contact to a three-dimensional object is a condition of selection.

FIG. 25 is a flowchart illustrating a processing procedure of the selection detecting processing of when the contact to the three-dimensional object is the condition of the selection. As illustrated in FIG. 25, first of all, at Step S701, the control unit 22 composites an image in the virtual space including the three-dimensional object(s) and an image in the real space, and displays a composite image. To be specific, in the present embodiment, the control unit 22 stereoscopically displays an aggregation (three-dimensional object) configured such that a plurality of regular hexahedrons is arranged in mutually perpendicular three directions, in the display space by the display unit 32a, as illustrated in FIGS. 9 and 10, and the like. That is, the control unit 22 controls the display unit 32a to stereoscopically display a cubic puzzle (three-dimensional object) in the display space.

Following that, at Step S702, the control unit 22 determines whether a first body and a second body have been detected by a detection unit 44, that is, by imaging units 40 and 42. That is, the control unit 22 controls the detection unit 44 to detect movement of bodies (including the first body and the second body) in the display space. To be specific, in the present embodiment, the control unit 22 controls the detection unit 44 to detect that there are bodies (including the first body and the second body) at a position where the bodies hold the aggregation (a state of holding the aggregation with one hand in FIG. 9), as illustrated in FIG. 9. Further, the control unit 22 controls the detection unit 44 to detect two pairs of bodies that hold the aggregation at two places (a state of holding the aggregation with both hands in FIG. 10), as illustrated in FIG. 10. Although not illustrated, the control unit 22 may control the detection unit 44 to detect the two pairs of bodies that hold the aggregation at two places (the state of holding the aggregation with both hands), and to further detect another body (for example, a free finger, a hand of another user, or the like) different from the two pairs of bodies.

When the first body and the second body are not detected (No at Step S702), at Step S714, if there is a three-dimensional object in the provisionally selected state, the control unit 22 cancels the provisionally selected state of the three-dimensional object. The provisionally selected state is a state in which whether the distance between the two bodies is kept substantially constant is monitored, after the state in which the three-dimensional object is displayed between the two bodies is detected.

Then, at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

When the first body and the second body have been detected (Yes at Step S702), then at Step S703, the control unit 22 determines whether there is the three-dimensional object in the provisionally selected state. When there is not the three-dimensional object in the provisionally selected state (No at Step S703), then at Step S704, the control unit 22 searches the displayed three-dimensional object(s) for a three-dimensional object that is in contact with at least one of the first body and the second body.

When there is no corresponding three-dimensional object (No at Step S705), then at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

When the three-dimensional object that is in contact with at least one of the first body and the second body has been found (Yes at Step S705), then at Step S706, the control unit 22 causes the three-dimensional object displayed between the first body and the second body to be in the provisionally selected state. Further, at Step S707, the control unit 22 calculates the distance between the first body and the second body.

Then, at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

When the first body and the second body have been detected, and there is the three-dimensional object in the provisionally selected state (Yes at Step S703), then at Step S708, the control unit 22 calculates the distance between the first body and the second body. Then, at Step S709, the control unit 22 determines whether the distance is kept substantially constant. When the distance is not kept substantially constant (No at Step S709), then at Step S714, the control unit 22 cancels the provisionally selected state of the three-dimensional object in the provisionally selected state.

Then, at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

When the distance between the first body and the second body is kept substantially constant (Yes at Step S709), then at Step S710, the control unit 22 determines whether a period in which the distance is kept substantially constant is a predetermined time or more. When the period in which the distance is kept substantially constant is less than the predetermined time (No at Step S710), then at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

When the period in which the distance is kept substantially constant is the predetermined time or more (Yes at Step S710), then at Step S711, the control unit 22 cause the three-dimensional object displayed between the first body and the second body to be in the selected state. Further, at Step S712, the control unit 22 moves the three-dimensional object to between the first body and the second body. Then, at Step S713, the control unit 22 executes operation detecting processing illustrated in FIGS. 12 to 14, and changes the three-dimensional object in the selected state according to detected operation in the processing.

After the operation detecting processing is terminated, then at Step S715, the control unit 22 determines whether the operation termination has been detected. When the operation termination has been detected (Yes at Step S715), the control unit 22 terminates the selection detecting processing. When the operation termination is not detected (No at Step S715), the control unit 22 re-executes Step S702 and the subsequent steps.

Embodiment 3

Hereinafter, a third embodiment will be described. While a display device 1 according to the third embodiment is different from the first embodiment in processing procedures of selection detecting processing and operation detecting processing executed based on a function provided by a control program 24a, the display device 1 according to the third embodiment has the same configuration as the display device 1 according to the first embodiment in terms of hardware. Therefore, in the third embodiment, description overlapping with the first embodiment is omitted, and the selection detecting processing and the operation detecting processing will be mainly described.

Figure 26:
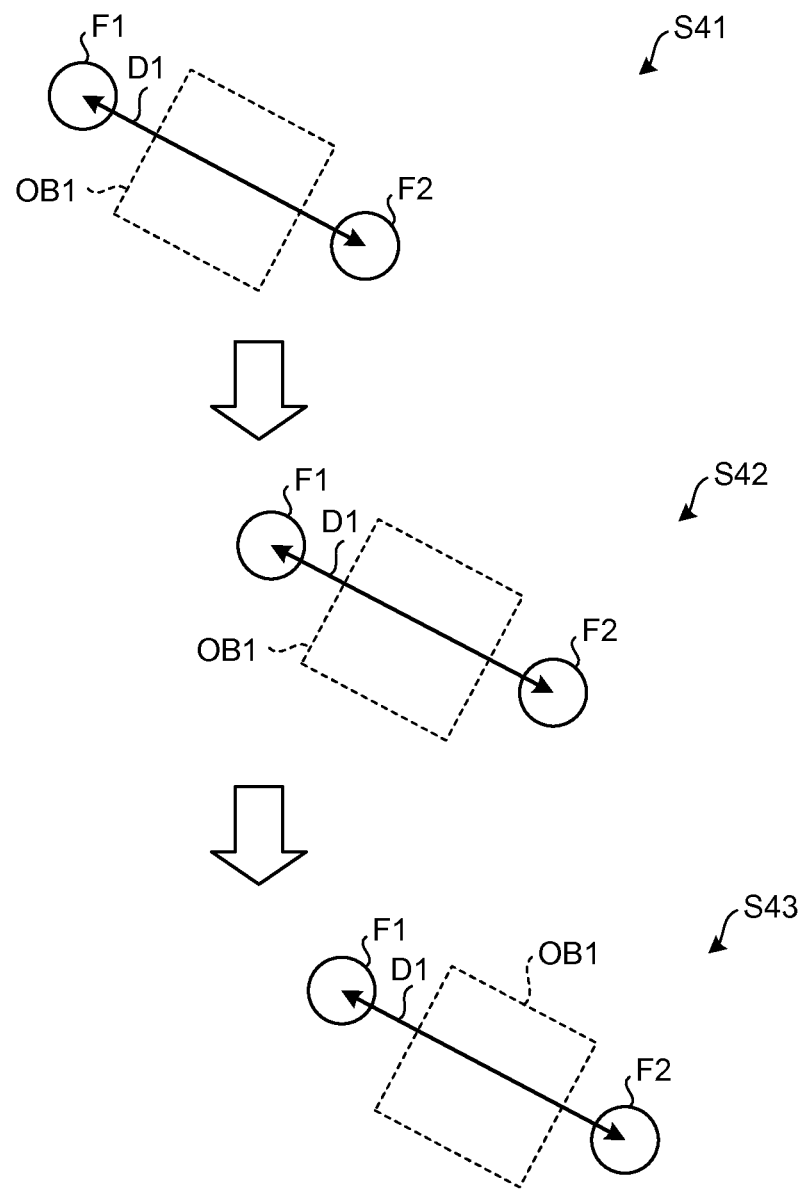
FIG. 26 is a diagram for describing detection of operation with respect to a three-dimensional object in a third embodiment.
Figure 27:
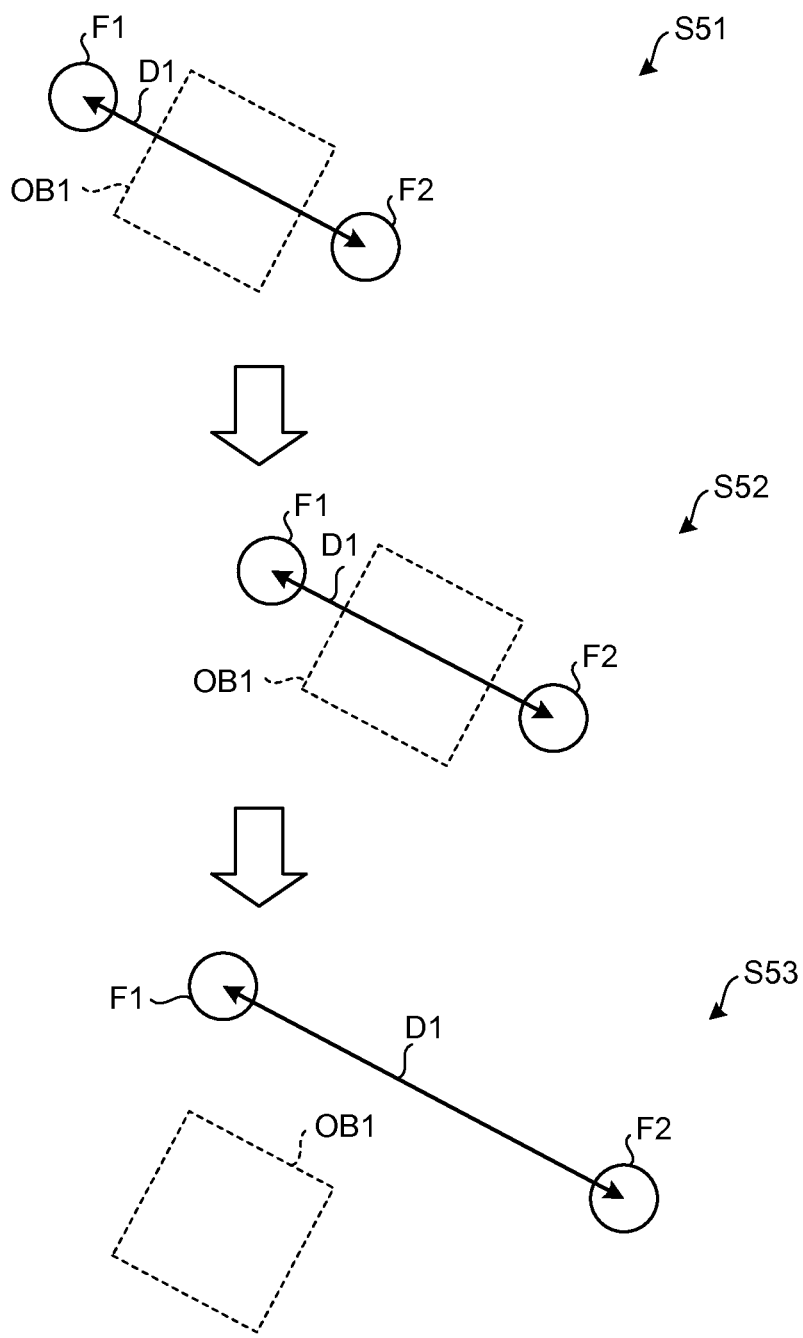
FIG. 27 is a diagram for describing the detection of operation with respect to a three-dimensional object in the third embodiment.

First of all, detection of operation with respect to a three-dimensional object will be described with reference to FIGS. 26 and 27. FIGS. 26 and 27 are diagrams for describing detection of operation with respect to a three-dimensional object. At Step S41 illustrated in FIG. 26, a three-dimensional object OB1 is stereoscopically displayed in a display space by display units 32a and 32b. Further, to select the three-dimensional object OB1, a user is moving a finger F1 and a finger F2 so that the three-dimensional object OB1 is positioned between the finger F1 and the finger F2.

When two bodies are detected in the display space, and the three-dimensional object OB1 is positioned between the two bodies, the display device 1 monitors change of the distance between the two bodies. Then, the distance is kept substantially constant for a predetermined time or more, the display device 1 determines that the three-dimensional object OB1 has been selected, and causes the three-dimensional object OB1 to be in a selected state. Then, the display device 1 notifies the user of the fact that the three-dimensional object OB1 becomes in the selected state, by changing a display style of the three-dimensional object OB1, or the like.

The two bodies do not necessarily stay at the position where the three-dimensional object OB1 is sandwiched while the display device 1 is monitoring the change of the distance between the two bodies. That is, as illustrated at Step S41, after the user moves the finger F1 and the finger F2 so that the three-dimensional object OB1 is positioned between the finger F1 and the finger F2, the user can move the finger F1 and the finger F2 to another position without keeping the state of the first finger F1 and the second finger F2.

As illustrated at Step S42, assume that the user has moved the finger F1 and the finger F2 from the state of Step S41 while keeping a distance D1 between the finger F1 and the finger F2 substantially constant. In this case, the display device 1 applies change, such as movement, rotation, deformation, or disappearance, to the three-dimensional object OB1 at a stage where displaying of the three-dimensional object OB1 between the finger F1 and the finger F2 has been detected, that is, at a stage of Step S41, according to movement of the finger F1 and the finger F2. Then, as illustrated at Step S43, the display device 1 causes the three-dimensional object OB1 to be in a selected state at a stage where a state in which the distance D1 between the finger F1 and the finger F2 is kept substantially constant is continued for a predetermined time or more.

As illustrated from Steps S51 to S53 of FIG. 27, when the distance D1 between the finger F1 and the finger F2 is separated before the predetermined time elapses, that is, when selection has not been performed, the display device 1 applies reverse change to the change applied so far to the three-dimensional object OB1. As a result, the three-dimensional object OB1 is displayed at the same position in the same state as the stage of Step S51. The speed to apply the reverse change to the three-dimensional object OB1 may be faster than the speed at which the change to the three-dimensional object OB1 had been applied so far. That is, the display device 1 may reversely change the three-dimensional object OB1 as if the three-dimensional object OB1 were reversely reproduced at a high speed.

As described above, by starting applying of the change to the three-dimensional object at the stage where displaying of the three-dimensional object between the two bodies has been detected, the user can recognize the three-dimensional object is getting selected before the selection is determined. As a result, the user can get to know whether the intended three-dimensional object has been selected at an early stage. The three-dimensional object, to which the change is being applied, may be displayed in a different style (for example, translucently) from a normal time and the selected state until the state in which the distance between the two bodies is kept substantially constant is continued for the predetermined time or more, so that the user may be able to easily discriminate a state of the three-dimensional object.

Figure 28:
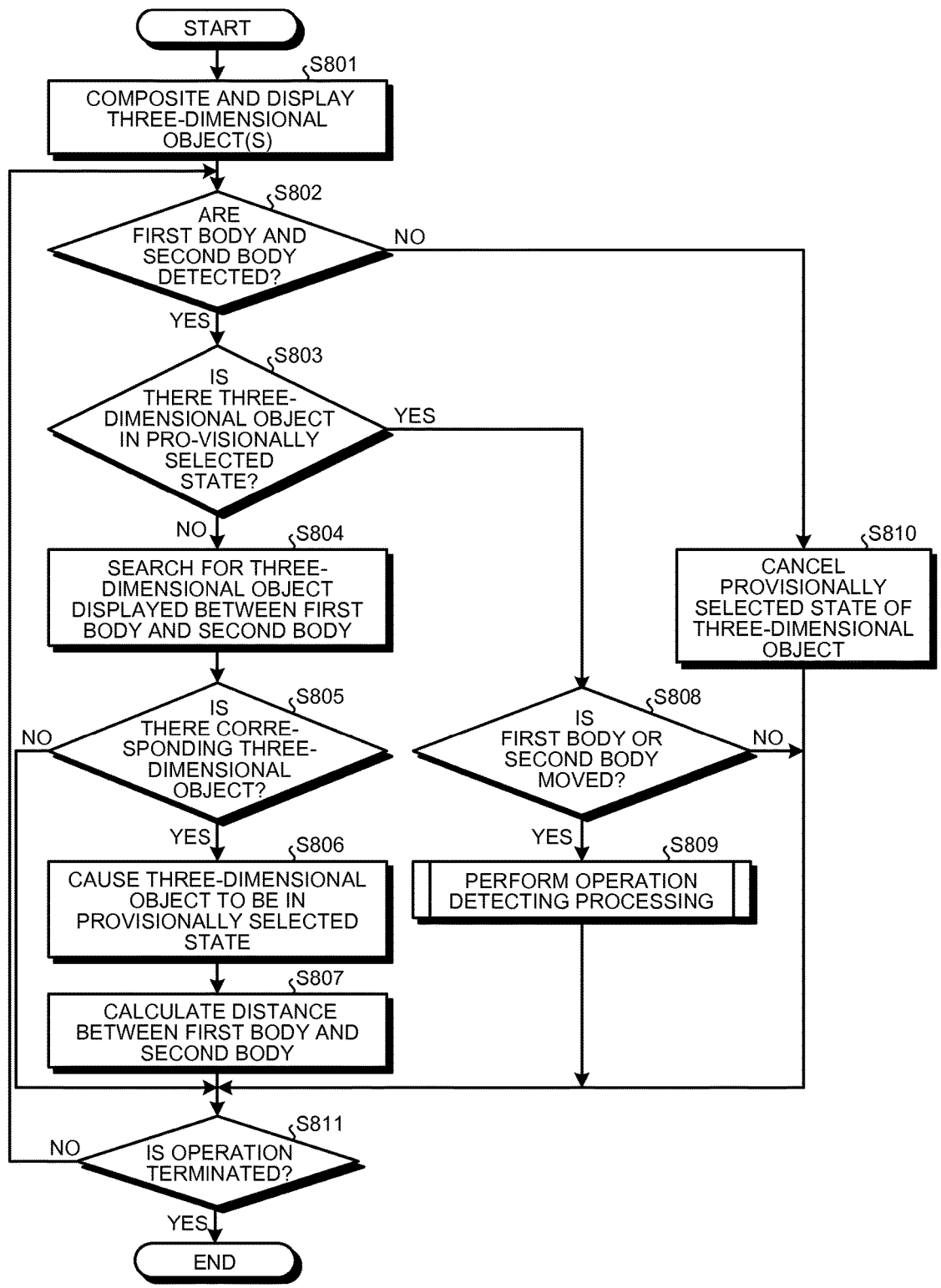
FIG. 28 is a flowchart illustrating a processing procedure of selection detecting processing.

Then, a processing procedure executed by the display device 1 in regard to operation of a three-dimensional object will be described with reference to FIGS. 28 and 29. FIG. 28 is a flowchart illustrating a processing procedure of selection detecting processing of a three-dimensional object. The processing procedure illustrated in FIG. 28 is realized by a control unit 22 that executes the control program 24a.

As illustrated in FIG. 28, first of all, at Step S801, the control unit 22 composites an image in the virtual space including the three-dimensional object(s) and an image in the real space, and displays a composite image. To be specific, in the present embodiment, the control unit 22 stereoscopically displays an aggregation (three-dimensional object) configured such that a plurality of regular hexahedrons is arranged in mutually perpendicular three directions, in the display space by the display unit 32a, as illustrated in FIGS. 9 and 10, and the like. That is, the control unit 22 controls the display unit 32a to stereoscopically display a cubic puzzle (three-dimensional object) in the display space.

Following that, at Step S802, the control unit 22 determines whether a first body and a second body have been detected by a detection unit 44, that is, by imaging units 40 and 42. That is, the control unit 22 controls the detection unit 44 to detect movement of bodies (including the first body and the second body) in the display space. To be specific, in the present embodiment, the control unit 22 controls the detection unit 44 to detect that there are bodies (including the first body and the second body) at a position where the bodies hold the aggregation (a state of holding the aggregation with one hand in FIG. 9), as illustrated in FIG. 9. Further, the control unit 22 controls the detection unit 44 to detect two pairs of bodies that hold the aggregation at two places (a state of holding the aggregation with both hands in FIG. 10), as illustrated in FIG. 10. Although not illustrated, the control unit 22 may control the detection unit 44 to detect the two pairs of bodies that hold the aggregation at two places (the state of holding the aggregation with both hands), and to further detect another body (for example, a free finger, a hand of another user, or the like) different from the two pairs of bodies.

When the first body and the second body are not detected (No at Step S802), then at Step S810, if there is a three-dimensional object in a provisionally selected state, the control unit 22 cancels the provisionally selected state of the three-dimensional object.

Then, at Step S811, the control unit 22 determines whether an operation termination has been detected. When the operation termination has been detected (Yes at Step S811), the control unit 22 terminates the selection detecting processing. When the operation termination is not detected (No at Step S811), the control unit 22 re-executes Step S802 and the subsequent steps.

When the first body and the second body have been detected (Yes at Step S802), then at Step S803, the control unit 22 determines whether there is the three-dimensional object in the provisionally selected state. When there is no three-dimensional object in the provisionally selected state (No at Step S803), then at Step S804, the control unit 22 searches the displayed three-dimensional object(s) for a three-dimensional object displayed between the first body and the second body.

When there is no corresponding three-dimensional object (No at Step S805), then at Step S811, the control unit 22 determines whether the operation termination has been detected. When the operation termination has been detected (Yes at Step S811), the control unit 22 terminates the selection detecting processing. When the operation termination is not detected (No at Step S811), the control unit 22 re-executes Step S802 and subsequent steps.

When the three-dimensional object displayed between the first body and the second body has been found (Yes at Step S805), then at Step S806, the control unit 22 causes the three-dimensional object displayed between the first body and the second body to be in the provisionally selected state. Further, at Step S807, the control unit 22 calculates the distance between the first body and the second body.

Then, at Step S811, the control unit 22 determines whether the operation termination has been detected. When the operation termination has been detected (Yes at Step S811), the control unit 22 terminates the selection detecting processing. When the operation termination is not detected (No at Step S811), the control unit 22 re-executes Step S802 and the subsequent steps.

When the first body and the second body have been detected, and there is the three-dimensional object in the provisionally selected state (Yes at Step S803), then at Step S808, the control unit 22 determines whether at least one of the first body and the second body has moved. When neither the first body nor the second body has moved (No at Step S808), then at Step S811, the control unit 22 determines whether the operation termination has been detected. When the operation termination has been detected (Yes at Step S811), the control unit 22 terminates the selection detecting processing. When the operation termination is not detected (No at Step S811), the control unit 22 re-executes Step S802 and the subsequent steps.

Figure 29:
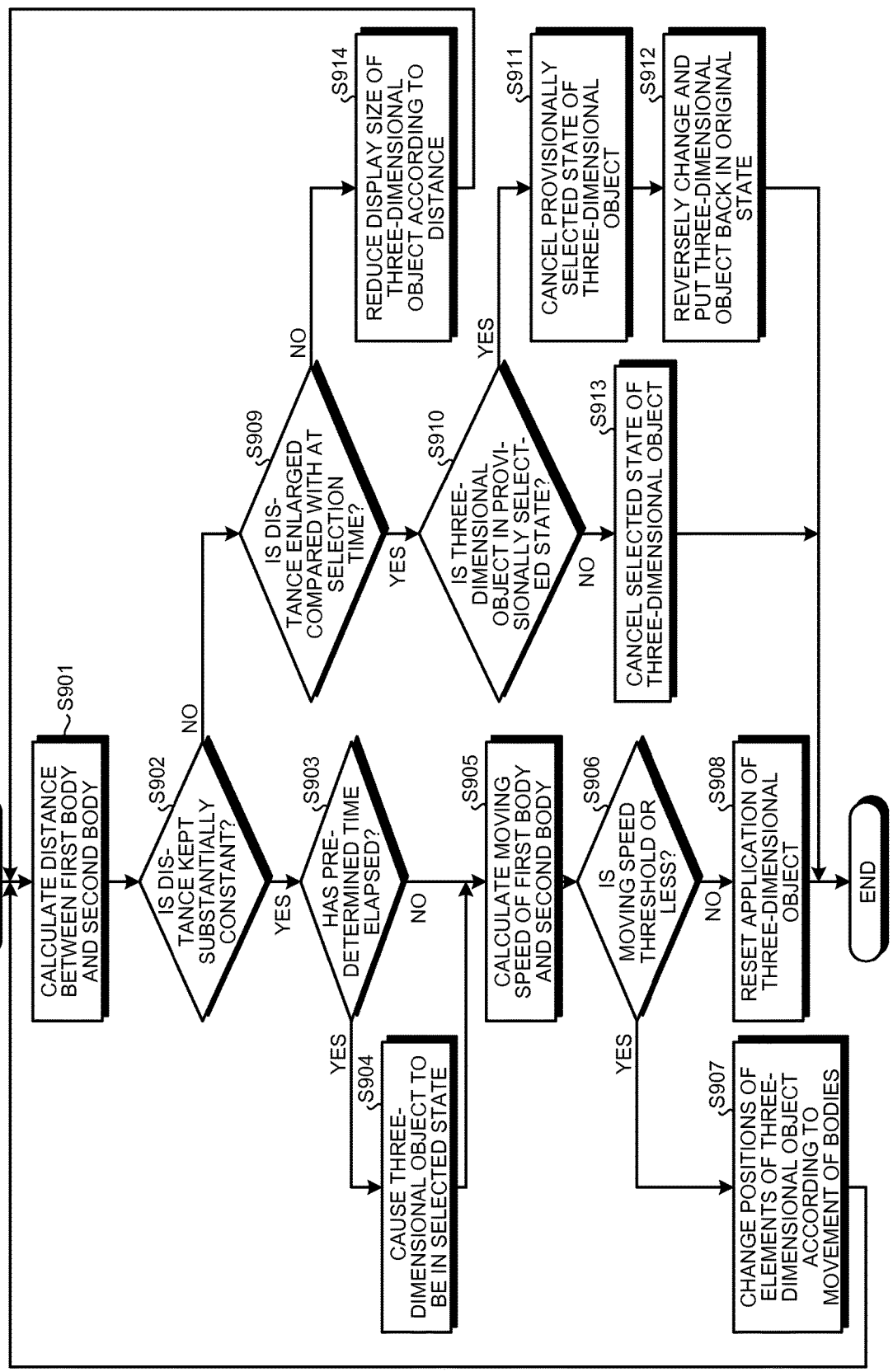
FIG. 29 is a flowchart illustrating a processing procedure of operation detecting processing.

When at least one of the first body and the second body has moved (Yes at Step S808), then at Step S809, the control unit 22 executes operation detecting processing illustrated in FIG. 29, and changes the three-dimensional object in the selected state according to detected operation in the processing.

After the operation detecting processing is terminated, then at Step S811, the control unit 22 determines whether the operation termination has been detected. When the operation termination has been detected (Yes at Step S811), the control unit 22 terminates the selection detecting processing. When the operation termination is not detected (No at Step S811), the control unit 22 re-executes Step S802 and the subsequent steps.

FIG. 29 is a flowchart illustrating a processing procedure of the operation detecting processing. The processing procedure illustrated in FIG. 29 is realized by the control unit 22 that executes the control program 24a. As illustrated in FIG. 29, first of all, at Step S901, the control unit 22 calculates the distance between the first body and the second body. Then, at Step S902, the control unit 22 determines whether the distance between the first body and the second body is kept substantially constant at and after start timing of the operation detecting processing.

When the distance between the first body and the second body is kept substantially constant (Yes at Step S902), then at Step S903, the control unit 22 determines whether a predetermined time has elapsed after the operation detecting processing is started. When the predetermined time has elapsed (Yes at Step S903), then at Step S904, if there is a three-dimensional object in the provisionally selected state, the control unit 22 causes the three-dimensional object to be in the selected state. When the predetermined time has not elapsed (No at Step S903), Step S904 is not executed.

Following that, at Step S905, the control unit 22 calculates a moving speed of the first body and the second body. Then, at Step S906, the control unit 22 determines whether the calculated moving speed is a threshold or less. When the moving speed is the threshold or less (Yes at (Step S906), then at Step S907, the control unit 22 moves and/or rotates the three-dimensional object according to the detected movement of the first body and the second body. To be specific, in the present embodiment, at Step S907, the control unit 22 changes positions of regular hexahedrons of an aggregation (three-dimensional object) as illustrated in FIGS. 9, 10, and 15 to 19 according to the detection result of the detection unit 44 (that is, the movement of the bodies). That is, the control unit 22 changes positions of pieces of a cubic puzzle (three-dimensional object) as illustrated in FIGS. 9, 10, and 15 to 19 according to the detection result of the detection unit 44. Then, the control unit 22 re-executes Step S901 and the subsequent steps.

When the moving speed is larger than the threshold (No at Step S906), then at Step S908, the control unit 22 resets an application (game) of the three-dimensional object. That is, in the present embodiment, the three-dimensional object is the cubic puzzle, and thus the control unit 22 deletes the three-dimensional object during the progress of the game of the cubic puzzle, thereby to reset the game to the start time. To be specific, in deleting the three-dimensional object, the control unit 22 may display animation such that the three-dimensional object flies on to the moving direction of the first body and the second body. Then, the control unit 22 terminates the operation detecting processing.

When the distance between the first body and the second body is not kept substantially constant (No at Step S902), then at Step S909, the control unit 22 determines whether the distance is enlarged, compared with at the time of selecting the three-dimensional object, that is, the start timing of the operation detecting processing. When the distance is enlarged (Yes at Step S909), then at Step S910, the control unit 22 determines whether the three-dimensional object displayed between the first body and the second body is in the provisionally selected state.

When the three-dimensional object is in the provisionally selected state (Yes at Step S910), then at Step S911, the control unit 22 cancels the provisionally selected state of the three-dimensional object. Further, at Step S912, the control unit 22 reversely changes the three-dimensional object and puts it back in an original state. Then, the control unit 22 terminates the operation detecting processing.

When the three-dimensional object is not in the provisionally selected state, that is, the three-dimensional object is in the selected state (No at Step S910), then at Step S913, the control unit 22 cancels the selected state of the three-dimensional object. Then, the control unit 22 terminates the operation detecting processing.

In the present embodiment, a basic rule is to control the state where the three-dimensional object is floating without considering the gravity. However, the gravity may be taken into account, and the three-dimensional object may be controlled to fall down when the user does not hold the three-dimensional object. To be specific, after the processing of Step S913, the control unit 22 may move the three-dimensional object, the selected state of which has been canceled, according to the gravity or the like after the elapse of a certain time, and may return the three-dimensional object to an initially arranged place. In this case, the control unit 22 may move the three-dimensional object slower than a case where actual gravity acts. Then, the control unit 22 terminates the operation detecting processing. The movement here is displayed such that the three-dimensional object falls down according to the gravity, and is stopped on a floor or a table, for example. Before stopping the movement of the three-dimensional object, the three-dimensional object may be caused to bound according to elasticity of the three-dimensional object and hardness of the floor or the table. Magnitude of impact of when the three-dimensional object collides with the floor or the table is calculated, and when the impact is larger than a predetermined value, the control unit 22 may display the three-dimensional object as if it had been broken. In this case, similarly to the processing of Step S908, the game is reset to the start time.

When the distance between the first body and the second body is enlarged, compared with at the time of selecting the three-dimensional object, the display size of the three-dimensional object may be enlarged without canceling the selected state of the three-dimensional object. In this case, to distinguish this processing from the processing of canceling the selected state of the three-dimensional object, the control unit 22 enlarges the display size of the three-dimensional object without canceling the elected state of the three-dimensional object, only when the two pairs of bodies select the three-dimensional object in the above selection detecting processing, and movement that the bodies enlarge the three-dimensional object is detected in this operation detecting processing (that is, movement that the three-dimensional object is held and enlarged with both hands is detected).

Meanwhile, when the distance between the first body and the second body is reduced, compared with at the time of selecting the three-dimensional object (No at Step S909), then at Step S914, the control unit 22 reduces the display size of the three-dimensional object according to the distance. Accordingly, the user can reduce the display size of the three-dimensional object stereoscopically displayed in the display space into a size that meets preference to the user. Then, the control unit 22 re-executes Step S901 and the subsequent steps. The degree of reduction of the display size of the three-dimensional object may be changed according to hardness set to the three-dimensional object as an attribute. When the distance between the first body and the second body is remarkably reduced, compared with at the time of selecting the three-dimensional object, that is, when the distance between the first body and the second body is a predetermined value or less, the control unit 22 may display the three-dimensional object as if it had been broken. For example, in the present embodiment, the control unit 22 may reset the game to the start time by deleting the three-dimensional object during the progress of the game of the cubic puzzle that is the three-dimensional object, like the operation to squash the three-dimensional object at Step S908.

As described above, in the third embodiment, the three-dimensional object is changed according to the operation from the timing at which the three-dimensional object being positioned between the bodies such as the fingers has been detected. Therefore, the user can easily recognize the selection of the three-dimensional object.

Figure 30:
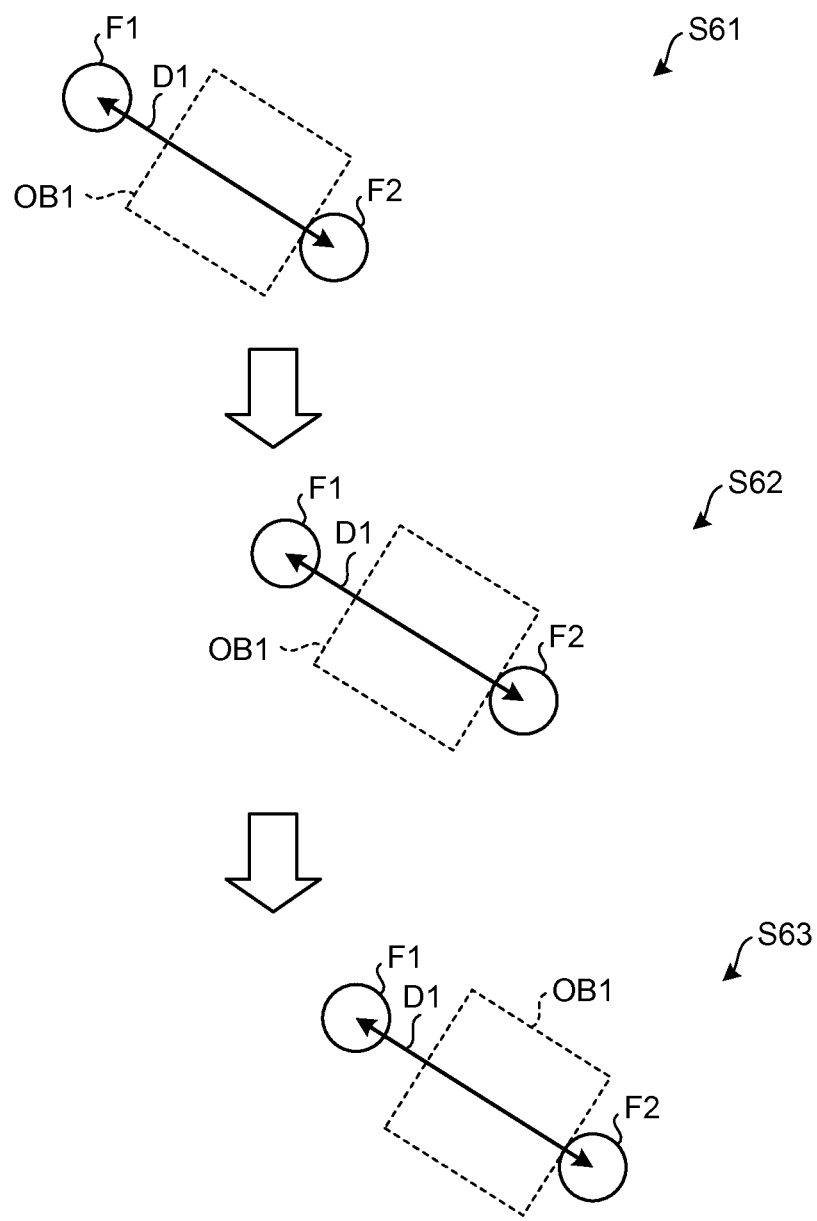
FIG. 30 is a diagram for describing another example of detection of operation with respect to a three-dimensional object.

As illustrated in Steps S61 to S63 of FIG. 30, the distance between the first body and the second body being kept substantially constant for a predetermined time or more after at least one of the first body and the second body comes in contact with the three-dimensional object may be employed as a condition of the selection of the three-dimensional object. FIG. 30 is a diagram for describing another example of the detection of the operation with respect to the three-dimensional object. By employing the contact to the three-dimensional object as the condition of the selection, the user can easily select a desired three-dimensional object when a plurality of three-dimensional objects is closely displayed.

Figure 31:
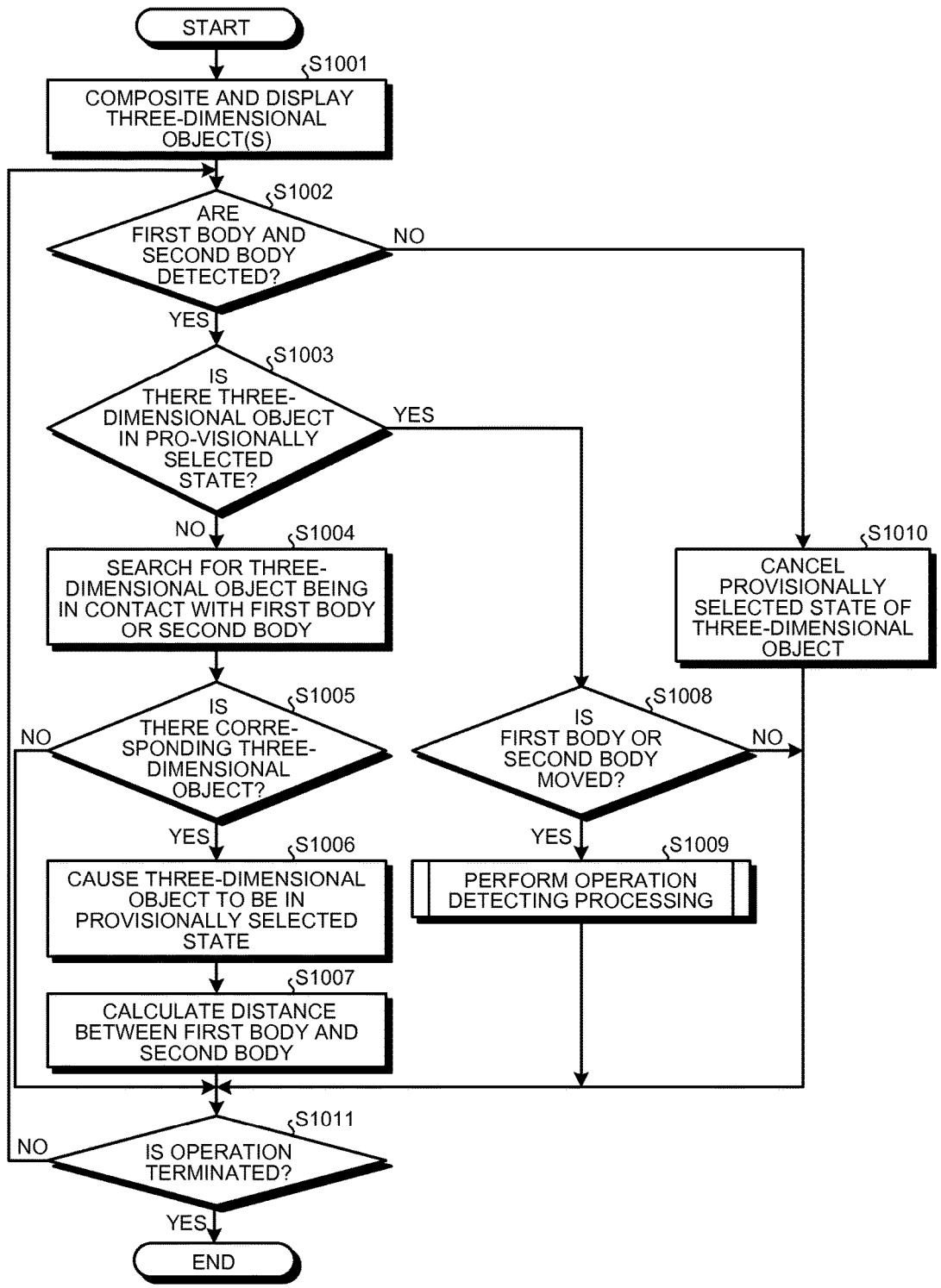
FIG. 31 is a flowchart illustrating a processing procedure of selection detecting processing of when contact to a three-dimensional object is a condition of selection.
Figure 32A:
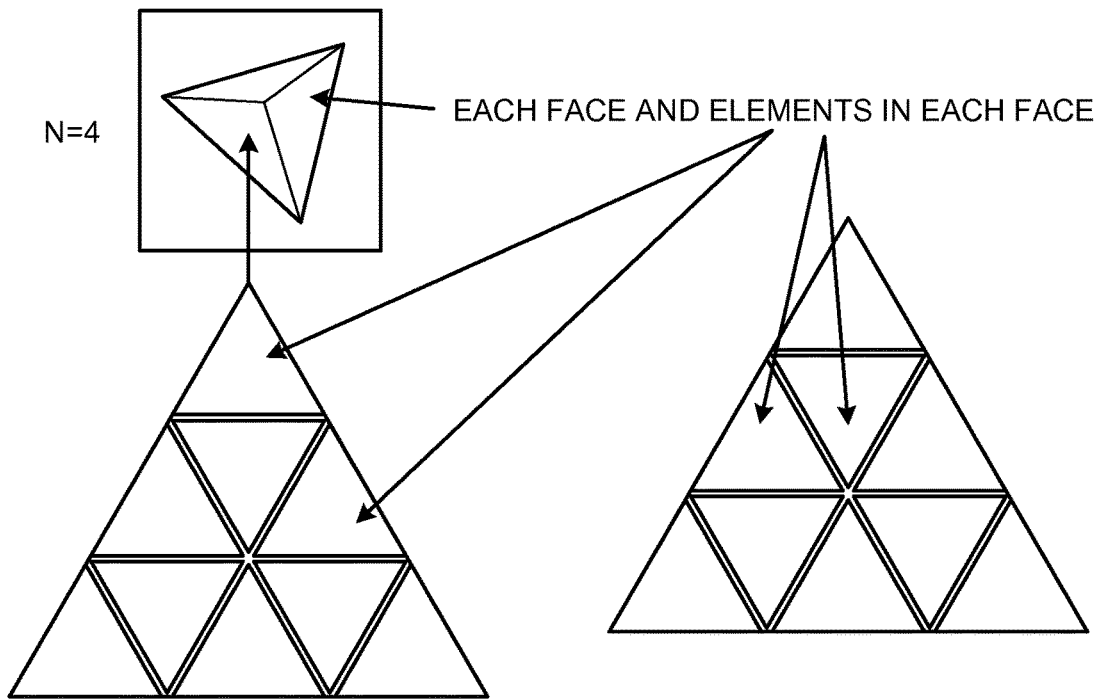
FIG. 32A is a diagram illustrating an embodiment in a regular polyhedron with N faces (N=4), and is a diagram illustrating elements in respective faces.
Figure 32B:
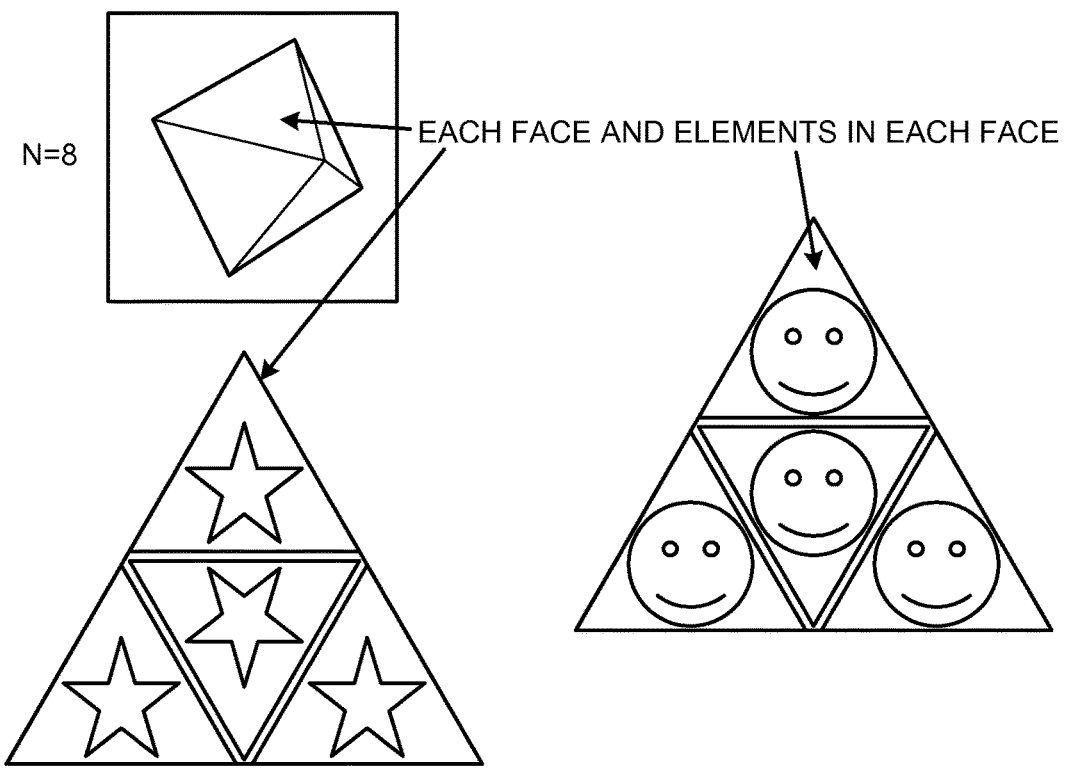
FIG. 32B is a diagram illustrating an embodiment of a regular polyhedron with N faces (N=8), and is a diagram illustrating elements in respective faces.
Figure 32C:
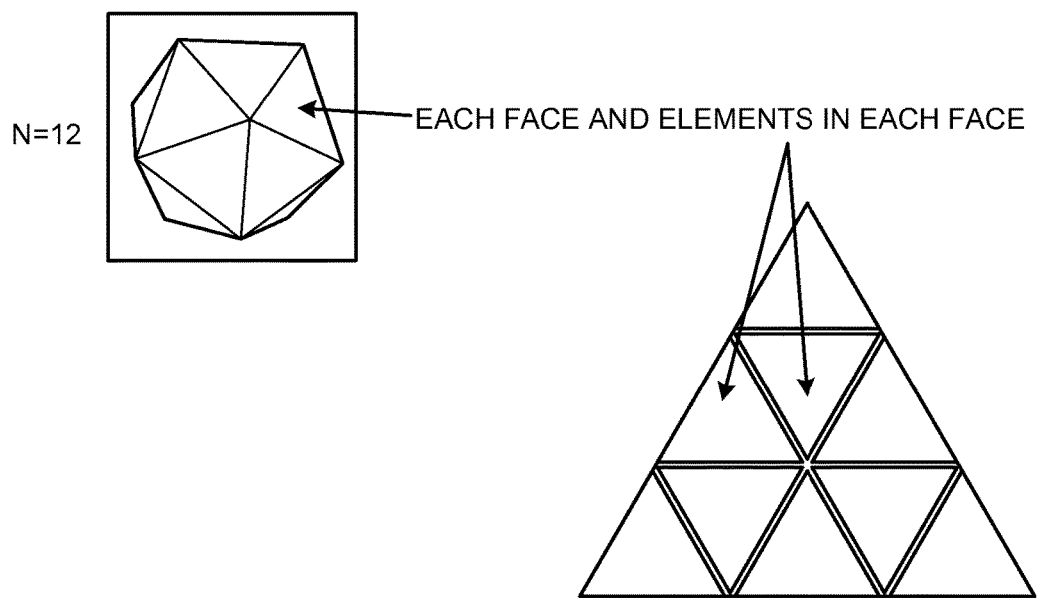
FIG. 32C is a diagram illustrating an embodiment of a regular polyhedron with N faces (N=12), and is a diagram illustrating elements in respective faces.
Figure 32D:
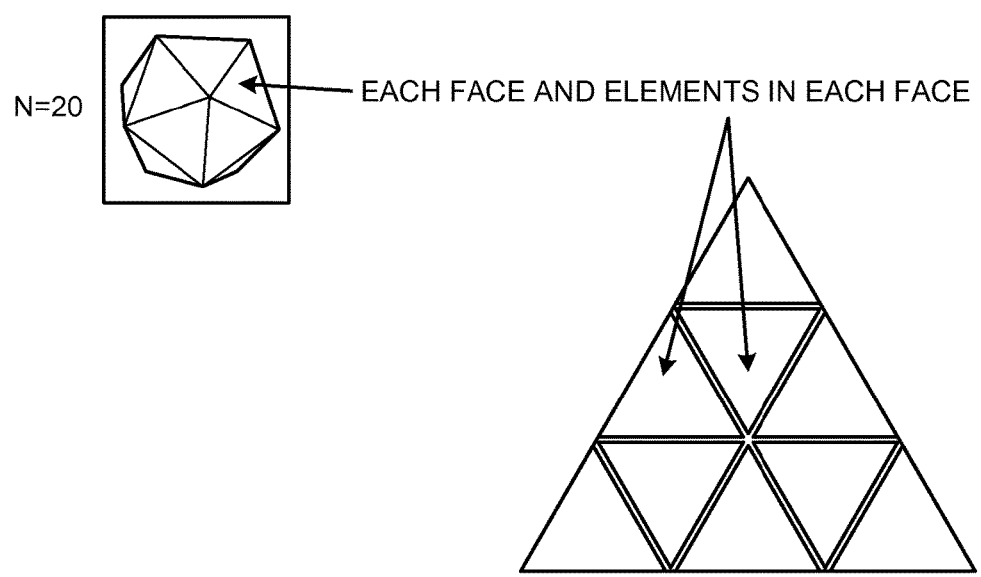
FIG. 32D is a diagram illustrating an embodiment of a regular polyhedron with N faces (N=20), and is a diagram illustrating elements in respective faces.

FIG. 31 is a flowchart illustrating a processing procedure of the selection detecting processing of when the contact to the three-dimensional object is the condition of the selection. As illustrated in FIG. 31, first of all, at Step S1001, the control unit 22 composites an image in the virtual space including the three-dimensional object(s) and an image in the real space, and displays a composite image. To be specific, in the present embodiment, the control unit 22 stereoscopically displays an aggregation (three-dimensional object) configured such that a plurality of regular hexahedrons is arranged in mutually perpendicular three directions, in the display space by the display unit 32a, as illustrated in FIGS. 9 and 10, and the like. That is, the control unit 22 controls the display unit 32a to stereoscopically display a cubic puzzle (three-dimensional object) in the display space.

Following that, at Step S1002, the control unit 22 determines whether a first body and a second body have been detected by a detection unit 44, that is, by imaging units 40 and 42. That is, the control unit 22 controls the detection unit 44 to detect movement of bodies (including the first body and the second body) in the display space. To be specific, in the present embodiment, the control unit 22 controls the detection unit 44 to detect that there are bodies (including the first body and the second body) at a position where the bodies hold the aggregation (a state of holding the aggregation with one hand in FIG. 9), as illustrated in FIG. 9. Further, the control unit 22 controls the detection unit 44 to detect two pairs of bodies that hold the aggregation at two places (a state of holding the aggregation with both hands in FIG. 10), as illustrated in FIG. 10. Although not illustrated, the control unit 22 may control the detection unit 44 to detect the two pairs of bodies that hold the aggregation at two places (the state of holding the aggregation with both hands), and to further detect another body (for example, a free finger, a hand of another user, or the like) different from the two pairs of bodies.

When the first body and the second body are not detected (No at Step S1002), then at Step S1010, if there is a three-dimensional object in the provisionally selected state, the control unit 22 cancels the provisionally selected state of the three-dimensional object.

Then, at Step S1011, the control unit 22 determines whether the operation termination has been detected. When the operation termination has been detected (Yes at Step S1011), the control unit 22 terminates the selection detecting processing. When the operation termination is not detected (No at Step S1011), the control unit 22 re-executes Step S1002 and the subsequent steps.

When the first body and the second body have been detected (Yes at Step S1002), then at Step S1003, the control unit 22 determines whether there is the three-dimensional object in the provisionally selected state. When there is no three-dimensional object in the provisionally selected state (No at Step S1003), then at Step S1004, the control unit 22 searches the displayed three-dimensional object(s) for a three-dimensional object that is in contact with at least one of the first body and the second body.

When there is no corresponding three-dimensional object (No at Step S1005), then at Step S1011, the control unit 22 determines whether the operation termination has been detected. When the operation termination has been detected (Yes at Step S1011), the control unit 22 terminates the selection detecting processing. When the operation termination is not detected (No at Step S1011), the control unit 22 re-executes Step S1002 and the subsequent steps.

When the three-dimensional object that is in contact with at least one of the first body and the second body has been found (Yes at Step S1005), then at Step S1006, the control unit 22 causes the three-dimensional object displayed between the first body and the second body to be in the provisionally selected state. Further, at Step S1007, the control unit 22 calculates the distance between the first body and the second body.

Then, at Step S1011, the control unit 22 determines whether the operation termination has been detected. When the operation termination has been detected (Yes at Step S1011), the control unit 22 terminates the selection detecting processing. When the operation termination is not detected (No at Step S1011), the control unit 22 re-executes Step S1002 and the subsequent steps.

When the first body and the second body have been detected, and there is the three-dimensional object in the provisionally selected state (Yes at Step S1003), then at Step S1008, the control unit 22 determines whether at least one of the first body and the second body has moved. When neither the first body nor the second body has moved (No at Step S1008), then at Step S1011, the control unit 22 determines whether the operation termination has been detected. When the operation termination has been detected (Yes at Step S1011, the control unit 22 terminates the selection detecting processing. When the operation termination is not detected (No at Step S1011), the control unit 22 re-executes Step S1002 and the subsequent steps.

When at least one of the first body and the second body has moved (Yes at Step S1008), then at Step S1009, the control unit 22 executes operation detecting processing illustrated in FIG. 29, and changes the three-dimensional object in the selected state according to detected operation in the processing.

After the operation detecting processing is terminated, then at Step S1011, the control unit 22 determines whether the operation termination has been detected. When the operation termination has been detected (Yes at Step S1011), the control unit 22 terminates the selection detecting processing. When the operation termination is not detected (No at Step S1011), the control unit 22 re-executes Step S1002 and the subsequent steps.

According to the above-described embodiments, the following matters become possible. In the selection of the three-dimensional object according to the embodiments, when the body such as the hand enter all of the display space (object region), the three-dimensional object is moved or changed. Therefore, an action linked to the actual world to some extent can be caused. Further, in the case of a game, the hand can be intentionally moved out from the display space. Further, in the embodiments, the bodies such as the hands being fixed for a certain time in the vicinity of a target three-dimensional object is detected. Therefore, the three-dimensional object can be deformed and/or moved in conjunction with subsequent movement of the hand. When there is a plurality of three-dimensional objects and distances from the hand to the respective three-dimensional objects are the same, the three-dimensional object can be selected by determining which direction the palm of the hand faces. Alternatively, selection can be performed after the hand is moved. That is, the selection can be performed by detecting which three-dimensional object the hand is approaching. In the embodiments, in addition to the deformation/movement of the three-dimensional object based on a specific input signal after selection of the three-dimensional object, the selection may be performed by pointing at the three-dimensional object, uttering a voice, or looking at the three-dimensional object. In this case, after designation of the three-dimensional object, the three-dimensional object can be moved with the amount of movement of the hand, even if the bodies such as the hand do not necessarily enter the display space (object region).

Further, in the deformation and/or movement of the three-dimensional object according to the embodiments, an action to the three-dimensional object can be changed according to a contact area or a contact position to the three-dimensional object. Accordingly, for example, the action can be changed between a case of pushing with a finger and a case of pushing with a palm. In this case, the action can be changed in consideration of friction and the like, depending on which place the three-dimensional object is placed on (for example, being placed on what type of thing). In this case, when the hand is in a different place from the three-dimensional object, the hand is virtually displayed at the position of the three-dimensional object, whereby the contact area and contact position to the three-dimensional object can be adjusted. That is, the finger is not necessarily at the position of the three-dimensional object. Further, in the embodiments, details of deformation and/or movement can be changed depending on the three-dimensional object. For example, a soft one is deformed when being pushed, and a hard one can be moved as the whole three-dimensional object. In this case, when the speed of the hand brought into contact with the three-dimensional object is fast, the three-dimensional object may be deformed, and when the speed is slow, the three-dimensional object may be moved as a whole. In the embodiments, basically, the deformation and/or movement is main processing to the three-dimensional object. However, in the cases of a candle, a lighter or the like, an action that the three-dimensional object starts or stops burning can be caused by pushing. Further, in the embodiments, a deformation and/or movement result in consideration of the gravity can be reflected to the three-dimensional object.

Further, in releasing (separating) of the three-dimensional object according to the embodiments, the releasing of the finger as the body from a surface position (coordinates) of the three-dimensional object may be detected, to thereby release the three-dimensional object. Further, in the embodiments, the releasing of the three-dimensional object may be notified with a voice, to thereby release the three-dimensional object.

Hereinafter, application examples and modifications of the display device described in the above embodiments will be described. The change applied to the three-dimensional object according to the detected operation is not limited to the above-described movement, rotation, deformation, disappearance, or the like. The operation detected in the operation detecting processing and the change applied to the three-dimensional object according to the operation are not limited to the above embodiments, and may be changed according to the type of the three-dimensional object.

Aspects of the present invention described in the embodiments can be arbitrarily modified without departing from the gist of the present invention. The above-described embodiments can be appropriately combined. For example, the control program 24*a* described in the embodiments may be divided into a plurality of modules, or may be integrated with another program. Further, in the above-described embodiments, the operation has been made to the three-dimensional object with fingers. However, a bar-like body or the like may be used instead of the fingers.

In the above-described embodiments, the display device alone has detected the operation to the three-dimensional object. However, the display device may detect the operation to the three-dimensional object in cooperation with a server. In this case, the display device successively transmits information detected by the detection unit to the server, and the server detects operation and notifies the display device of the detection result. In other words, while, in the above-described embodiments, the control unit 22 has performed the selection detecting processing and the operation detecting processing of the three-dimensional object using the control program 24*a* stored in the storage unit 24, the present invention is not limited thereto. The display device may execute various types of calculation processing in a server that can perform communication with the display device. That is, the calculation processing itself may be performed outside. In this case, the display device performs transmission of the information detected by the detection unit to the server, reception of data after the calculation processing from the server, and the like. As described above, the calculation is performed in the server, whereby the load applied to the display device can be reduced. That is, the above-described processing may be performed using the server and the display device as a control system. With such a configuration, the load of the display device can be decreased.

Further, in the above-described embodiment, a case of the cube (regular hexahedron) has been described. However, the embodiment is not limited thereto. For example, as illustrated in FIGS. 32A to 32D, the present invention can be applied to various regular polyhedrons with N faces (N=4, 6, 8, 12, or 20).

To be specific, the display unit may just stereoscopically display an aggregation configured such that a plurality of regular polyhedrons is arrayed along faces configured by connecting vertexes of a regular polyhedron with N faces (N=4, 6, 8, 12, or 20), in the display space. Providing a detection unit that detects movement of bodies in the display space, and a control unit that changes positions of the regular polyhedrons of the aggregation according to a detection result of the detection unit is the same as the above embodiments. Further, faces of the aggregation including external faces of the regular polyhedrons as elements, and providing notifications with which whether all of the elements on the same face of the aggregation belong to the same group is discriminative to the elements of the aggregation is also similar to the above embodiments. Examples in which elements are arrayed on each face in the regular polyhedron with N faces are illustrated in the drawings. A multiple of 2 or a multiple of 3 of the elements are arrayed in each one side of each face in the case where each face is an equilateral triangle.

Then, the control unit may just control the regular polyhedrons to be pivoted such that, on a first face of the faces of the regular polyhedron with N faces, and further on a second face parallel to the first face if there is the second face, the positional relationship among the elements is not changed, and, on a plurality of other faces intersecting with the first face, or either on a plurality of other faces intersecting with the second face or on a plurality of other faces intersecting with the first face if there is the second face, part of the elements that configure the plurality of other faces are interchanged among the plurality of other faces, using a direction perpendicular to the first face as a rotation axis.

The invention claimed is:

1. A display device, comprising:
   two displays which generate images respectively corresponding to both eyes of a user when the display device is being worn on the user, wherein said images stereoscopically display an aggregation having six faces in a display space, the aggregation configured from a plurality of regular hexahedrons arrayed along mutually perpendicular three directions;
   a detector which detects movement of a body in the display space; and
   a controller which changes positions of the regular hexahedrons of the aggregation according to a detection result of the detector, wherein
   each of the six faces of the aggregation includes external faces of the regular hexahedrons as elements, and notations with which whether all of the elements on the same face of the aggregation belong to a same group is discriminative are provided to the respective elements,
   the controller controls the regular hexahedrons to be pivoted such that,
      of the six faces, in faces perpendicular to a first direction of the mutually perpendicular three directions, positional relationship among the elements that configure each of the faces is not changed, and
      of the six faces, in a plurality of other faces perpendicular to a second or third direction of the mutually perpendicular three directions, part of the elements that configure each of the plurality of other faces are interchanged among the plurality of other faces,
   based on the detection result of the detector, using the first direction as a rotation axis,
   the controller calculates a moving speed of the body in the display space, and
   in response to the calculated moving speed of the body being higher than a threshold, the controller resets an application of the aggregation to a start time.

2. The display device according to claim 1, wherein, when the detector has detected that there is the body at a position where the body holds the aggregation, and the body has moved,
   the controller controls the aggregation to be moved according to the movement of the body.

3. The display device according to claim 1, wherein, when the detector has detected two pairs of bodies that hold the aggregation at two places, and movement that the two pairs of bodies are relatively rotated around a direction into which the two pairs of bodies face each other,
   the controller determines the direction into which the two pairs of bodies face each other as the first direction, and controls the regular hexahedrons to be pivoted according to an amount of rotation of the relatively rotating movement.

4. The display device according to claim 1, wherein the two displays stereoscopically display a plurality of aggregations in the display space, and when the detector has detected, with respect to first aggregation of the plurality of aggregations, two pairs of bodies that hold the first aggregation at two places, and movement that the two pairs of bodies are relatively rotated around a direction into which the two pairs of bodies face each other, the controller determines the direction into which the two pairs of bodies face each other as the first direction, and controls the regular hexahedrons that configure the first aggregation, and the regular hexahedrons that configure second aggregation of the plurality of aggregations to be pivoted in conjunction with each other, according to an amount of rotation of the relatively rotating movement with respect to the first aggregation.

5. The display device according to claim 4, wherein
the two displays stereoscopically display the aggregations in a state where the second aggregation is nested into the first aggregation, and when the detector has detected that there is the body at a position where the body holds the second aggregation, and the body has moved,
the controller controls such that only the second aggregation is moved without moving the first aggregation, according to the movement of the body.

6. The display device according to claim 4, wherein
the two displays stereoscopically display the first aggregation and the second aggregation in the same display space, and when the detector has detected that there is the body at a position where the body holds the second aggregation, and the body has moved,
the controller controls such that the second aggregation and the first aggregation are moved in conjunction with each other, according to the movement of the body with respect to the second aggregation.

7. The display device according to claim 1, wherein the detector includes a camera or a TOF sensor.

8. The display device according to claim 1, wherein two displays display a time limit.

9. The display device according to claim 1, wherein the two displays display the number of pivoting by which the regular hexahedrons are pivoted.

10. The display device according to claim 1, wherein
in response to the calculated moving speed of the body being higher than the threshold and corresponding to throwing the aggregation, the controller deletes the aggregation.

11. A display device, comprising:
two displays which generate images respectively corresponding to both eyes of a user when the display device is being worn on the user, wherein said images stereoscopically display a polyhedron puzzle in a display space;
a detector which detects movement of a body in the display space; and
a controller which changes a position of a piece of the polyhedron puzzle according to a detection result of the detector, wherein
the controller calculates a moving speed of the body in the display space, and
in response to the calculated moving speed of the body being higher than a threshold, the controller resets an application of the polyhedron puzzle to a start time.

12. The display device according to claim 11, wherein the polyhedron puzzle is a regular polyhedron-type polyhedron puzzle.

13. The display device according to claim 12, wherein the regular polyhedron-type polyhedron puzzle includes a regular tetrahedron-type polyhedron puzzle, a regular hexahedron-type polyhedron puzzle, a regular octahedron-type polyhedron puzzle, a regular dodecahedron-type polyhedron puzzle, or a regular icosahedron-type polyhedron puzzle.

14. The display device according to claim 13, wherein the regular hexahedron-type polyhedron puzzle includes a 2×2×2 cube, a 3×3×3 cube, a 4×4×4 cube, or a 5×5×5 cube.

15. A control system, comprising:
a display device including
two displays which generate images respectively corresponding to both eyes of a user when the display device is being worn on the user, wherein said images stereoscopically display an aggregation having six faces in a display space, the aggregation configured from a plurality of regular hexahedrons arrayed along mutually perpendicular three directions, and
a detector which detects movement of a body in the display space; and
a control device including a controller which changes positions of the regular hexahedrons of the aggregation according to a detection result of the detector, wherein
each of the six faces of the aggregation includes external faces of the regular hexahedrons as elements, and notations with which whether all of the elements on the same face of the aggregation belong to a same group is discriminative are provided to the respective elements,
the controller controls the regular hexahedrons to be pivoted such that,
of the six faces, in faces perpendicular to a first direction of the mutually perpendicular three directions, positional relationship among the elements that configure the each of faces is not changed, and
of the six faces, in a plurality of other faces perpendicular to a second or third direction of the mutually perpendicular three directions, part of the elements that configure each of the plurality of other faces are interchanged among the plurality of other faces,
based on the detection result of the detector, using the first direction as a rotation axis,
the controller calculates a moving speed of the body in the display space, and
in response to the calculated moving speed of the body being higher than a threshold, the controller resets an application of the aggregation to a start time.

16. A non-transitory storage medium that stores a control program that causes, when executed by a display device including a detector and two displays which generate images respectively corresponding to both eyes of a user when the display device is being worn on the user, the display device to execute:
stereoscopically displaying, by the two displays, an aggregation having six faces in a display space, the aggregation configured from a plurality of regular hexahedrons arrayed along mutually perpendicular three directions, wherein each of the six faces of the aggregation includes external faces of the regular hexahedrons as elements, and notations with which whether all of the elements on the same face of the aggregation belong to a same group is discriminative are provided to the respective elements;
detecting, by the detector, movement of a body in the display space;
controlling the regular hexahedrons to be pivoted such that, of the six faces, in faces perpendicular to a first direction of the mutually perpendicular three directions, positional relationship among the elements that configure the each of faces is not changed, and
of the six faces, in a plurality of other faces perpendicular to a second or third direction of the mutually perpendicular three directions, part of the elements that configure each of the plurality of other faces are interchanged among the plurality of other faces,
based on the detection result of the detector, using the first direction as a rotation axis;
calculating a moving speed of the body in the display space; and
in response to the calculated moving speed of the body being higher than a threshold, resetting an application of the aggregation to a start time.

17. A display device, comprising:
two displays which generate images respectively corresponding to both eyes of a user when the display device is being worn on the user, wherein said images stereoscopically display, in a display space, an aggregation configured from a plurality of regular polyhedrons arrayed along faces configured by connecting vertexes of a regular polyhedron with N faces (N=4, 6, 8, 12, or 20);
a detector which detects movement of a body in the display space; and
a controller which changes positions of the regular polyhedrons of the aggregation according to a detection result of the detector, wherein
each of faces of the aggregation includes external faces of the regular polyhedrons as elements, and notations with which whether all of the elements on the same face of the aggregation belong to a same group is discriminative are provided to the respective elements,
the controller controls the regular polyhedrons to be pivoted such that
on a first face of the faces, and further on a second face parallel to the first face when there is the second face, positional relationship among the elements is not changed and,
on a plurality of other faces intersecting with the first face, or either on a plurality of other faces intersecting with the second face or on a plurality of other faces intersecting with the first face when there is the second face, part of the elements that configure the plurality of other faces are interchanged among the plurality of other faces,
based on the detection result of the detector, using a direction perpendicular to the first face as a rotation axis,
the controller calculates a moving speed of the body in the display space, and
in response to the calculated moving speed of the body being higher than a threshold, the controller resets an application of the aggregation to a start time.

18. A display device, comprising:
two displays which generate images respectively corresponding to both eyes of a user when the display device is being worn on the user, wherein said images stereoscopically display, in a display space, first and second aggregations each having six faces and configured from a plurality of regular hexahedrons arrayed along mutually perpendicular three directions;
a detector which detects movement of a body in the display space; and
a controller which changes positions of the regular hexahedrons of each of the first and second aggregations according to a detection result of the detector, wherein
each of the six faces of each of the first and second aggregations includes external faces of the regular hexahedrons as elements, and notations with which whether all of the elements on the same face of said each aggregation belong to a same group is discriminative are provided to the respective elements,
the controller controls the regular hexahedrons to be pivoted such that,
of the six faces, in faces perpendicular to a first direction of the mutually perpendicular three directions, positional relationship among the elements that configure each of the faces is not changed, and
of the six faces, in a plurality of other faces perpendicular to a second or third direction of the mutually perpendicular three directions, part of the elements that configure each of the plurality of other faces are interchanged among the plurality of other faces,
based on the detection result of the detector, using the first direction as a rotation axis, and
in a first mode, when the detector detects movement of the body acting on the first aggregation but not on the second aggregation, the controller changes
positions of the regular hexahedrons of the first aggregation according to the detected movement of the body acting on the first aggregation, and
positions of the regular hexahedrons of the second aggregation according to the changed positions of the corresponding regular hexahedrons of the first aggregation.

19. The display device according to claim 18, wherein
in a second mode, when the first aggregation is nested inside the second aggregation and the detector detects movement of the body acting on the first aggregation, the controller changes positions of the regular hexahedrons of the first aggregation according to the detected movement of the body acting on the first aggregation without changing positions of the regular hexahedrons of the second aggregation.

* * * * *